(12) United States Patent
Kurtz et al.

(10) Patent No.: US 12,287,465 B2
(45) Date of Patent: Apr. 29, 2025

(54) MULTI-CAMERA PANORAMIC IMAGE CAPTURE DEVICES WITH A FACETED DOME

(71) Applicant: Circle Optics, Inc., Rochester, NY (US)

(72) Inventors: Andrew F. Kurtz, Macedon, NY (US);
Eugene Sisto, Rochester, NY (US);
Zakariya Niazi, Rochester, NY (US);
John Bowron, Burlington (CA);
Thomas Bidwell, Bergen, NY (US)

(73) Assignee: Circle Optics, Inc., Rochester, NY (US)

( * ) Notice: Subject to any disclaimer, the term of this patent is extended or adjusted under 35 U.S.C. 154(b) by 581 days.

(21) Appl. No.: 17/622,450

(22) PCT Filed: Jun. 23, 2020

(86) PCT No.: PCT/US2020/039200
§ 371 (c)(1),
(2) Date: Dec. 23, 2021

(87) PCT Pub. No.: WO2020/263867
PCT Pub. Date: Dec. 30, 2020

(65) Prior Publication Data
US 2022/0357646 A1 Nov. 10, 2022

Related U.S. Application Data

(60) Provisional application No. 62/972,532, filed on Feb. 10, 2020, provisional application No. 62/952,983, (Continued)

(51) Int. Cl.
G02B 13/06 (2006.01)
G02B 7/02 (2021.01)
(Continued)

(52) U.S. Cl.
CPC ............ G02B 13/06 (2013.01); G02B 7/021 (2013.01); G02B 13/18 (2013.01);
(Continued)

(58) Field of Classification Search
CPC ........ G02B 13/06; G02B 7/021; G02B 13/18;
G02B 17/0856; H04N 23/55; H04N 23/90; H04N 23/698; G03B 37/04
(Continued)

(56) References Cited

U.S. PATENT DOCUMENTS 3,524,697 A 8/1970 Isshiki et al.
4,930,864 A * 6/1990 Kuster .................. G03B 37/04
250/221

(Continued)

FOREIGN PATENT DOCUMENTS

DE 202017104934 U1 12/2017
DE 102017011352 A1 6/2019
(Continued)

OTHER PUBLICATIONS

WO-2018193713-A1—Takahashi—Oct. 2018—English translation.*

(Continued)

*Primary Examiner* — Sharrief I Broome
(74) *Attorney, Agent, or Firm* — Lee & Hayes, P.C.

(57) ABSTRACT

A low parallax imaging device includes a dome defining an interior volume in which a plurality of imaging lens elements are disposed. The dome includes a first outer optical element associated with a first of the imaging lens elements and a second outer optical element associated with a second of the imaging lens elements. Facets are provided at seams in the dome between the first outer optical element and the second outer optical element.

20 Claims, 32 Drawing Sheets

Related U.S. Application Data filed on Dec. 23, 2019, provisional application No. 62/952,973, filed on Dec. 23, 2019, provisional application No. 62/865,741, filed on Jun. 24, 2019.

(51) Int. Cl.
| | |
|---|---|
| *G02B 13/18* | (2006.01) |
| *G02B 17/08* | (2006.01) |
| *G03B 37/04* | (2021.01) |
| *H04N 23/55* | (2023.01) |
| *H04N 23/698* | (2023.01) |
| *H04N 23/90* | (2023.01) |

(52) U.S. Cl.
CPC ......... *G02B 17/0856* (2013.01); *G03B 37/04* (2013.01); *H04N 23/55* (2023.01); *H04N 23/698* (2023.01); *H04N 23/90* (2023.01)

(58) Field of Classification Search
USPC ......................................................... 359/736
See application file for complete search history.

(56) References Cited

U.S. PATENT DOCUMENTS

| | | | |
|---|---|---|---|
| 5,023,725 A | 6/1991 | McCutchen | |
| 5,555,431 A | 9/1996 | Kim | |
| 5,900,988 A | 5/1999 | Ohshita | |
| 6,141,034 A | 10/2000 | McCutchen | |
| 7,136,236 B2 | 11/2006 | Ohashi | |
| 7,515,177 B2 | 4/2009 | Yoshikawa | |
| 9,001,187 B2 | 4/2015 | Wilson et al. | |
| 9,237,317 B2 | 1/2016 | Hollinger | |
| 9,339,194 B2 | 5/2016 | Adams | |
| 9,451,162 B2 | 9/2016 | Van Hoff et al. | |
| 9,911,454 B2 | 3/2018 | van Hoff et al. | |
| 10,291,828 B1* | 5/2019 | Hsu | H04N 23/698 |
| 10,341,559 B2 | 7/2019 | Niazi | |
| 2003/0231409 A1* | 12/2003 | Amery | G02B 7/021 359/819 |
| 2004/0201769 A1 | 10/2004 | Yoshikawa et al. | |
| 2005/0088762 A1 | 4/2005 | Ohashi | |
| 2007/0053037 A1* | 3/2007 | Kang | H01L 31/02327 359/204.1 |
| 2007/0091195 A1 | 4/2007 | Yoshikawa | |
| 2008/0297612 A1 | 12/2008 | Yoshikawa | |
| 2010/0067070 A1 | 3/2010 | Mamada et al. | |
| 2011/0211106 A1 | 9/2011 | Marks et al. | |
| 2012/0062708 A1 | 3/2012 | Johnson et al. | |
| 2014/0036142 A1 | 2/2014 | Inoko | |
| 2014/0104378 A1 | 4/2014 | Kauff et al. | |
| 2014/0111680 A1 | 4/2014 | Sutton et al. | |
| 2014/0132788 A1* | 5/2014 | Ramsay | H04N 23/698 348/218.1 |
| 2014/0153916 A1 | 6/2014 | Kintner | |
| 2016/0307372 A1 | 10/2016 | Pitts et al. | |
| 2016/0352982 A1 | 12/2016 | Weaver et al. | |
| 2017/0059966 A1 | 3/2017 | Wallace | |
| 2017/0331986 A1 | 11/2017 | Houba | |
| 2018/0007245 A1 | 1/2018 | Rantala et al. | |
| 2018/0190321 A1* | 7/2018 | van Hoff | H04N 23/698 |
| 2019/0098276 A1* | 3/2019 | Duggan | H04N 23/698 |
| 2019/0191059 A1 | 6/2019 | Park | |
| 2019/0235214 A1 | 8/2019 | Kirejevas | |
| 2019/0310370 A1 | 10/2019 | Schmitz | |
| 2020/0088976 A1 | 3/2020 | Song | |
| 2021/0168284 A1 | 6/2021 | Sjölund | |
| 2022/0252848 A1 | 8/2022 | Kurtz et al. | |
| 2023/0090281 A1 | 3/2023 | Kurtz | |
| 2023/0152672 A1 | 5/2023 | Bidwell | |
| 2023/0236493 A1 | 7/2023 | Muir | |

FOREIGN PATENT DOCUMENTS

| | | | |
|---|---|---|---|
| EP | 1593999 A1 | 11/2005 | |
| EP | 1770435 A1 | 4/2007 | |
| JP | 2003162018 A | 6/2003 | |
| JP | 2004184862 A | 7/2004 | |
| JP | 2006030664 A | 2/2006 | |
| JP | 2007110228 A | 4/2007 | |
| JP | 2014119707 A | 6/2014 | |
| JP | 2016208294 A | 12/2016 | |
| JP | 2016538790 A | 12/2016 | |
| JP | 2017120326 A | 7/2017 | |
| JP | 2017519250 A | 7/2017 | |
| WO | WO2014039327 A1 | 3/2014 | |
| WO | WO2014071508 A1 | 5/2014 | |
| WO | WO2014135391 A1 | 9/2014 | |
| WO | 2017126455 A1 | 7/2017 | |
| WO | 2018006938 A1 | 1/2018 | |
| WO | WO-2018193713 A1 * | 10/2018 | |
| WO | WO2020263865 A1 | 12/2020 | |

OTHER PUBLICATIONS

Extended European Search Report mailed Aug. 7, 2023 for European Patent Application No. 20832799.9, 09 pgs.
Extended European Search Report mailed Jul. 11, 2023 for European Patent Application No. 20832012.7, 8 pages.
Japanese Office Action mailed Dec. 5, 2023 for Japanese Application No. 2021-577338, a foreign counterpart to U.S. Appl. No. 17/622,450, 19 pages.
Invitation to Pay Fees dated Aug. 10, 2020 for Application PCT/US20/39197, "Opto-Mechanics of Panoramic Capture Devices With Abutting Cameras", 2 pages.
International Preliminary Report on Patentability for PCT Application No. PCT/US20/39200, mailed Jan. 6, 2021.
PCT Search Report and Written Opinion mailed Aug. 25, 2020 for PCT Application No. PCT/US20/39200, 10 pages.
PCT Search Report and Written Opinion mailed Oct. 26, 2020 for PCT application No. PCT/US20/39197, 13 pages.
PCT Search Report and Written Opinion mailed Apr. 27, 2021 for PCT Application No. PCT/US21/17284, 10 pages.
PCT Search Report and Written Opinion mailed Mar. 25, 2021 for PCT application No. PCT/US20/66702, 14 pages.
Japanese Office Action mailed Apr. 2, 2024 for Japanese Application No. 2021-577377, a foreign counterpart to U.S. Appl. No. 17/622,393, 7 pages.
Office Action for U.S. Appl. No. 17/908,158, mailed on Mar. 14, 2024, Bidwell, "Mounting Systems for Multi-Camera Imagers", 14 Pages.
Office Action for Japanese Application No. 2021-577347, Dated May 21, 2024, 18 pages.
Search Report for European Application No. 20905649.8, Dated Apr. 17, 2024, 9 pages.
Search Report and Written Opinion for European Application No. 21754613.4, Dated Jul. 29, 2024, 18 pages.
Office Action for Japanese Application No. 2021-577338, Dated Jun. 25, 2024, 15 pages.
Lichtsteiner, et al., "A 128x 128 120 dB 15 us Latency Asynchronous Temporal Contrast Vision Sensor", IEEE Journal of Solid-State Circuits, vol. 43, No. 2, Jan. 1, 2008, pp. 566-576.
Office Action for U.S. Appl. No. 17/622,463, mailed on Sep. 3, 2024, Kurtz, "Lens Design for Low Parallax Panoramic Camera Systems", 10 pages.

* cited by examiner

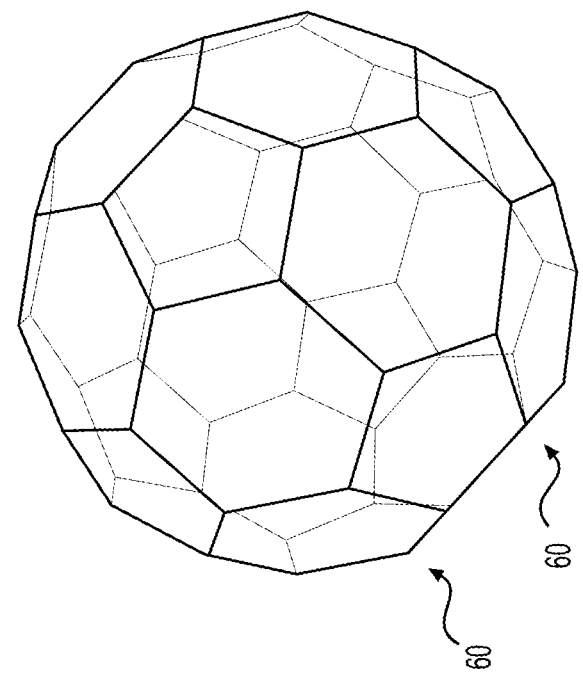
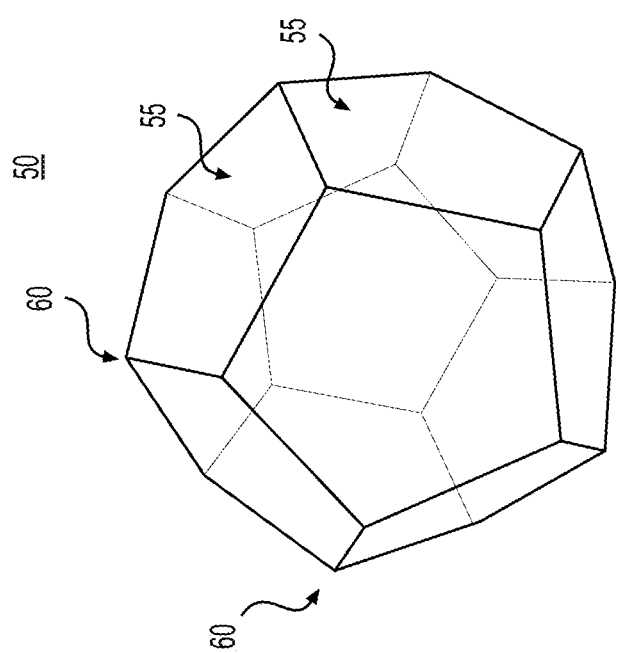
FIG. 4

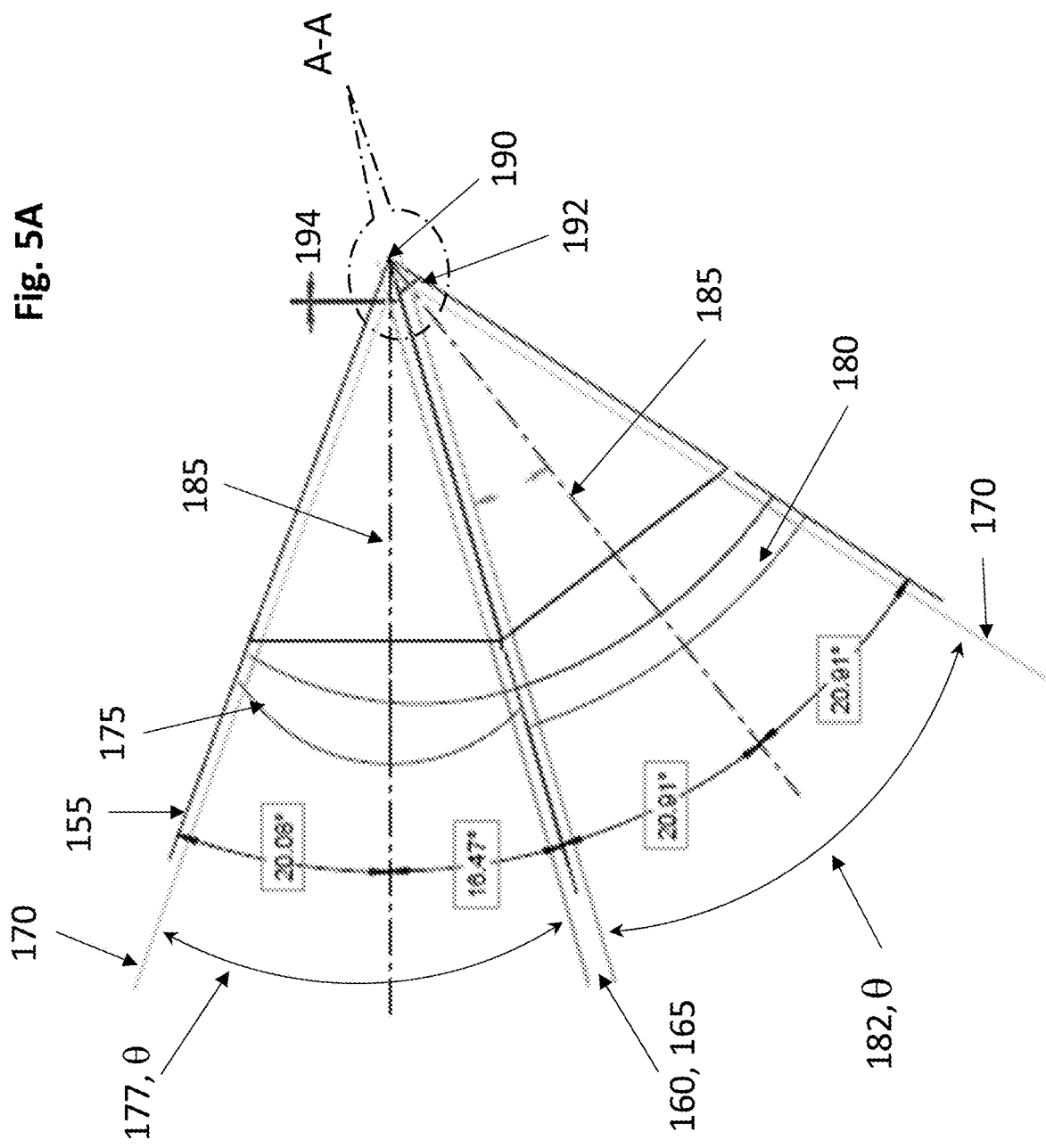

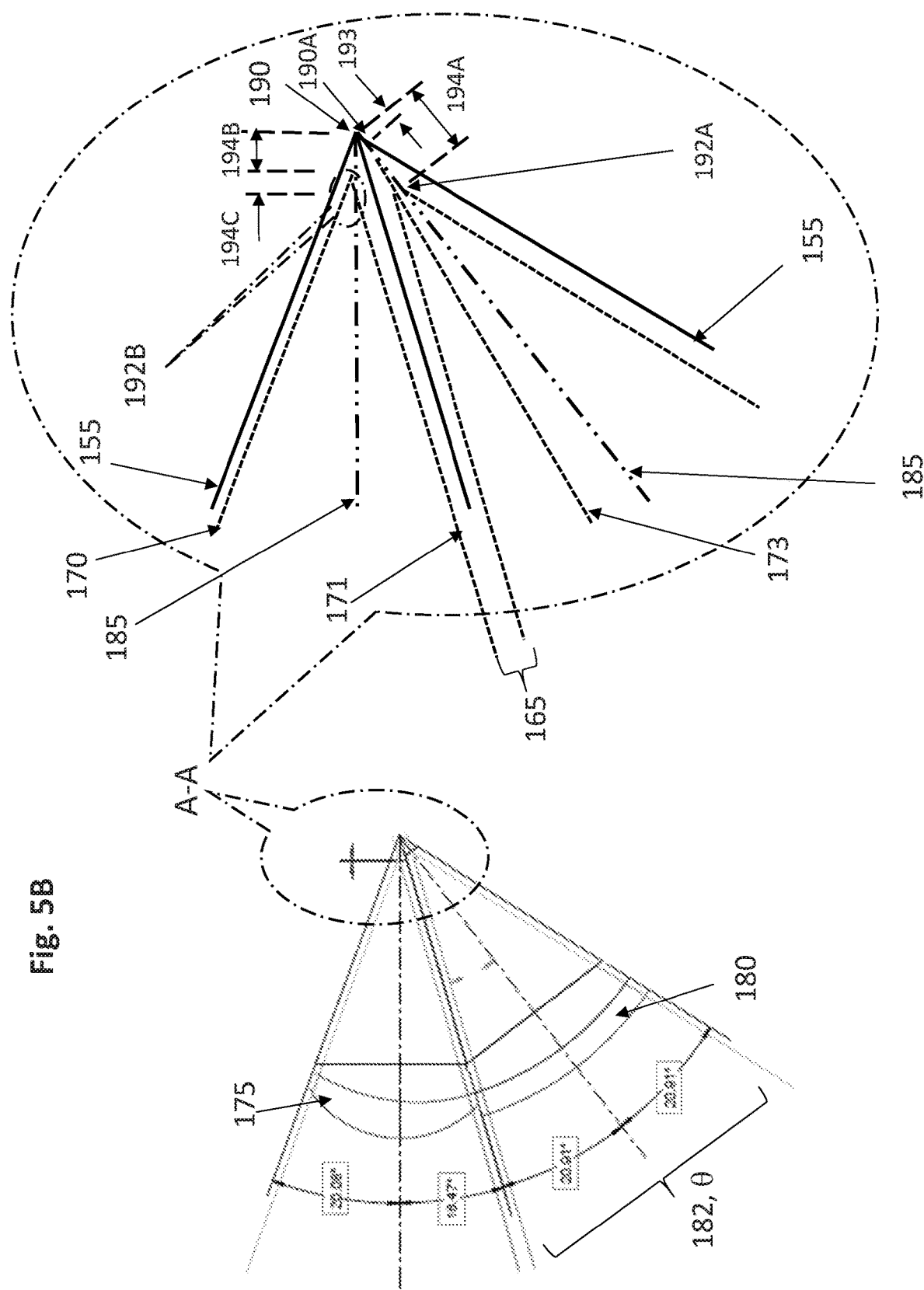

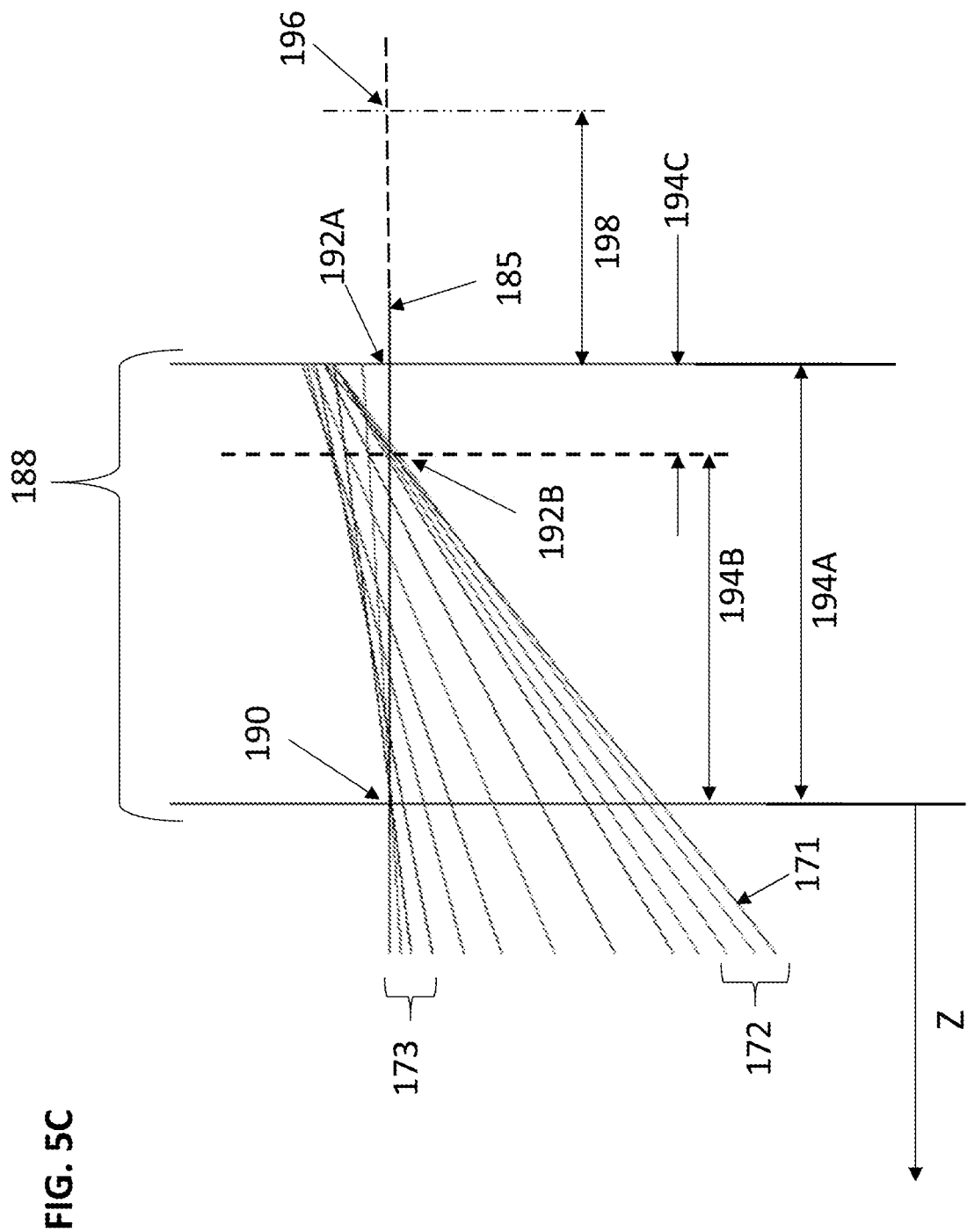

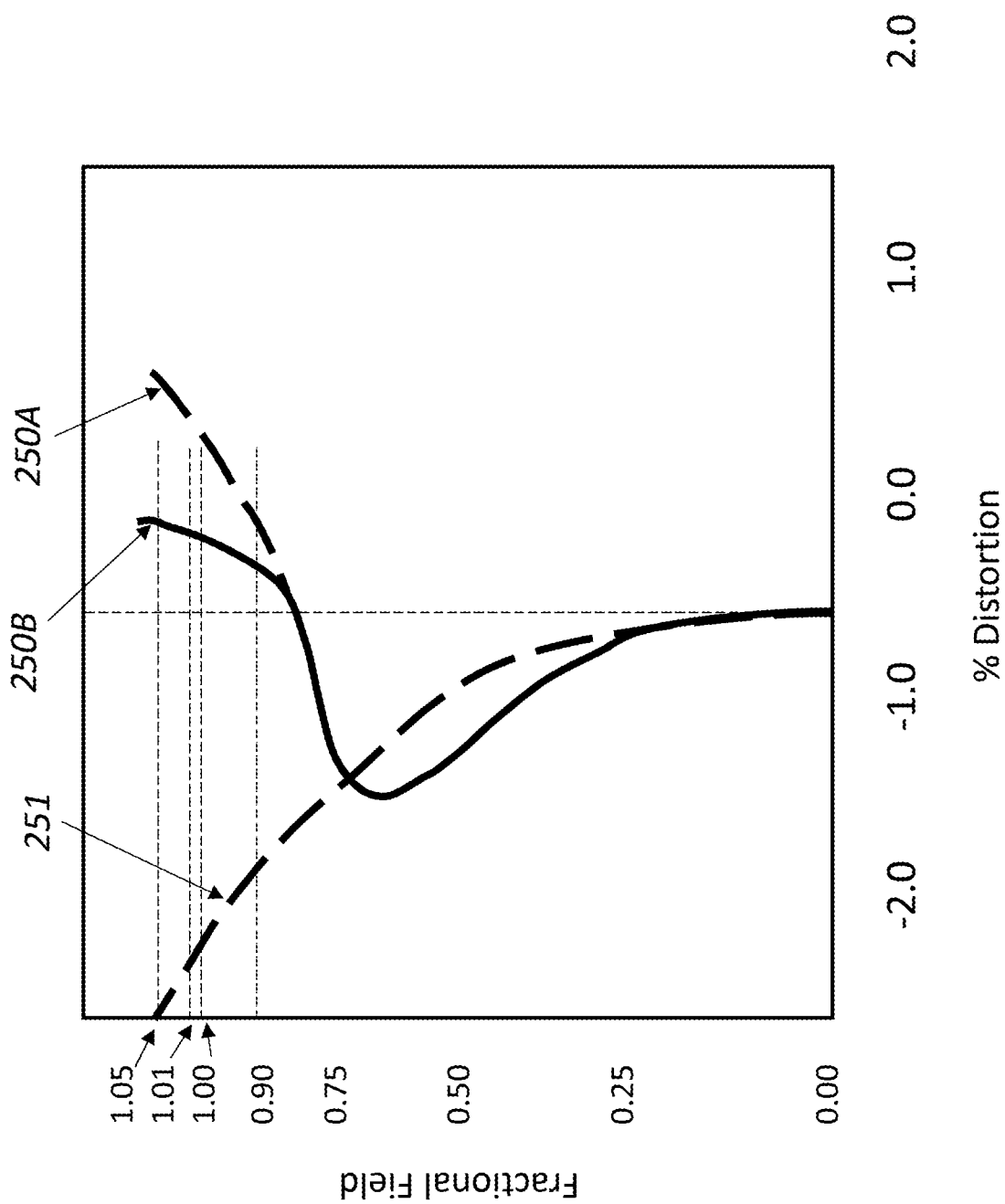

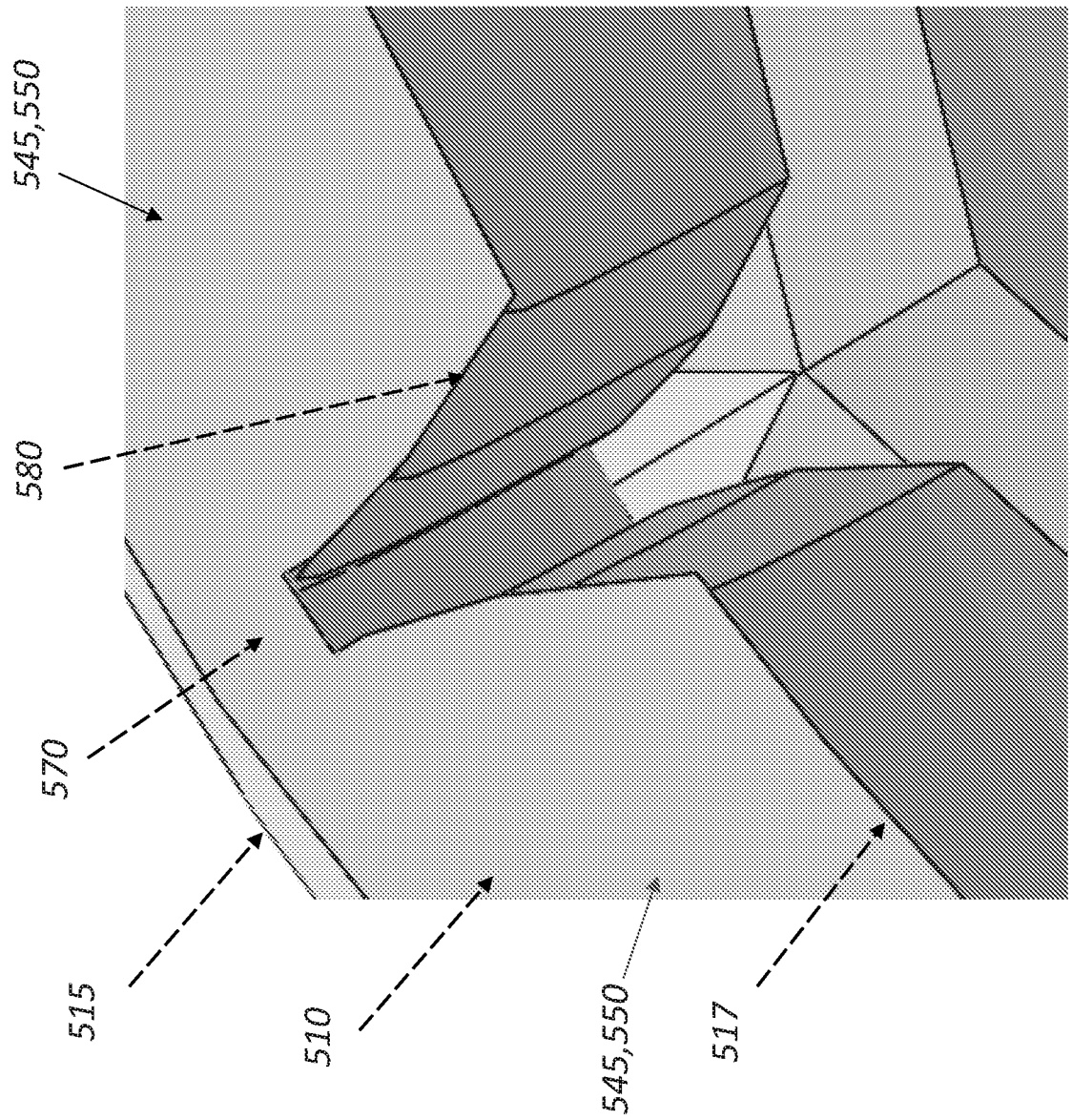

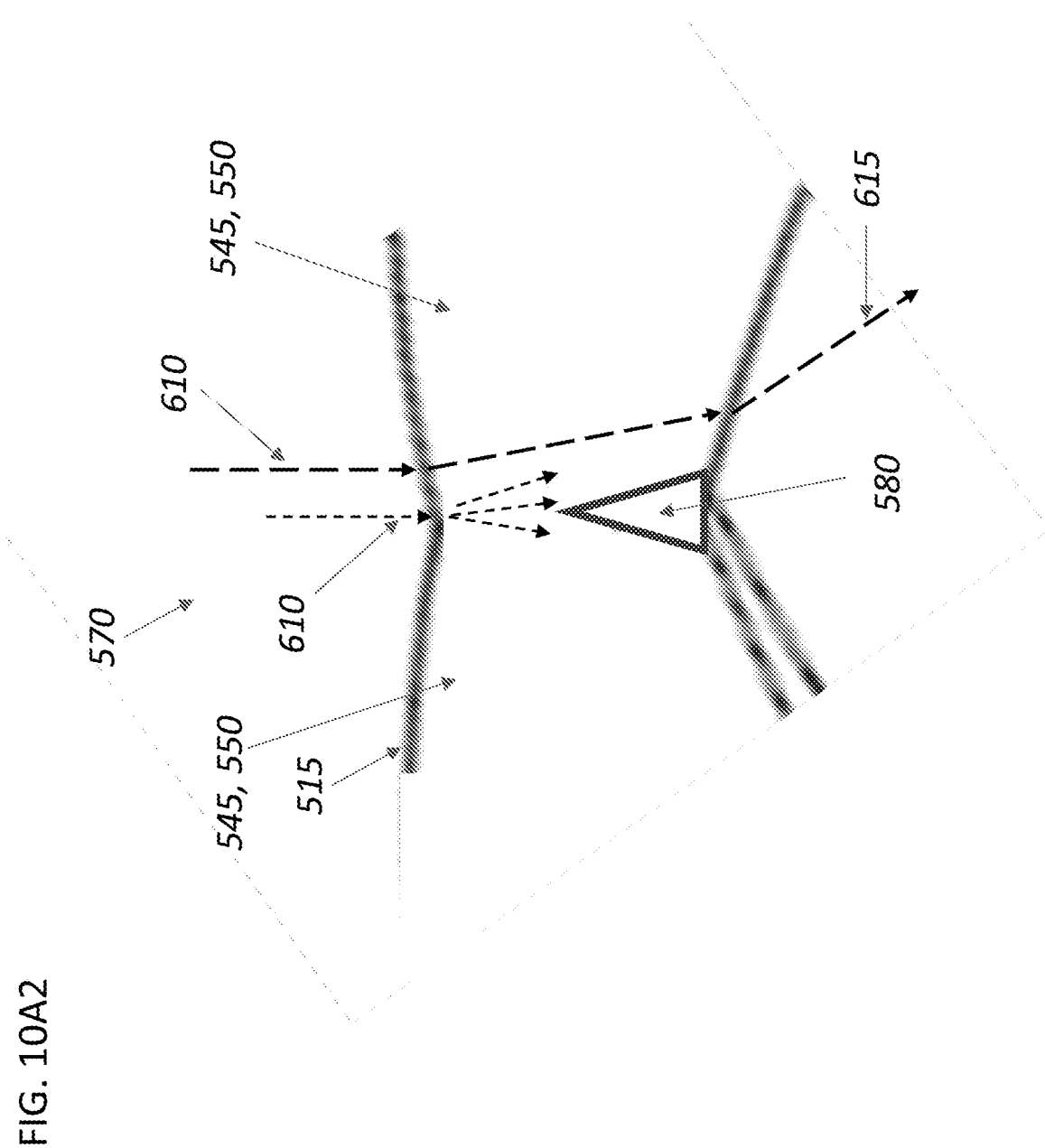
FIG. 10A2

MULTI-CAMERA PANORAMIC IMAGE CAPTURE DEVICES WITH A FACETED DOME

CROSS REFERENCE TO RELATED APPLICATIONS

This application is a 35 U.S.C. § 371 National Stage Entry of, and claims priority to, International Application No. PCT/US2020/039200, filed Jun. 23, 2020, which claims benefit of priority of: U.S. Provisional Patent Application Ser. No. 62/865,741, filed Jun. 24, 2019, entitled "Opto-Mechanics of Panoramic Capture Devices with Abutting Cameras;" U.S. Provisional Patent Application Ser. No. 62/952,973, filed Dec. 23, 2019, entitled "Opto-Mechanics of Panoramic Capture Devices with Abutting Cameras;" U.S. Provisional Patent Application Ser. No. 62/952,983, filed Dec. 23, 2019, entitled "Multi-camera Panoramic Image Capture Devices with a Faceted Dome;" and U.S. Provisional Patent Application Ser. No. 62/972,532, filed Feb. 10, 2020, entitled "Integrated Depth Sensing and Panoramic Camera System," the entirety of each of which is incorporated herein by reference.

TECHNICAL FIELD

The present disclosure relates to panoramic lo-parallax multi-camera capture devices having a plurality of adjacent and abutting polygonal cameras. The disclosure also relates to a device with an outer dome or shell that includes adjacent faceted lens elements that function as the outermost lens elements for adjacent cameras, where the cameras capture incident light from a polygonal shaped field of view to form an polygonal shaped image.

BACKGROUND

Panoramic cameras have substantial value because of their ability to simultaneously capture wide field of view images. The earliest such example is the fisheye lens, which is an ultra-wide-angle lens that produces strong visual distortion while capturing a wide panoramic or hemispherical image. While the field of view (FOV) of a fisheye lens is usually between 100 and 180 degrees, the approach has been extended to yet larger angles, including into the 220-270° range, as provided by Y. Shimizu in U.S. Pat. No. 3,524,697. As an alternative, there are mirror or reflective based cameras that capture annular panoramic images, such as the system suggested by P. Greguss in U.S. Pat. No. 4,930,864. While these technologies have continued to evolve, it is difficult for them to provide a full hemispheric or spherical image with the resolution and image quality that modern applications are now seeking.

As another alternative, panoramic multi-camera devices, with a plurality of cameras arranged around a sphere or a circumference of a sphere, are becoming increasingly common. However, in most of these systems, including those described in U.S. Pat. Nos. 9,451,162 and 9,911,454, both to A. Van Hoff et al., of Jaunt Inc., the plurality of cameras are sparsely populating the outer surface of the device. In order to capture complete 360-degree panoramic images, including for the gaps or seams between the adjacent individual cameras, the cameras then have widened FOVs that overlap one another. In some cases, as much as 50% of a camera's FOV or resolution may be used for camera to camera overlap, which also creates substantial parallax differences between the captured images. Parallax is the visual perception that the position or direction of an object appears to be different when viewed from different positions. Then in the subsequent image processing, the excess image overlap and parallax differences both complicate and significantly slow the efforts to properly combine, tile or stitch, and synthesize acceptable images from the images captured by adjacent cameras.

There are also panoramic multi-camera devices in which a plurality of cameras is arranged around a sphere or a circumference of a sphere, such that adjacent cameras are abutting along a part or the whole of adjacent edges. As an example, U.S. Pat. No. 7,515,177 by K. Yoshikawa depicts an imaging device with a multitude of adjacent image pickup units (cameras). Images are collected from cameras having overlapping fields of view, so as to compensate for mechanical errors.

However, while such multi-camera panoramic devices can provide versatile image capture, such devices can also be vulnerable to environmental contamination or to external damage. These multi-camera panoramic devices can also be improved by reducing the gap width or seams between adjacent cameras, so as to reduce blind regions or image overlap. Thus, it can be advantageous to protect such devices, while also generally maintaining or improving their performance.

BRIEF DESCRIPTION OF DRAWINGS

FIG. 4 depicts two polyhedron shapes, that of a regular dodecahedron and a truncated icosahedron, to which a multi-camera capture device can be designed and fabricated.

FIG. 5A and FIG. 5B depict the optical geometry for fields of view for adjacent hexagonal and pentagonal lenses, as can occur with a device having the geometry of a truncated icosahedron. FIG. 5B depicts an expanded area of FIG. 5A with greater detail.

FIG. 5C depicts an example of a low parallax (LP) volume located near both a paraxial NP point or entrance pupil and a device center.

FIG. 6 depicts distortion correction curves plotted on a graph showing a percentage of distortion relative to a fractional field.

FIG. 8C depicts alignment notches or facets that can be provided as part of an outer shell or dome for use with an improved panoramic multi-camera capture device.

FIG. 10A-2 depicts a zoomed in view of light propagation through a seam area of a portion of an outer shell or dome.

DETAILED DESCRIPTION

Figure 1:
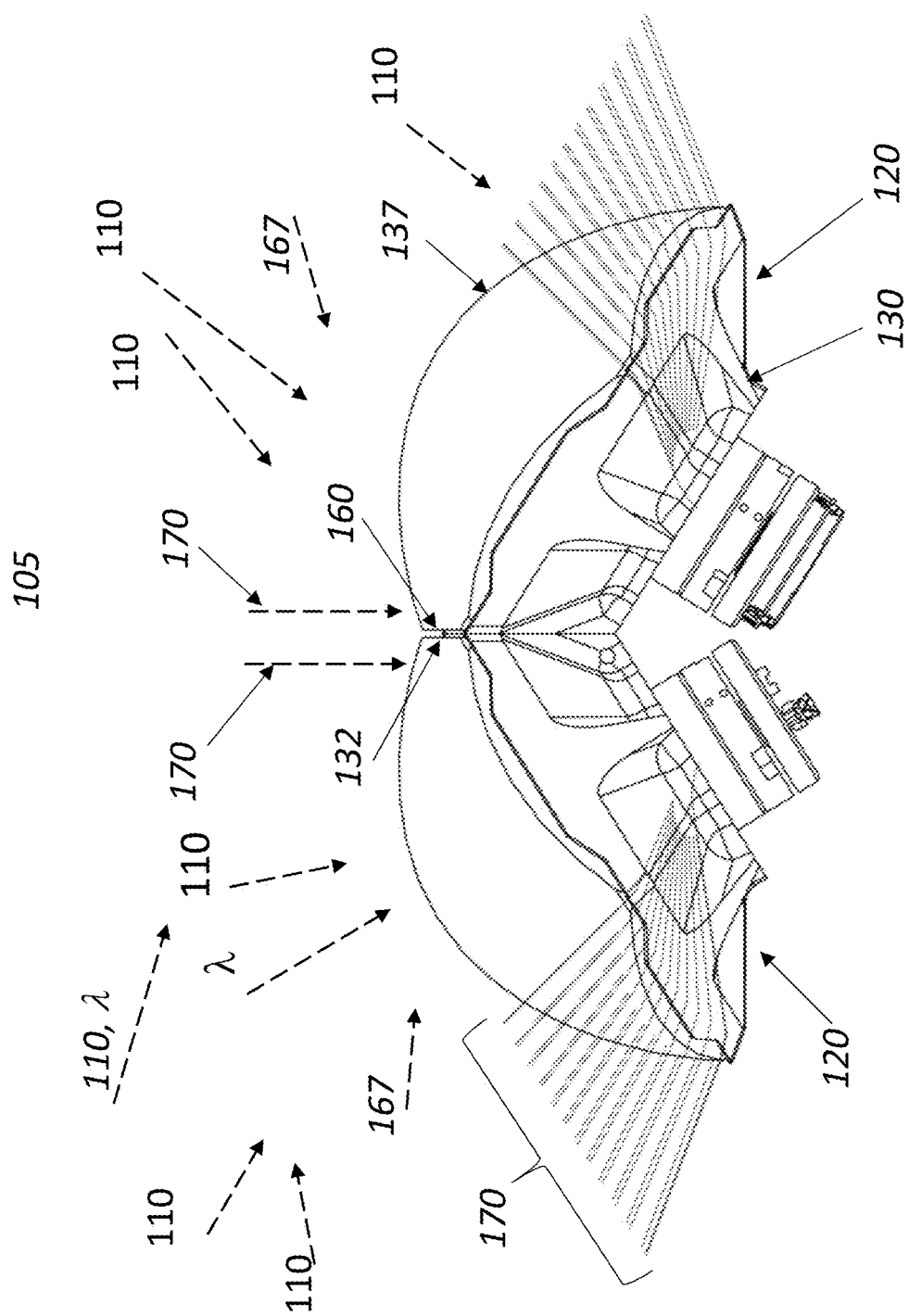
FIG. 1 depicts a 3D view of a portion of a multi-camera capture device, and specifically two adjacent cameras thereof.

As is generally understood in the field of optics, a lens or lens assembly typically comprises a system or device having multiple lens elements which are mounted into a lens barrel or housing, and which work together to produce an optical image. An imaging lens captures a portion of the light coming from an object or plurality of objects that reside in object space at some distance(s) from the lens system. The imaging lens can then form an image of these objects at an output "plane"; the image having a finite size that depends on the magnification, as determined by the focal length of the imaging lens and the conjugate distances to the object(s) and image plane, relative to that focal length. The amount of image light that transits the lens, from object to image, depends in large part on the size of the aperture stop of the imaging lens, which is typically quantified by one or more values for a numerical aperture (NA) or an f-number (F# or F/#).

The image quality provided by the imaging lens depends on numerous properties of the lens design, including the selection of optical materials used in the design, the size, shapes (or curvatures) and thicknesses of the lens elements, the relative spacing of the lens elements one to another, the spectral bandwidth, polarization, light load (power or flux) of the transiting light, optical diffraction or scattering, and/or lens manufacturing tolerances or errors. The image quality is typically described or quantified in terms of lens aberrations (e.g., spherical, coma, or distortion), or the relative size of the resolvable spots provided by the lens, which is also often quantified by a modulation transfer function (MTF).

In a typical electronic or digital camera, an image sensor is nominally located at the image plane. This image sensor is typically a CCD or CMOS device, which is physically attached to a heat sink or other heat removal means, and also includes electronics that provide power to the sensor, and read-out and communications circuitry that provide the image data to data storage or image processing electronics. The image sensor typically has a color filter array (CFA), such as a Bayer filter within the device, with the color filter pixels aligned in registration with the image pixels to provide an array of RGB (Red, Green, Blue) pixels. Alternative filter array patterns, including the CYGM filter (cyan, yellow, green, magenta) or an RGBW filter array (W=white), can be used instead.

In typical use, many digital cameras are used by people or remote systems in relative isolation, to capture images or pictures of a scene, without any dependence or interaction with any other camera devices. In some cases, such as surveillance or security, the operation of a camera may be directed by people or algorithms based on image content seen from another camera that has already captured overlapping, adjacent, or proximate image content. In another example, people capture panoramic images of a scene with an extended or wide FOV, such as a landscape scene, by sequentially capturing a sequence of adjacent images, while manually or automatically moving or pivoting to frame the adjacent images. Afterwards, image processing software, such as Photoshop or Lightroom, can be used to stitch, mosaic, or tile the adjacent images together to portray the larger extended scene. Image stitching or photo stitching is the process of combining multiple photographic images with overlapping fields of view to produce a segmented panorama or high-resolution image. Image quality improvements, including exposure or color corrections, can also be applied, either in real time, or in a post processing or image rendering phase, or a combination thereof.

Unless the objects in a scene are directionally illuminated and/or have a directional optical response (e.g., such as with reflectance), the available light is plenoptic, meaning that there is light ($\lambda$), travelling in every direction, or nearly so, in a given space or environment. A camera can then sample a subset of this light, as image light, with which it provides a resulting image that shows a given view or perspective of the different objects in the scene at one or more instants in time. If the camera is moved to a different nearby location and used to capture another image of part of that same scene, both the apparent perspectives and relative positioning of the objects will change. In the latter case, one object may now partially occlude another, while a previously hidden object becomes at least partially visible. These differences in the apparent position or direction of an object are known as parallax. In particular, parallax is a displacement or difference in the apparent position of an object viewed along two different lines of sight and is measured by the angle or semi-angle of inclination between those two lines.

In a stereoscopic image capture or projection system, dual view parallax is a cue, along with shadowing, occlusion, and perspective, that can provide a sense of depth. For example, in a stereo (3D) projection system, polarization or spectrally encoded image pairs can be overlap projected onto a screen to be viewed by audience members wearing appropriate glasses. The amount of parallax can have an optimal range, outside of which, the resulting sense of depth can be too small to really be noticed by the audience members, or too large to properly be fused by the human visual system.

Whereas, in a panoramic image capture application, parallax differences can be regarded as an error that can complicate both image stitching and appearance. In the example of an individual manually capturing a panoramic sequence of landscape images, the visual differences in perspective or parallax across images may be too small to notice if the objects in the scene are sufficiently distant (e.g., optically at infinity). An integrated panoramic capture device with a rotating camera or multiple cameras has the potential to continuously capture real time image data at high resolution without being dependent on the uncertainties of manual capture. But such a device can also introduce its own visual disparities, image artifacts, or errors, including those of parallax, perspective, and exposure. Although the resulting images can often be successfully stitched together with image processing algorithms, the input image errors complicate and lengthen image processing time, while sometimes leaving visually obvious residual errors.

It is noted that the terms "facets" has several meanings in this application. A 3D polygonal structures (FIG. 4) has numerous sides or faces. A faceted shell or dome (FIG. 8B and FIGS. 10A-E) has facets or shell portions 545 that can have optical power so as to function as lens facets or compressor lens elements 550. A faceted shell or dome also has grooves, or compound chamfers or faceted notches 580, that are nominally located in the seams 570 between adjacent lens facets 550. A faceted dome 510 can also have optical facets 625 at or near the seams (FIG. 10E) to deflect or redirect transiting image light. Nominally the polygonal shapes and configuration of the lens facets 500, both individually and collectively, also match the polygonal faces of the desired overall polygonal structure.

To provide context, FIG. 1 depicts a portion of an integrated panoramic multi-camera capture device 100 having two adjacent cameras 120 in housings 130 which are designed for reduced parallax image capture. These cameras are alternately referred to as image pick-up units, or camera channels, or objective lens systems. The cameras 120 each have a plurality of lens elements (see FIG. 2) that are mounted within a lens barrel or housing 130. The adjacent outer lens elements 137 have adjacent beveled edges 132 and are proximately located, one camera channel to another, but which may not be in contact, and thus are separated by a gap or seam 160 of finite width. Some portion of the available light (λ), or light rays 110, from a scene or object space 105 will enter a camera 120 to become image light that was captured within a constrained FOV and directed to an image plane, while other light rays will miss the cameras entirely. Some light rays 110 will propagate into the camera and transit the constituent lens elements as edge-of-field chief rays 170, or perimeter rays, while other light rays can potentially propagate through the lens elements to create stray or ghost light and erroneous bright spots or images. As an example, some light rays (167) that are incident at large angles to the outer surface of an outer lens element 137 can transit a complex path through the lens elements of a camera and create a detectable ghost image at the image plane 150.

Figure 2A:
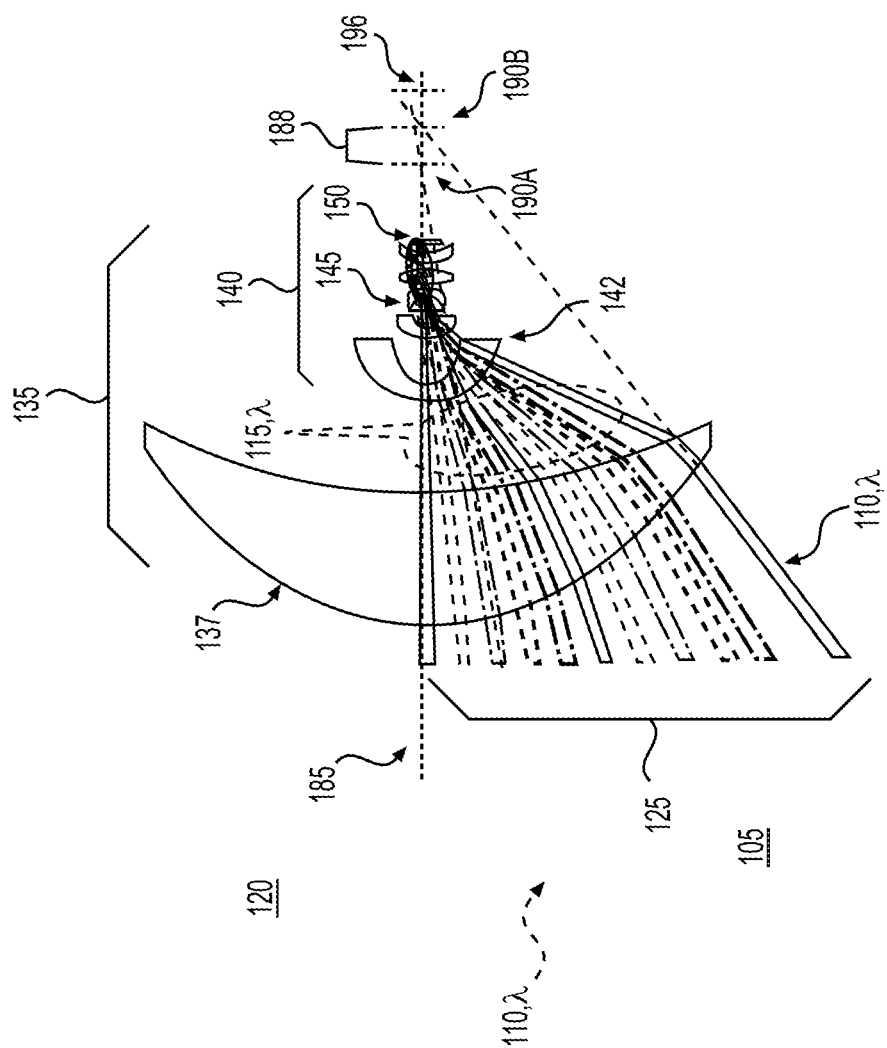
FIGS. 2A and 2B depict portions of camera lens assemblies in cross-section, including lens elements and ray paths.
Figure 2B:
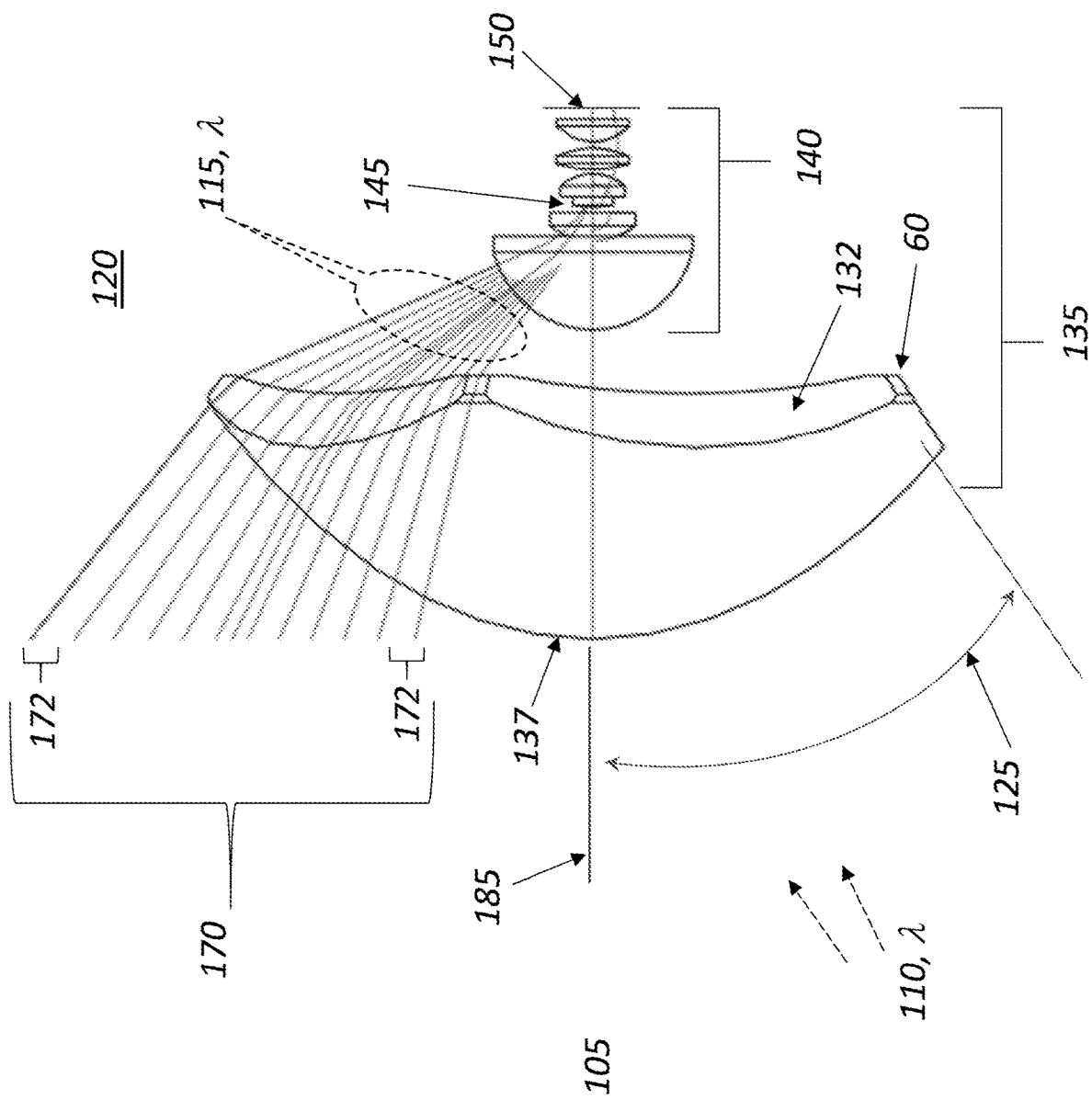

In greater detail, FIG. 2A depicts a cross-section of part of a camera 120 having a set of lens elements 135 mounted in a housing (130, not shown) within a portion of an integrated panoramic multi-camera capture device 100. A fan of light rays 110 from object space 105, spanning the range from on axis to full field off axis chief rays, are incident onto the outer lens element 137, and are refracted and transmitted inwards. This image light 115 that is refracted and transmitted through further inner lens elements 140, through an aperture stop 145, converges to a focused image at or near an image plane 150, where an image sensor (not shown) is typically located. The lens system 120 of FIG. 2A can also be defined as having a lens form that consists of outer lens element 137 or compressor lens element, and inner lens elements 140, the latter of which can also be defined as consisting of a pre-stop wide angle lens group, and a post-stop eyepiece-like lens group. This compressor lens element (137) directs the image light 115 sharply inwards, compressing the light, to both help enable the overall lens assembly to provide a short focal length, while also enabling the needed room for the camera lens housing or barrel to provide the mechanical features necessary to both hold or mount the lens elements and to interface properly with the barrel or housing of an adjacent camera. The image light that transited a camera lens assembly from the outer lens element 137 to the image plane 150 will provide an image having an image quality, that can be quantified by an image resolution, image contrast, a depth of focus, and other attributes, whose quality was defined by the optical aberrations (e.g., astigmatism, distortion, or spherical) and chromatic or spectral aberrations, encountered by the transiting light at each of the lens elements (137, 140) within a camera 120. FIG. 2B depicts a fan of chief rays 170, or perimeter rays, incident along or near a beveled edge 132 of the outer lens element 137 of the camera optics (120) depicted in FIG. 2A. FIG. 2B also depicts a portion of a captured, polygonal shaped or asymmetrical, FOV 125, that extends from the optical axis 185 to a line coincident with an edge ray.

In the camera lens design depicted in FIG. 2A, the outer lens element 137 functions as a compressor lens element that redirects the transiting image light 115 towards a second lens element 142, which is the first lens element of the group of inner lens elements 140. In this design, this second lens element 142 has a very concave shape that is reminiscent of the outer lens element used in a fish-eye type imaging lens. This compressor lens element directs the image light 115 sharply inwards, or bends the light rays, to both help enable the overall lens assembly to provide a short focal length, while also enabling the needed room for the camera lens housing 130 or barrel to provide the mechanical features necessary to both hold or mount the lens elements 135 and to interface properly with the barrel or housing of an adjacent camera. However, with a good lens and opto-mechanical design, and an appropriate sensor choice, a camera 120 can be designed with a lens assembly that supports an image resolution of 20-30 pixels/degree, to as much as 110 pixels/degree, or greater, depending on the application and the device configuration.

The resultant image quality from these cameras will also depend on the light that scatters at surfaces, or within the lens elements, and on the light that is reflected or transmitted at each lens surface. The surface transmittance and camera lens system efficiency can be improved by the use of anti-reflection (AR) coatings. The image quality can also depend on the outcomes of non-image light. Considering again FIG. 1, other portions of the available light can be predominately reflected off of the outer lens element 137. Yet other light that enters a camera 120 can be blocked or absorbed by some combination of blackened areas (not shown) that are provided at or near the aperture stop, the inner lens barrel surfaces, the lens element edges, internal baffles or light trapping features, a field stop, or other surfaces. Yet other light that enters a camera can become stray light or ghost light 167 that is also potentially visible at the image plane.

The aggregate image quality obtained by a plurality of adjacent cameras 120 within an improved integrated panoramic multi-camera capture device 100 (e.g., FIG. 1) can also depend upon a variety of other factors including the camera to camera variations in the focal length and/or track length, and magnification, provided by the individual cameras. These parameters can vary depending on factors including the variations of the glass refractive indices, variations in lens element thicknesses and curvatures, and variations in lens element mounting. As an example, images that are tiled or mosaiced together from a plurality of adjacent cameras will typically need to be corrected, one to the other, to compensate for image size variations that originate with camera magnification differences (e.g., ±2%).

The images produced by a plurality of cameras in an integrated panoramic multi-camera capture device 100 can also vary in other ways that effect image quality and image mosaicing or tiling. In particular, the directional pointing or collection of image light through the lens elements to the image sensor of any given camera 120 can vary, such that the camera captures an angularly skewed or asymmetrical FOV (FOV↔) or mis-sized FOV (FOV±). The lens pointing variations can occur during fabrication of the camera (e.g., lens elements, sensor, and housing) or during the combined assembly of the multiple cameras into an integrated panoramic multi-camera capture device 100, such that the alignment of the individual cameras is skewed by misalignments or mounting stresses. When these camera pointing errors are combined with the presence of the seams 160 between cameras 120, images for portions of an available landscape or panoramic FOV that may be captured, may instead be missed or captured improperly. The variabilities of the camera pointing, and seams can be exacerbated by mechanical shifts and distortions that are caused by internal or external environmental factors, such as heat or light (e.g., image content), and particularly asymmetrical loads thereof.

Figure 3:
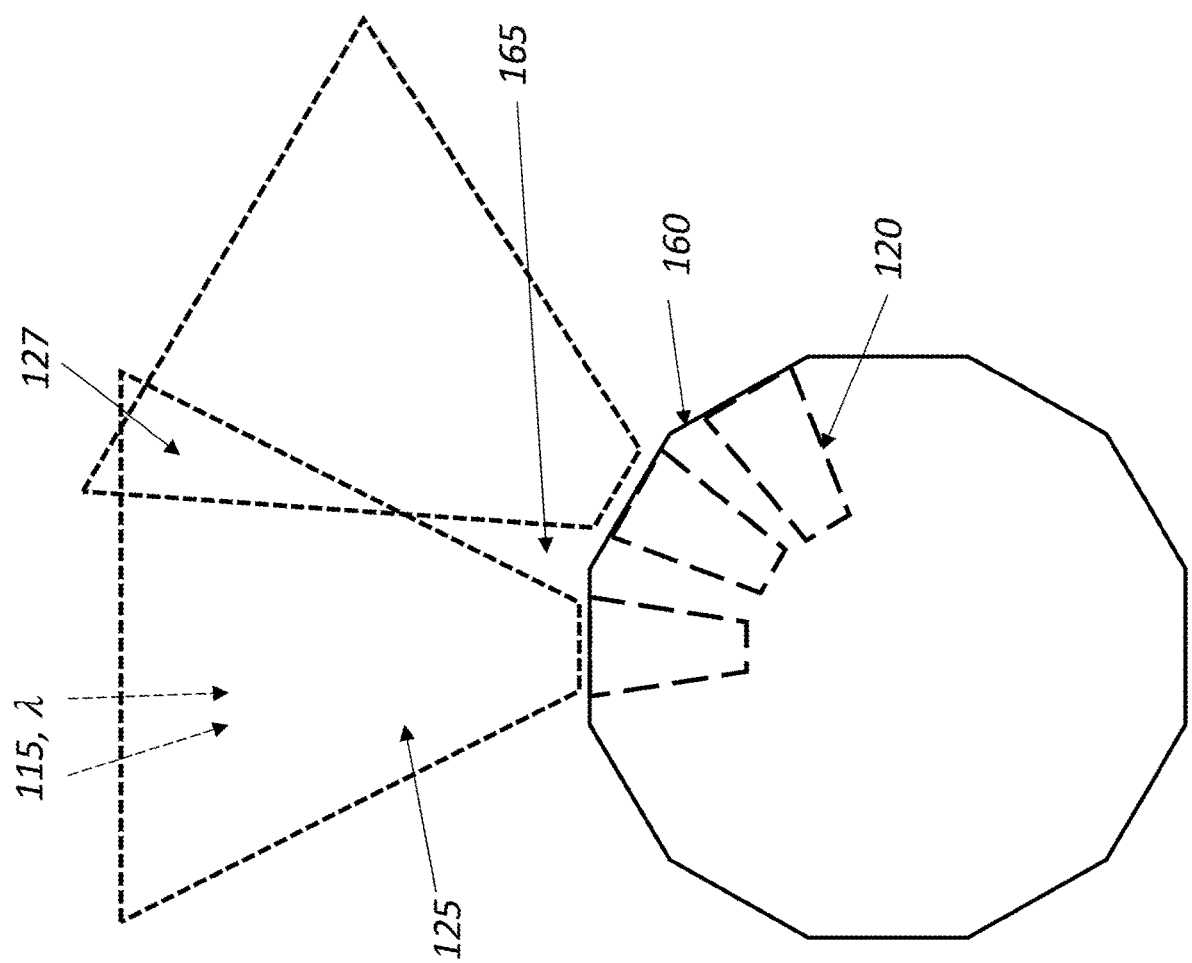
FIG. 3 depicts a cross-sectional view of a portion of a multi-camera capture device showing FOV overlap, Fields of view, overlap, seams, and blind regions.

In comparison to the FIG. 1 system, in a typical commercially available panoramic camera, the seams between cameras are outright gaps that can be 30-50 mm wide, or more. In particular, as shown in FIG. 3, a panoramic multi-camera capture device 101 can have adjacent cameras 120 or camera channels separated by large gaps or seams 160, between which there are blind spots or regions 165 from which neither camera can capture images. The actual physical seams 160 between adjacent camera channels or outer lens elements 137 (FIG. 1 and FIG. 3) can be measured in various ways; as an actual physical distance between adjacent lens elements or lens housings, as an angular extent of lost FOV, or as a number of "lost" pixels. However, the optical seam, as the distance between outer chief rays of one camera to another can be larger yet, due to any gaps in light acceptance caused by vignetting or coating limits. For example, anti-reflection (AR) coatings are not typically deposited to the edges of optics, but an offsetting margin is provided, to provide a coated clear aperture (CA).

To compensate for both camera misalignments and the large seams 160, and to reduce the size of the blind regions 165, the typical panoramic multi-camera capture devices 101 (FIG. 3) have each of the individual cameras 120 capture image light 115 from wide FOVs 125 that provide overlap 127, so that blind regions 165 are reduced, and the potential capturable image content that is lost is small. As another example, in most of the commercially available multi-camera capture devices 101, the gaps are 25-50+ mm wide, and the compensating FOV overlap between cameras is likewise large; e.g., the portions of the FOVs 125 that are overlapping and are captured by two adjacent cameras 120 can be as much as 10-50% of a camera's FOV. The presence of such large image overlaps from shared FOVs 125 wastes potential image resolution and increases the image processing and image stitching time, while introducing significant image parallax and perspective errors. These errors complicate image stitching, as the errors must be corrected or averaged during the stitching process. In such systems, the parallax is not predictable because it changes as a function of object distance. If the object distance is known, the parallax can be predicted for given fields of view and spacing between cameras. But because the object distance is not typically known, parallax errors then complicate image stitching. Optical flow and common stitching algorithms determine an object depth and enable image stitching, but with processing power and time burdens.

Similarly, in a panoramic multi-camera capture device 100, of the type of FIG. 1, with closely integrated cameras, the width and construction at the seams 160 can be an important factor in the operation of the entire device. However, the seams can be made smaller than in FIG. 3, with the effective optical seam width between the FOV edges of two adjacent cameras determined by both optical and mechanical contributions. For example, by using standard optical engineering practices to build lens assemblies in housings, the mechanical width of the seams 160 between the outer lens elements 137 of adjacent cameras might be reduced to 4-6 mm. For example, it is standard practice to assemble lens elements into a lens barrel or housing that has a minimum radial width of 1-1.5 mm, particularly near the outermost lens element. Then accounting for standard coated clear apertures or coating margins, and accounting for possible vignetting, aberrations of the entrance pupil, front color, chip edges, and trying to mount adjacent lens assemblies or housings in proximity by standard techniques. Thus, when accounting for both optics and mechanics, an optical seam width between adjacent lenses can easily be 8-12 mm or more.

But improved versions of the panoramic multi-camera capture device (300) of the type of FIG. 1, with optical and opto-mechanical designs that enable significantly smaller seams, and with further improved parallax performance, are possible. As a first example, for the present technology for improved polygonal shaped cameras, during early stages of fabrication of outer lens elements 137, these lenses can have a circular shape and can be AR coated to at or near their physical edges. When these lenses are subsequently processed to add the polygonal shape defining beveled edges 132 (e.g., FIG. 2B), a result can be that the AR coatings will essentially extend to the beveled lens edges. The effective optical or coated clear apertures can then defined by any allowances for mechanical mounting or for the standard edge grind that is used in optics manufacturing to avoid edge chipping. With this approach, and a mix of other techniques that will be subsequently discussed, the optical seams can be reduced to 1-5 mm width.

A primary goal of the present invention is to produce high quality low-parallax panoramic images from an improved multi-camera panoramic capture device (300 or 500). This broad goal can be enabled by developing a systemic range of design strategies to inform both the optical and opto-mechanical lens design efforts, and the opto-mechanical device design and fabrication efforts, as well as strategies for improved image capture and processing. This goal can also be enabled by providing for both initial and ongoing camera and device calibration. In broad terms, the image processing or rendering of images is a method to generate quality images from the raw captured image data that depends on the camera intrinsics (geometric factors such as focal length and distortion), the camera extrinsics (geometric factors such as camera orientation to object space), other camera parameters such as vignetting and transmission, and illumination parameters such as color and directionality. With respect to an improved multi-camera panoramic capture device 300, the use of fiducials in determining and tracking a center pixel or an image centroid, exposure correction, and knowledge of the camera intrinsics for any given camera 320 in a device, are all assists towards completing reliable and repeatable tiling of images obtained from a plurality of adjacent cameras. Thus the subsequent discussions are broadly focused on providing optical (camera or objective lens) designs that can enable the desired image quality, as well as camera and device assembly approaches, management of key tolerances, camera calibration, knowledge of camera intrisincs and extriniscs, and other factors that can likewise affect the resultant device performance. The improved panoramic multi-camera capture devices of the present invention can be used to support a wide variety of applications or markets, including cinematic image capture, augmented reality or virtual reality (VR) image capture, surveillance or security imaging, sports or event imaging, mapping or photogrammetry, vehicular navigation, and robotics.

Before exploring opto-mechanical means for enabling improved panoramic multi-camera capture devices (300 or 500), means for providing cameras 120 that are improved for use in these systems are developed. Accordingly, the goals include providing improved cameras (320) having both reduced parallax errors and image overlap. As one aspect of the present approach, a goal is to reduce the residual parallax error for the edge chief rays collected respectively by each camera in an adjacent pair. The parallax error is defined as the change in parallax with respect to object distance (e.g., that the chief ray trajectory with respect to a near distance (e.g., 3 feet) from the device, versus a far distance (e.g., 1 mile), is slightly different). For example, as one goal or target for reduced parallax, or to have effectively no parallax error, or to be "parallax-free", is that the chief rays of adjacent cameras should deviate from parallelism to each other by ≤0.5-2.0 deg., and preferably by ≤0.01-0.1 deg. Alternately, or equivalently, the parallax error, as assessed as a perspective error in terms of location on the image plane, should be reduced to ≤2 pixels, and preferably to ≤0.5 pixel. As another aspect of the present approach, the width of the seams 160 between adjacent cameras (e.g., 120, 320) assembled into their own lens housings are to be reduced. The goal is to reduce the width of the seams, both in terms of their absolute physical width, and their optical width or an effective width. For example, a goal is to reduce a seam 160 between adjacent outer lens elements 137 to having a maximum gap or an actual physical seam width in a range of only 0.5-3.0 mm, and to then reduce the maximum optical seam width to a range of about only 1-6 mm. As an example, these reduced seams widths can translate to a reduced angular extent of lost FOV of only 0.25-1.0°, or a number of "lost" pixels of only 2-20 pixels. For example, for a device providing 8 k pixels around a 360-degree panorama equirectangular image, a loss of only 2-4 pixels at the seams can be acceptable as the residual image artifacts can be difficult to perceive. The actual details or numerical targets for effectively no-parallax error, or for the maximum optical seam width, depend on many factors including the detailed opto-mechanical designs of the improved cameras (320) and overall device (300), management of tolerances, possible allowances for a center offset distance or an amount of extended FOV (215) and the targets for low parallax therein, and the overall device specifications (e.g., diameter, sensor resolution or used sensor pixels within an imaged FOV or a Core FOV 205 (FIG. 7)). Further goals, enabled by some combination of the above improvements, are for each camera to reliably and quickly provide output images from an embedded sensor package that are cropped down to provide core FOV images, and then that each cropped image can be readily seamed or tiled with cropped images provided by adjacent cameras, so as to readily provide panoramic output images from an improved multi-camera capture device (300) in real time.

Figure 13:
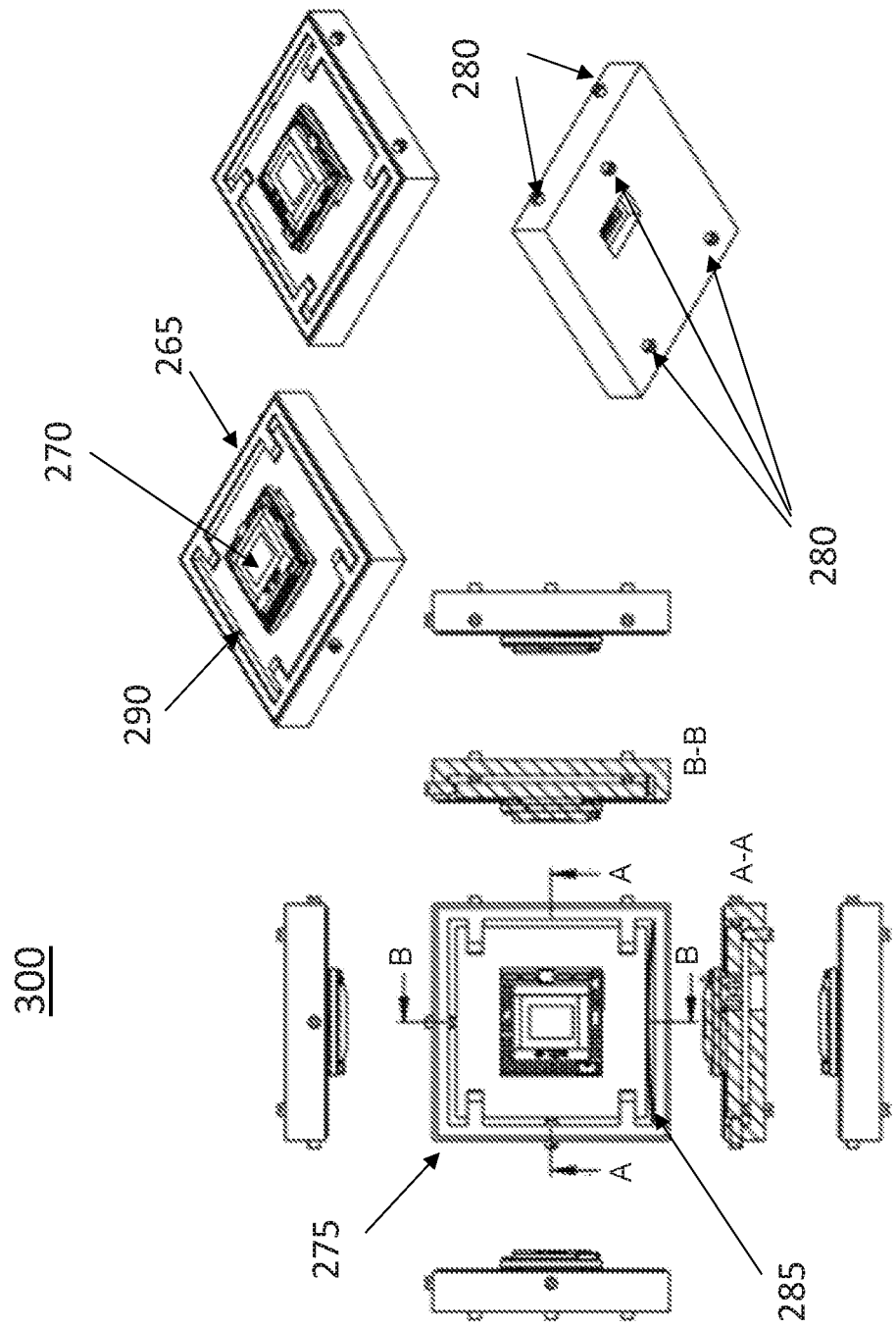
FIG. 13 depicts the sensor area of a camera channel, including mounts and adjustment features.
Figure 15:
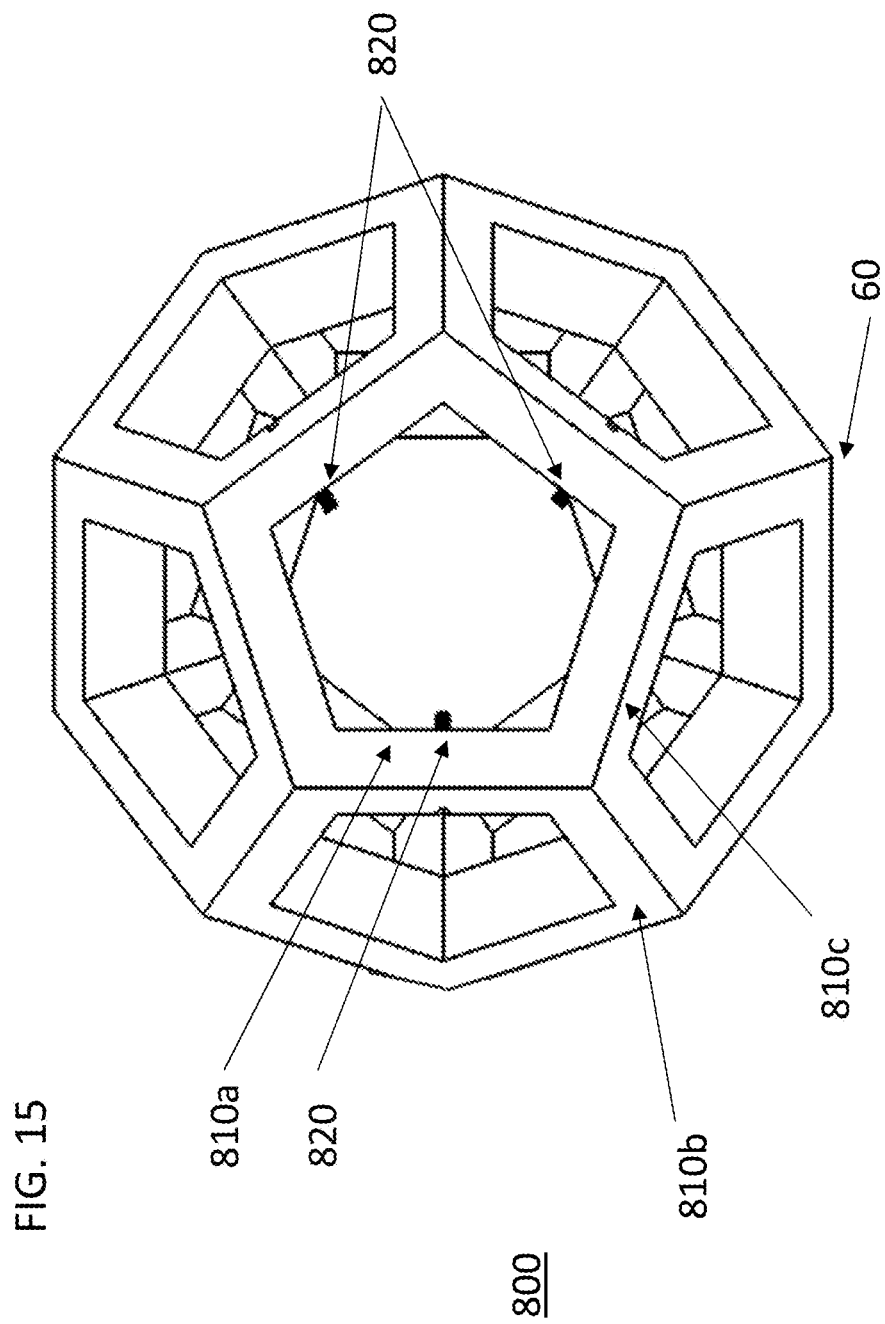
FIG. 15 depicts a view of an approach for the mounting the camera channels to a central support.

An improved panoramic multi-camera capture device 300, such as that of FIG. 13 and FIG. 15, can have a plurality of cameras arranged around a circumference of a sphere to capture a 360-degree annular FOV. Alternately, a panoramic multi-camera capture device can have a plurality of cameras arranged around a spherical or polyhedral shape. A polyhedron is a three-dimensional solid consisting of a collection of polygons that are contiguous at the edges. One polyhedral shape, as shown in FIG. 4, is that of a dodecahedron 50, which has 12 sides or faces, each shaped as a regular pentagon 55, and 20 vertices or corners (e.g., a vertex 60). A panoramic multi-camera capture device formed to the dodecahedron shape has cameras with a pentagonally shaped outer lens elements that nominally image a 69.1° full width field of view. Another shape is that of a truncated icosahedron, like a soccer ball, which as is also shown in FIG. 4, and has a combination of 12 regular pentagonal sides or faces, 20 regular hexagonal sides or faces, 60 vertices, and 90 edges. More complex shapes, with many more sides, such as regular polyhedra, Goldberg polyhedra, or shapes with octagonal sides, or even some irregular polyhedral shapes, can also be useful. For example, a Goldberg chamfered dodecahedron is similar to the truncated icosahedron, with both pentagonal and hexagonal facets, totaling 42 sides. But in general, the preferred polyhedrons for the current purpose have sides or faces that are hexagonal or pentagonal, which are generally roundish shapes with beveled edges 132 meeting at obtuse corners. Other polyhedral shapes, such as an octahedron or a regular icosahedron can be used, although they have triangular facets. Polyhedral facets with more abrupt or acute corners, such as square or triangular faces, can be easier to fabricate, as compared to facets with pentagonal and or hexagonal facets, as they have fewer edges to cut to provide polygonal edges on the outermost lens element, so as to define a captured polygonal FOV. However, greater care can then be needed in cutting, beveling, and handling the optic because of those acute corners. Additionally, for lens facets with large FOVs and acute facet angles, it can be more difficult to design the camera lenses and camera lens housings for optical and opto-mechanical performance. Typically, a 360° polyhedral camera will not capture a full spherical FOV as at least part of one facet is sacrificed to allow for support features and power and communications cabling, such as via a mounting post. However, if the device communicates wirelessly, and is also hung by a thin cable to a vertex, the FOV lost to such physical connections can be reduced.

As depicted in FIG. 1 and FIG. 2B, a camera channel 120 can resembles a frustum, or a portion thereof, where a frustum is a geometric solid (normally a cone or pyramid) that lies between one or two parallel planes that cut through it. In that context, a fan of chief rays 170 corresponding to a polygonal edge, can be refracted by an outer compressor lens element 137 to nominally match the frustum edges in polyhedral geometries.

To help illustrate some issues relating to camera geometry, FIG. 5A illustrates a cross-sections of a pentagonal lens 175 capturing a pentagonal FOV 177 and a hexagonal lens 180 capturing a hexagonal FOV 182, representing a pair of adjacent cameras whose outer lens elements have pentagonal and hexagonal shapes, as can occur with a truncated icosahedron, or soccer ball type panoramic multi-camera capture devices (e.g., 100, 300). The theoretical hexagonal FOV 182 spans a half FOV of 20.9°, or a full FOV of 41.8° ($\theta_1$) along the sides, although the FOV near the vertices is larger. The pentagonal FOV 177 supports 36.55° FOV ($\theta_2$) within a circular region, and larger FOVs near the corners or vertices. Notably, in this cross-section, the pentagonal FOV 177 is asymmetrical, supporting a 20-degree FOV on one side of an optical axis 185, and only a 16.5-degree FOV on the other side of the optical axis.

Optical lenses are typically designed using programs such as ZEMAX or Code V. Design success typically depends, in part, on selecting the best or most appropriate lens parameters, identified as operands, to use in the merit function. This is also true when designing a lens system for an improved low-parallax multi-camera panoramic capture device (300), for which there are several factors that affect performance (including, particularly parallax) and several parameters that can be individually or collectively optimized, so as to control it. One approach targets optimization of the "NP" point or more significantly, variants thereof.

As background, in the field of optics, there is a concept of the entrance pupil, which is a projected image of the aperture stop as seen from object space, or a virtual aperture which the imaged light rays from object space appear to propagate towards before any refraction by the first lens element. By standard practice, the location of the entrance pupil can be found by identifying a paraxial chief ray from object space 105, that transits through the center of the aperture stop, and projecting or extending its object space direction forward to the location where it hits the optical axis 185. In optics, incident Gauss or paraxial rays are understood to reside within an angular range ≤10° from the optical axis, and correspond to rays that are directed towards the center of the aperture stop, and which also define the entrance pupil position. Depending on the lens properties, the entrance pupil may be bigger or smaller than the aperture stop, and located in front of, or behind, the aperture stop.

By comparison, in the field of low-parallax cameras, there is a concept of a no-parallax (NP) point, or viewpoint center. Conceptually, the "NP Point" has been associated with a high FOV chief ray or principal ray incident at or near the outer edge of the outermost lens element, and projecting or extending its object space direction forward to the location where it hits the optical axis 185. For example, depending on the design, camera channels in a panoramic multi-camera capture device can support half FOVs with non-paraxial chief rays at angles >31° for a dodecahedron type system (FIG. 4) or >20° for a truncated icosahedron type system (see FIG. 4 and FIG. 5A). This concept of the NP point projection has been applied to the design of panoramic multi-camera capture devices, relative to the expectations for chief ray propagation and parallax control for adjacent optical systems (cameras). It is also stated that if a camera is pivoted about the NP point, or a plurality of camera's appear to rotate about a common NP point, then parallax errors will be reduced, and images can be aligned with little or no parallax error or perspective differences. But in the field of low parallax cameras, the NP point has also been equated to the entrance pupil, and the axial location of the entrance pupil that is estimated using a first order optics tangent relationship between a projection of a paraxial field angle and the incident ray height at the first lens element (see FIGS. 2A, 2B).

Thus, confusingly, in the field of designing of low-parallax cameras, the NP point has also been previously associated with both with the projection of edge of FOV chief rays and the projection of chief rays that are within the Gauss or paraxial regime. As will be seen, in actuality, they both have value. In particular, an NP point associated with the paraxial entrance pupil can be helpful in developing initial specifications for designing the lens, and for describing the lens. An NP point associated with non-paraxial edge of field chief rays can be useful in targeting and understanding parallax performance and in defining the conical volume or frustum that the lens assembly can reside in.

The projection of these non-paraxial chief rays can miss the paraxial chief ray defined entrance pupil because of both lens aberrations and practical geometry related factors associated with these lens systems. Relative to the former, in a well-designed lens, image quality at an image plane is typically prioritized by limiting the impact of aberrations on resolution, telecentricity, and other attributes. Within a lens system, aberrations at interim surfaces, including the aperture stop, can vary widely, as the emphasis is on the net sums at the image plane. Aberrations at the aperture stop are often somewhat controlled to avoid vignetting, but a non-paraxial chief ray need not transit the center of the aperture stop or the projected paraxially located entrance pupil.

To expand on these concepts, and to enable the design of improved low parallax lens systems, it is noted that the camera lens system 120 in FIG. 2A depicts both a first NP point 190A, corresponding to the entrance pupil as defined by a vectoral projection of paraxial chief rays from object space 105, and an offset second NP point 190B, corresponding to a vectoral projection of a non-paraxial chief rays from object space. Both of these ray projections cross the optical axis 185 in locations behind both the lens system and the image plane 150. As will be subsequently discussed, the ray behavior in the region between and proximate to the projected points 190A and 190B can be complicated and neither projected location or point has a definitive value or size. A projection of a chief ray will cross the optical axis at a point, but a projection of a group of chief rays will converge towards the optical axis and cross at different locations, that can be tightly clustered (e.g., within a few or tens of microns), where the extent or size of that "point" can depends on the collection of proximate chief rays used in the analysis. Whereas, when designing low parallax imaging lenses that image large FOVs, the axial distance or difference between the NP points 190A and 190B that are provided by the projected paraxial and non-paraxial chief rays can be significantly larger (e.g., millimeters). Thus, as will also be discussed, the axial difference represents a valuable measure of the parallax optimization (e.g., a low parallax volume 188) of a lens system designed for the current panoramic capture devices and applications. As will also be seen, the design of an improved device (300) can be optimized to position the geometric center of the device, or device center 196, outside, but proximate to this low parallax volume 188, or alternately within it, and preferably proximate to a non-paraxial chief ray NP point.

As one aspect, FIG. 5A depicts the projection of the theoretical edge of the fields of view (FOV edges 155), past the outer lens elements (lenses 175 and 180) of two adjacent cameras, to provide lines directed to a common point (190). These lines represent theoretical limits of the complex "conical" opto-mechanical lens assemblies, which typically are pentagonally conical or hexagonally conical limiting volumes. Again, ideally, in a no-parallax multi-camera system, the entrance pupils or NP points of two adjacent cameras are co-located. But to avoid mechanical conflicts, the mechanics of a given lens assembly, including the sensor package, should generally not protrude outside a frustum of a camera system and into the conical space of an adjacent lens assembly. However, real lens assemblies in a multi-camera panoramic capture device are also separated by seams 160. Thus, the real chief rays 170 that are accepted at the lens edges, which are inside of both the mechanical seams and a physical width or clear aperture of a mounted outer lens element (lenses 175 and 180), when projected generally towards a paraxial NP point 190, can land instead at offset NP points 192, and be separated by an NP point offset distance 194.

This can be better understood by considering the expanded area A-A in proximity to a nominal or ideal point NP 190, as shown in detail in FIG. 5B. Within a hexagonal FOV 182, light rays that propagate within the Gauss or paraxial region (e.g., paraxial ray 173), and that pass through the nominal center of the aperture stop, can be projected to a nominal NP point 190 (corresponding to the entrance pupil), or to an offset NP point 190A at a small NP point difference or offset 193 from a nominal NP point 190. Whereas, the real hexagonal lens edge chief rays 170 associated with a maximum inscribed circle within a hexagon, can project to land at a common offset NP point 192A that can be at a larger offset distance (194A). The two adjacent cameras in FIGS. 5A,B also may or may not share coincident NP points (e.g., 190). Distance offsets can occur due to various reasons, including geometrical concerns between cameras (adjacent hexagonal and pentagonal cameras), geometrical asymmetries within a camera (e.g., for a pentagonal camera), or from limitations from the practical widths of seams 160, or because of the directionality difference amongst aberrated rays.

As just noted, there are also potential geometric differences in the projection of incident chief rays towards a simplistic nominal "NP point" (190). First, incident imaging light paths from near the corners or vertices or mid-edges (mid-chords) of the hexagonal or pentagonal lenses may or may not project to common NP points within the described range between the nominal paraxial NP point 190 and an offset NP point 192B. Also, as shown in FIG. 5B, just from the geometric asymmetry of the pentagonal lenses, the associated pair of edge chief rays 170 and 171 for the real accepted FOV, can project to different nominal NP points 192B that can be separated from both a paraxial NP point (190) by an offset distance 194B and from each other by an offset distance 194C.

As another issue, during lens design, the best performance typically occurs on axis, or near on axis (e.g., ≤0.3 field (normalized)), near the optical axis 185. In many lenses, good imaging performance, by design, often occurs at or near the field edges, where optimization weighting is often used to force compliance. The worst imaging performance can then occur at intermediate fields (e.g., 0.7-0.8 of a normalized image field height). Considering again FIG. 5A,B, intermediate off axis rays, from intermediate fields (θ) outside the paraxial region, but not as extreme as the edge chief rays (10°<θ<20.9°), can project towards intermediate NP points between a nominal NP point 190 and an offset NP point 192B. But other, more extreme off axis rays, particularly from the 0.7-0.8 intermediate fields, that are more affected by aberrations, can project to NP points at locations that are more or less offset from the nominal NP point 190 than are the edge of field offset NP points 192B. Accounting for the variations in lens design, the non-paraxial offset "NP" points can fall either before (closer to the lens) the paraxial NP point (the entrance pupil) as suggested in FIG. 5B, or after it (as shown in FIG. 2A).

This is shown in greater detail in FIG. 5C, which essentially illustrates a further zoomed-in region A-A of FIG. 5B, but which illustrates an impact from vectoral projected ray paths associated with aberrated image rays, that converge at and near the paraxial entrance pupil (190), for an imaging lens system that was designed and optimized using the methods of the present approach. In FIG. 5C, the projected ray paths of green aberrated image rays at multiple fields from a camera lens system converge within a low parallax volume 188 near one or more "NP" points. Similar illustrations of ray fans can also be generated for Red or Blue light. The projection of paraxial rays 173 can converge at or near a nominal paraxial NP point 190, or entrance pupil, located on a nominal optical axis 185 at a distance Z behind the image plane 150. The projection of edge of field rays 172, including chief rays 171, converge at or near an offset NP point 192B along the optical axis 185. The NP point 192B can be quantitatively defined, for example, as the center of mass of all edge of field rays 172. An alternate offset NP point 192A can be identified, that corresponds to a "circle of least confusion", where the paraxial, edge, and intermediate or mid-field rays, aggregate to the smallest spot. These different "NP" points are separated from the paraxial NP point by offset distances 194A and 194B, and from each other by an offset distance 194C. Thus, it can be understood that an aggregate "NP point" for any given real imaging lens assembly or camera lens that supports a larger than paraxial FOV, or an asymmetrical FOV, is typically not a point, but instead can be an offset low parallax (LP) smudge or volume 188.

Within a smudge or low parallax volume 188, a variety of possible optimal or preferred NP points can be identified. For example, an offset NP point corresponding to the edge of field rays 172 can be emphasized, so as to help provide improved image tiling. An alternate mid-field (e.g., 0.6-0.8) NP point (not shown) can also be tracked and optimized for. Also the size and position of the overall "LP" smudge or volume 188, or a preferred NP point (e.g., 192B) therein, can change depending on the lens design optimization. Such parameters can also vary amongst lenses, for one fabricated lens system of a given design to another, due to manufacturing differences amongst lens assemblies. Although FIG. 5C depicts these alternate offset "NP points" 192A,B for non-paraxial rays as being located after the paraxial NP point 190, or further away from the lens and image plane, other lenses of this type, optimized using the methods of the present approach, can be provided where similar non-paraxial NP points 192A,B that are located with a low parallax volume 188 can occur at positions between the image plane and the paraxial NP point.

Figure 5D:
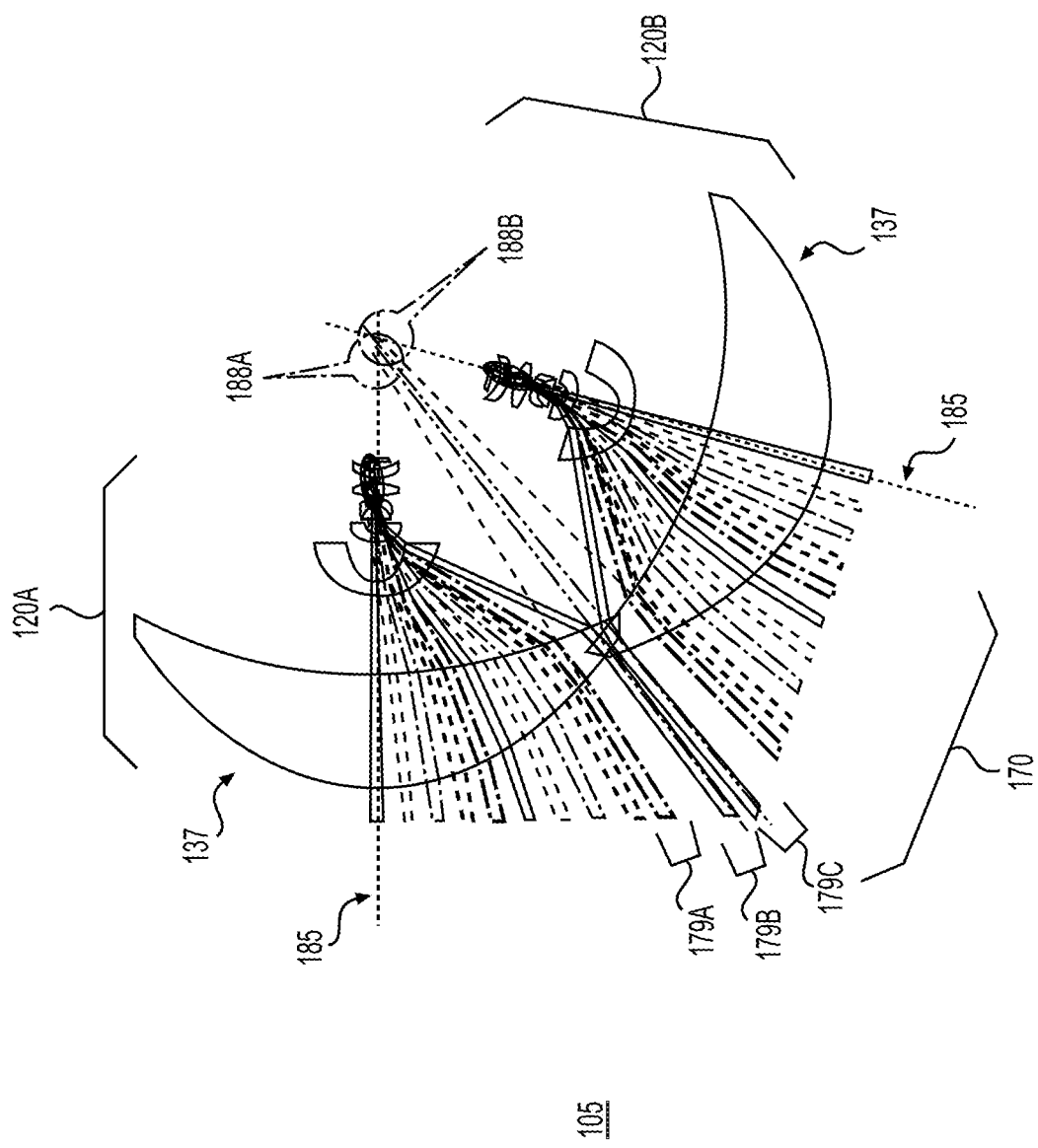
FIG. 5D depicts parallax differences for two adjacent cameras, relative to a center of perspective.

FIG. 5C also shows a location for a center of the low-parallax multi-camera panoramic capture device, device center 196. Based on optical considerations, an improved panoramic multi-camera capture device 300 can be preferably optimized to nominally position the device center 196 within the low parallax volume 188. Optimized locations therein can include being located at or proximate either of the offset NP points 192A or 192B, or within the offset distance 194B between them, so as to prioritize parallax control for the edge of field chief rays. The actual position therein depends on parallax optimization, which can be determined by the lens optimization relative to spherical aberration of the entrance pupil, or direct chief ray constraints, or distortion, or a combination thereof. By definition, pupil aberrations are the aberrations that would be observed at the exit (or entrance) pupil when an object is placed at the stop position or at the entrance (exit) pupil of an optical system. For example, whether the spherical aberration is optimized to be over corrected or under corrected, and how weightings on the field operands in the merit function are used, can affect the positioning of non-paraxial "NP" points for peripheral fields or mid fields. The "NP" point positioning can also depend on the management of fabrication tolerances and the residual variations in lens system fabrication. The device center 196 can also be located proximate to, but offset from the low parallax volume 188, by a center offset distance 198. This approach can also help tolerance management and provide more space near the device center 196 for cables, circuitry, cooling hardware, and the associated structures. In such case, the adjacent cameras 120 can then have offset low parallax volumes 188 of "NP" points (FIG. 5D), instead of coincident ones (FIGS. 5A, B). In this example, if the device center 196 is instead located at or proximate to the paraxial entrance pupil, NP point 190, then effectively one or more of the outer lens elements 137 of the cameras 120 are undersized and the desired full FOVs are not achievable. FIG. 9C depicts the possible positioning of a similar lens system 920 with respect to an offset device center 910.

Thus, while the no-parallax (NP) point is a useful concept to work towards, and which can valuably inform panoramic image capture and systems design, and aid the design of low-parallax error lenses, it is idealized, and its limitations must also be understood. Considering this discussion of the NP point(s) and LP smudges, in enabling an improved low-parallax multi-camera panoramic capture device (lens design example to follow; device 300 of FIG. 9B), it is important to understand ray behavior in this regime, and to define appropriate parameters or operands to optimize, and appropriate target levels of performance to aim for. In the latter case, for example, a low parallax lens with a track length of 65-70 mm can be designed for in which the LP smudge is as much as 10 mm wide (e.g., offset distance 194A). But alternate lens designs, for which this parameter is further improved, can have a low parallax volume 188 with a longitudinal LP smudge width or width along the optical axis (offset 194A) of a few millimeters or less.

The width and location of the low parallax volume 188, and the vectoral directions of the projections of the various chief rays, and their NP point locations within a low parallax volume, can be controlled during lens optimization by a method using operands associated with a fan of chief rays 170 (e.g., FIGS. 2A,B). But the LP smudge or LP volume 188 of FIG. 5C can also be understood as being a visualization of the transverse component of spherical aberration of the entrance pupil, and this parameter can be used in an alternate, but equivalent, design optimization method to using chief ray fans. In particular, during lens optimization, using Code V for example, the lens designer can create a special user defined function or operand for the transverse component (e.g., ray height) of spherical aberration of the entrance pupil, which can then be used in a variety of ways. For example, an operand value can be calculated as a residual sum of squares (RSS) of values across the whole FOV or across a localized field, using either uniform or non-uniform weightings on the field operands. In the latter case of localized field preferences, the values can be calculated for a location at or near the entrance pupil, or elsewhere within a low parallax volume 188, depending on the preference towards paraxial, mid, or peripheral fields. An equivalent operand can be a width of a circle of least confusion in a plane, such as the plane of offset NP point 192A or that of offset NP 192B, as shown in FIG. 5C. The optimization operand can also be calculated with a weighting to reduce or limit parallax error non-uniformly across fields, with a disproportionate weighting favoring peripheral or edge fields over mid-fields. Alternately, the optimization operand can be calculated with a weighting to provide a nominally low parallax error in a nominally uniform manner across all fields (e.g., within or across a Core FOV 205, as in FIG. 7). That type of optimization may be particularly useful for mapping applications.

Whether the low-parallax lens design and optimization method uses operands based on chief rays or spherical aberration of the entrance pupil, the resulting data can also be analyzed relative to changes in imaging perspective. In particular, parallax errors versus field and color can also be analyzed using calculations of the Center of Perspective (COP), which is a parameter that is more directly relatable to visible image artifacts than is a low parallax volume, and which can be evaluated in image pixel errors or differences for imaging objects at two different distances from a camera system. The center of perspective error is essentially the change in a chief ray trajectory given multiple object distances—such as for an object at a close distance (3 ft), versus another at "infinity".

In drawings and architecture, perspective, is the art of drawing solid objects on a two-dimensional surface so as to give a correct impression of their height, width, depth, and position in relation to each other when viewed from a particular point. For example, for illustrations with linear or point perspective, objects appear smaller as their distance from the observer increases. Such illustrated objects are also subject to foreshortening, meaning that an object's dimensions along the line of sight appear shorter than its dimensions across the line of sight. Perspective works by representing the light that passes from a scene through an imaginary rectangle (realized as the plane of the illustration), to a viewer's eye, as if the viewer were looking through a window and painting what is seen directly onto the windowpane.

Perspective is related to both parallax and stereo perception. In a stereoscopic image capture or projection, with a pair of adjacent optical systems, perspective is a visual cue, along with dual view parallax, shadowing, and occlusion, that can provide a sense of depth. As noted previously, parallax is the visual perception that the position or direction of an object appears to be different when viewed from different positions. In the case of image capture by a pair of adjacent cameras with at least partially overlapping fields of view, parallax image differences are a cue for stereo image perception, or are an error for panoramic image assembly.

To capture images with an optical system, whether a camera or the human eye, the optical system geometry and performance impacts the utility of the resulting images for low parallax (panoramic) or high parallax (stereo) perception. In particular, for an ideal lens, all the chief rays from object space point exactly towards the center of the entrance pupil, and the entrance pupil is coincident with the center of perspective (COP) or viewpoint center for the resulting images. There are no errors in perspective or parallax for such an ideal lens.

But for a real lens, having both physical and image quality limitations, residual parallax errors can exist. As stated previously, for a real lens, a projection of the paraxial chief rays from the first lens element, will point towards a common point, the entrance pupil, and its location can be determined as an axial distance from the front surface of that first element. Whereas, for a real lens capturing a FOV large enough to include non-paraxial chief rays, the chief rays in object space can point towards a common location or volume near, but typically offset from, the center of the entrance pupil. These chief rays do not intrinsically coincide at a single point, but they can be directed through a small low parallax volume 188 (e.g., the LP "smudge") by appropriate lens optimization. The longitudinal or axial variation of rays within the LP smudge can be determined from the position a chief ray crosses the optic axis. The ray errors can also be measured as a transverse width or axial position of the chief rays within an LP smudge.

The concept of parallax correction, with respect to centers of perspective, is illustrated in FIG. 5D. A first camera lens 120A collects and images light from object space 105 into at least a Core FOV, including light from two outer ray fans 179A and 179B, whose chief ray projections converge towards a low parallax volume 188A. These ray fans can correspond to a group of near edge or edge of field rays 172, as seen in FIG. 2B or FIG. 5C. As was shown in FIG. 5C, within an LP volume 188, the vectoral projection of such rays from object space, generally towards image space, can cross the optical axis 185 beyond the image plane, at or near an alternate NP point 192B that can be selected or preferred because it favors edge of field rays. However, as is also shown in FIG. 5C, such edge of field rays 172 need not cross the optical axis 185 at exactly the same point. Those differences, when translated back to object space 105, translate into small differences in the parallax or perspective for imaged ray bundles or fans within or across an imaged FOV (e.g., a Core FOV 205, as in FIG. 7) of a camera lens.

A second, adjacent camera lens 120B, shown in FIG. 5D, can provide a similar performance, and image a fan of chief rays 170, including ray fan 179C, from within a Core FOV 205 with a vectoral projection of these chief rays converging within a corresponding low parallax volume 188B. LP volumes 188A and 188B can overlap or be coincident, or be offset, depending on factors including the camera geometries and the seams between adjacent cameras, or lens system fabrication tolerances and compensators, or on whether the device center 196 is offset from the LP volumes 188. The more overlapped or coincident these LP volumes 188 are, the more overlapped are the centers of perspective of the two lens systems. Ray Fan 179B of camera lens 120A and ray fan 179C of camera lens 120B are also nominally parallel to each other; e.g., there is no parallax error between them. However, even if the lens designs allow very little residual parallax errors at the FOV edges, fabrication variations between lens systems can increase the differences.

Analytically, the chief ray data from a real lens can also be expressed in terms of perspective error, including chromatic errors, as a function of field angle. Perspective error can then be analyzed as a position error at the image between two objects located at different distances or directions. Perspective errors can depend on the choice of COP location, the angle within the imaged FOV, and chromatic errors. For example, it can be useful to prioritize a COP so as to minimize green perspective errors. Perspective differences or parallax errors can be reduced by optimizing a chromatic axial position ($\Delta z$) or width within an LP volume 188 related to a center of perspective for one or more field angles within an imaged FOV. The center of perspective can also be graphed and analyzed as a family of curves, per color, of the Z (axial) intercept position (distance in mm) versus field angle. Alternately, to get a better idea of what a captured image will look like, the COP can be graphed and analyzed as a family of curves for a camera system, as a parallax error in image pixels, per color, versus field.

Figure 7:
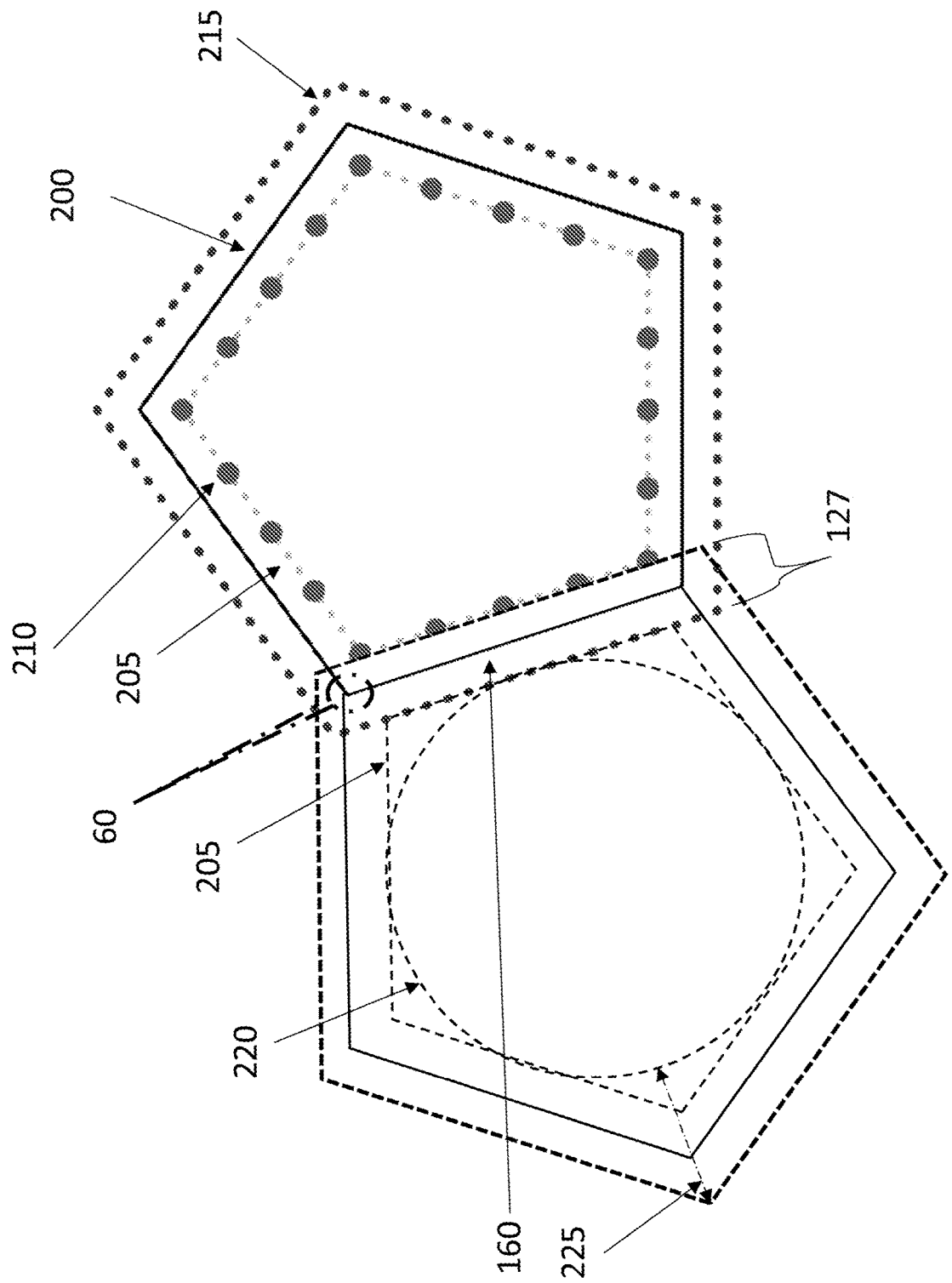
FIG. 7 depicts fields of view for adjacent cameras, including both Core and Extended fields of view (FOV), both of which can be useful for the design of an optimized panoramic multi-camera capture device.

During the design or a camera lens systems, a goal can be to limit the parallax error to a few pixels or less for imaging within a Core FOV 205 (FIG. 7). Alternately, it can be preferable to particularly limit parallax errors in the peripheral fields, e.g., for the outer edges of a Core FOV and for an Extended FOV region (if provided). If the residual parallax errors for a camera are thus sufficiently small, then the parallax differences seen as a perspective error between two adjacent cameras near their shared seam 160, or within a seam related region of extended FOV overlap imaging, can likewise be limited to several pixels or less (e.g., ≤3-4 pixels). Depending on the lens design, device design, and application, it can be possible and preferable to reduce parallax errors for a lens system further, as measured by perspective error, to ≤0.5 pixel for an entire Core FOV, the peripheral fields, or both. If these residual parallax errors for each of two adjacent cameras are small enough, images can be acquired, cropped, and readily tiled, while compensating for or hiding image artifacts from any residual seams 160 or blind regions 165.

In pursuing the design of a panoramic camera of the type of that of FIG. 1, but to enable an improved low-parallax multi-camera panoramic capture device (300), having multiple adjacent cameras, the choices of lens optimization methods and parameters can be important. A camera lens 120, or system of lens elements 135, like that of FIG. 2A, can be used as a starting point. The camera lens has compressor lens element(s), and inner lens elements 140, the latter of which can also be defined as consisting of a pre-stop wide angle lens group, and a post-stop eyepiece-like lens group. In designing such lenses to reduce parallax errors, it can be valuable to consider how a fan of paraxial to non-paraxial chief rays 125 (see FIG. 2A), or a fan of edge chief rays 170 (see FIG. 2B), or localized collections of edge of field rays 172 (see FIG. 5C) or 179 A,B (see FIG. 5D) are imaged by a camera lens assembly. It is possible to optimize the lens design by using a set of merit function operands for a collection or set (e.g., 31 defined rays) of chief rays, but the optimization process can then become cumbersome. As an alternative, in pursuing the design of an improved low-parallax multi-camera panoramic capture device (300), it was determined that improved performance can also be obtained by using a reduced set of ray parameters or operands that emphasizes the transverse component of spherical aberration at the entrance pupil, or at a similar selected surface or location (e.g., at an offset NP point 192A or 192B) within an LP smudge volume 188 behind the lens system. Optimization for a transverse component of spherical aberration at an alternate non-paraxial entrance pupil can be accomplished by using merit function weightings that emphasize the non-paraxial chief rays.

As another aspect, in a low-parallax multi-camera panoramic capture device, the fans of chief rays 170 that are incident at or near a beveled edge of an outer lens element of a camera 120 (see FIG. 2B) should be parallel to a fan of chief rays 170 that are incident at or near an edge 132 of a beveled surface of the outer lens element of an adjacent camera (see FIG. 1). It is noted that an "edge" of an outer lens element 137 or compressor lens is a 3-dimensional structure (see FIG. 2B), that can have a flat edge cut through a glass thickness, and which is subject to fabrication tolerances of that lens element, the entire lens assembly, and housing 130, and the adjacent seam 160 and its structures. The positional definition of where the beveled edges are cut into the outer lens element depends on factors including the material properties, front color, distortion, parallax correction, tolerances, and an extent of any extra extended FOV 215. An outer lens element 137 becomes a faceted outer lens element when beveled edges 132 are cut into the lens, creating a set of polygonal shaped edges that nominally follow a polygonal pattern (e.g., pentagonal or hexagonal).

A camera system 120 having an outer lens element with a polygonal shape that captures incident light from a polygonal shaped field of view can then form a polygonal shaped image at the image plane 150, wherein the shape of the captured polygonal field of view nominally matches the shape of the polygonal outer lens element. The cut of these beveled edges for a given pair of adjacent cameras can affect both imaging and the optomechanical construction at or near the intervening seam 160.

Figure 5E:
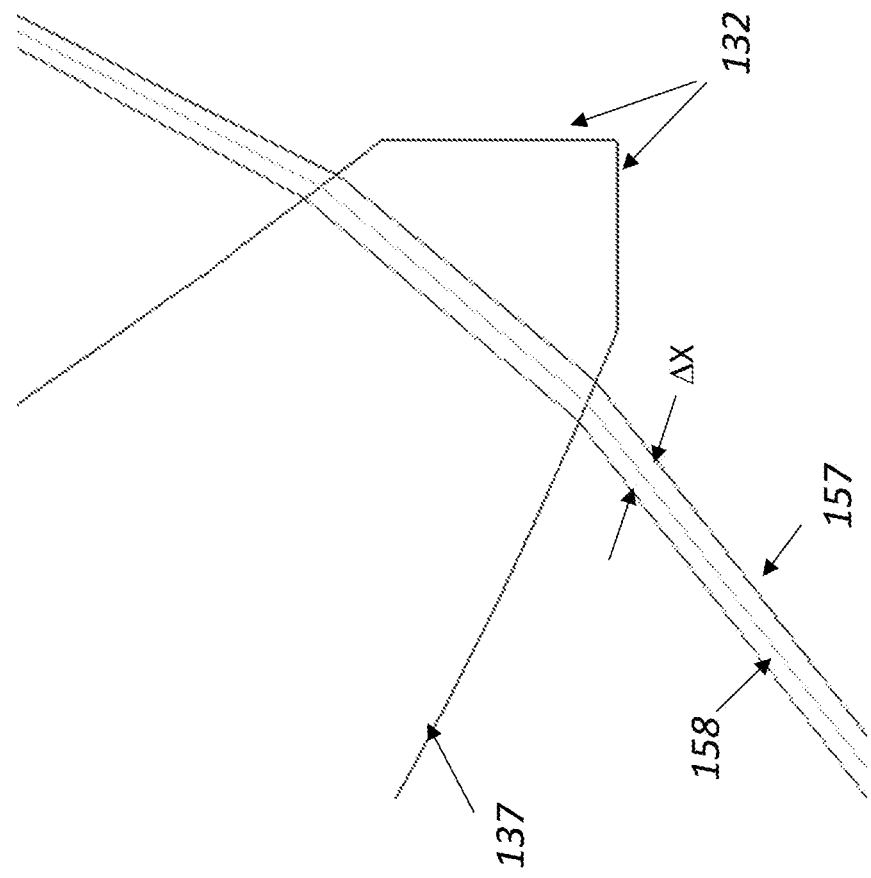
FIG. 5E depicts front color at an edge of an outer compressor lens element.

As another aspect, FIG. 5E depicts "front color", which is a difference in the nominal ray paths by color versus field, as directed to an off axis or edge field point. Typically, for a given field point, the blue light rays are the furthest offset. As shown in FIG. 5E, the accepted blue ray 157 on a first lens element 137 is $\Delta X \approx 1$ mm further out than the accepted red ray 158 directed to the same image field point. If the lens element 137 is not large enough, then this blue light can be clipped or vignetted and a color shading artifact can occur at or near the edges of the imaged field. Front color can appear in captured image content as a narrow rainbow-like outline of the polygonal FOV or the polygonal edge of an outer compressor lens element 437 which acts as a field stop for the optical system. Localized color transmission differences that can cause front color related color shading artifacts near the image edges can be caused by differential vignetting at the beveled edges of the outer compressor lens element 137, or from edge truncation at compressor lens elements 340 (FIG. 9B), or through the aperture stop 145. During lens design optimization to provide an improved camera lens (320), front color can be reduced (e.g., to $\Delta X \leq 0.5$ mm width) as part of the chromatic correction of the lens design, including by glass selection within the compressor lens group or the entire lens design, or as a trade-off in the correction of lateral color. The effect of front color on captured images can also be reduced optomechanically, by also designing an improved camera lens (320) to have an extended FOV 215 (FIG. 7), and the opto-mechanics to push straight cut or beveled lens edges 132 at or beyond the edge of the extended FOV 215, so that any residual front color occurs outside the core FOV 220. The front color artifact can then be eliminated during an image cropping step during image processing. The impact of front color or lateral color can also be reduced by a spatially variant color correction during image processing. As another option, an improved camera lens (320) can have a color dependent aperture at or near the aperture stop, that can, for example, provide a larger transmission aperture (diameter) for blue light than for red or green light.

Optical performance at or near the seams can be understood, in part, relative to distortion (FIG. 6) and a set of defined fields of view (FIG. 7). In particular, FIG. 7 depicts potential sets of fields of view for which potential image light can be collected by two adjacent cameras. As an example, a camera with a pentagonally shaped outer lens element, whether associated with a dodecahedron or truncated icosahedron or other polygonal lens camera assembly, with a seam 160 separating it from an adjacent lens or camera channel, can image an ideal FOV 200 that extends out to the vertices (60) or to the polygonal edges of the frustum or conical volume that the lens resides in. However, because of the various physical limitations that can occur at the seams, including the finite thicknesses of the lens housings, the physical aspects of the beveled lens element edges, mechanical wedge, and tolerances, a smaller core FOV 205 of transiting image light can actually be imaged. The coated clear aperture for the outer lens elements 137 should encompass at least the core FOV 205 with some margin (e.g., 0.5-1.0 mm). As the lens can be fabricated with AR coatings before beveling, the coatings can extend out to the seams. The core FOV 205 can be defined as the largest low parallax field of view that a given real camera 120 can image. Equivalently, the core FOV 205 can be defined as the sub-FOV of a camera channel whose boundaries are nominally parallel to the boundaries of its' polygonal cone (see FIGS. 5A and 5B). Ideally, with small seams 160, and proper control and calibration of FOV pointing, the nominal Core FOV 205 approaches or matches the ideal FOV 200 in size.

During a camera alignment and calibration process, a series of image fiducials 210 can be established along one or more of the edges of a core FOV 205 to aid with image processing and image tiling or mosaicing. The resulting gap between a core FOV 205 supported by a first camera and that supported by an adjacent camera can result in blind regions 165 (FIG. 5A, B). To compensate for the blind regions 165, and the associated loss of image content from a scene, the cameras can be designed to support an extended FOV 215, which can provide enough extra FOV to account for the seam width and tolerances, or an offset device center 196. As shown in FIG. 7, the extended FOV 215 can extend far enough to provide overlap 127 with an edge of the core FOV 205 of an adjacent camera, although the extended FOVs 215 can be larger yet. This limited image overlap can result in a modest amount of image resolution loss, parallax errors, and some complications in image processing as were previously discussed with respect to FIG. 3, but it can also help reduce the apparent width of seams and blind regions. However, if the extra overlap FOV is modest (e.g., $\leq 5\%$) and the residual parallax errors therein are small enough (e.g. $\leq 0.75$ pixel perspective error), as provided by the present approach, then the image processing burden can be very modest. Image capture out to an extended FOV 215 can also be used to enable an interim capture step that supports camera calibration and image corrections during the operation of an improved panoramic multi-camera capture device 300. FIG. 7 also shows an inscribed circle within one of the FOV sets, corresponding to a subset of the core FOV 205, that is the common core FOV 220 that can be captured in all directions from that camera. The angular width of the common core FOV 220 can be useful as a quick reference for the image capacity of a camera. An alternate definition of the common core FOV 220 that is larger, to include the entire core FOV 205, can also be useful. The dashed line (225) extending from the common core FOV 220 or core FOV 205, to beyond the ideal FOV 200, to nominally include the extended FOV 215, represents a region in which the lens design can support careful mapping of the chief or principal rays or control of spherical aberration of the entrance pupil, so as to enable low-parallax error imaging and easy tiling of images captured by adjacent cameras.

Across a seam 160 spanning the distance between two adjacent usable clear apertures between two adjacent cameras, to reduce parallax and improve image tiling, it can be advantageous if the image light is captured with substantial straightness, parallelism, and common spacing over a finite distance. The amount of FOV overlap needed to provide an extended FOV and limit blind regions can be determined by controlling the relative proximity of the entrance pupil (paraxial NP point) or an alternate preferred plane within a low parallax volume 188 (e.g., to emphasize peripheral rays) to the device center 196 (e.g., to the center of a dodecahedral shape). The amount of Extended FOV 215 is preferably 5% or less (e.g., $\leq 1.8°$ additional field for a nominal Core FOV of 37.5°), such that a camera's peripheral fields are then, for example, ~0.85-1.05). If spacing constraints at the device center, and fabrication tolerances, are well managed, the extended FOV 215 can be reduced to ≤1% additional field. Within an extended FOV 215, parallax should be limited to the nominal system levels, while both image resolution and relative illumination remain satisfactory. The parallax optimization to reduce parallax errors can use either chief ray or pupil aberration constraints, and targeting optimization for a high FOV region (e.g., 0.85-1.0 field), or beyond that to include the extra camera overlap regions provided by an extended FOV 215 (e.g., FIG. 7, a fractional field range of ~0.85-1.05).

In addition, in enabling an improved low-parallax multi-camera panoramic capture device (300), with limited parallax error and improved image tiling, it can be valuable to control image distortion for image light transiting at or near the edges of the FOV, e.g., the peripheral fields, of the outer lens element. In geometrical optics, distortion is a deviation from a preferred condition (e.g., rectilinear projection) that straight lines in a scene remain straight in an image. It is a form of optical aberration, which describes how the light rays from a scene are mapped to the image plane. In general, in lens assemblies used for image capture, for human viewing it is advantageous to limit image distortion to a maximum of +/−2%. In the current application, for tiling or combining panoramic images from images captured by adjacent cameras, having a modest distortion of ≤2% can also be useful. As a reference, in barrel distortion, the image magnification decreases with distance from the optical axis, and the apparent effect is that of an image which has been mapped around a sphere (or barrel). Fisheye lenses, which are often used to take hemispherical or panoramic views, typically have this type of distortion, as a way to map an infinitely wide object plane into a finite image area. Fisheye lens distortion (251) can be large (e.g., 15% at full field or 90° half width (HW)), as a deviation from f-theta distortion, although it is only a few percent for small fields (e.g., ≤30° HW). As another example, in laser printing or scanning systems, f-theta imaging lenses are often used to print images with minimal banding artifacts and image processing corrections for pixel placement. In particular, F-theta lenses are designed with a barrel distortion that yields a nearly constant spot or pixel size, and a pixel positioning that is linear with field angle θ, (h=f*θ).

Thus, improved low-parallax cameras 320 that capture half FOVs of ≤35-40° might have fisheye distortion 251, as the distortion may be low enough. However, distortion can be optimized more advantageously for the design of improved camera lens assemblies for use in improved low-parallax multi-camera panoramic capture devices (300). As a first example, as shown in FIG. 6, it can be advantageous to provide camera lens assemblies with a localized nominal f-theta distortion 250A at or near the edge of the imaged field. In an example, the image distortion 250 peaks at ~0.75 field at about 1%, and the lens design is not optimized to provide f-theta distortion 250 below ~0.85 field. However, during the lens design process, a merit function can be constrained to provide a nominally f-theta like distortion 250A or an approximately flat distortion 250B, for the imaged rays at or near the edge of the field, such as for peripheral fields spanning a fractional field range of ~0.9-1.0. This range of high fields with f-theta type or flattened distortion correction includes the fans of chief rays 170 or perimeter rays of FIG. 2B, including rays imaged through the corners or vertices 60, such as those of a lens assembly with a hexagonal or pentagonal outer lens element 137. Additionally, because of manufacturing tolerances and dynamic influences (e.g., temperature changes) that can apply to a camera 120, including both lens elements 135 and a housing 130, and to a collection of cameras 120 in a panoramic multi-camera capture device, it can be advantageous to extend the region of nominal f-theta or flattened distortion correction in peripheral fields to beyond the nominal full field (e.g., 0.85-1.05). This is shown in FIG. 6, where a region of reduced or flattened distortion extends beyond full field to ~1.05 field. In such a peripheral field range, it can be advantageous to limit the total distortion variation to ≤0.5% or less. Controlling peripheral field distortion keeps the image "edges" straight in the adjacent pentagonal shaped regions. This can allow more efficient use of pixels when tiling images, and thus faster image processing.

The prior discussion treats distortion in a classical sense, as an image aberration at an image plane. However, in low-parallax cameras, this residual distortion is typically a tradeoff or nominal cancelation of contributions from the compressor lens elements (137, or 340 and 345B,C in FIG. 9B) versus those of the aggregate inner lens elements (350 FIG. 9B). Importantly, the ray re-direction caused by the distortion contribution of the outer compressor lens element also affects both the imaged ray paths and the projected chief ray paths towards the low parallax volume. This in turn means that for the design of at least some low-parallax lenses, distortion optimization can affect parallax or edge of field NP point or center of perspective optimization.

The definitions of the peripheral fields or a fractional field range 225 of (e.g., ~0.85-1.05, or including ≤5% extra field), in which parallax, distortion, relative illumination, resolution, and other performance factors can be carefully optimized to aid image tiling, can depend on the device and camera geometries. As an example, for hexagonal shaped lenses and fields, the lower end of the peripheral fields can be defined as ~0.83, and for pentagonal lenses, ~0.8. Although FIG. 7 was illustrated for a case with two adjacent pentagon-shaped outer lens elements and FOV sets, the approach of defining peripheral fields and Extended FOVs to support a small region of overlapped image capture, can be applied to multi-camera capture device designs with adjacent pentagonal and hexagonal cameras, or to adjacent hexagonal cameras, or to cameras with other polygonal shapes or with adjacent edges of any shape or contour generally.

For an Extended FOV 215 to be functionally useful, the nominal image formed onto an image sensor that corresponds to a core FOV 205 needs to underfill the used image area of the image sensor, by at least enough to allow an extended FOV 215 to also be imaged. This can be done to help account for real variations in fabricated lens assemblies from the ideal, or for the design having an offset device center 196, as well as fabrication variations in assembling an improved low-parallax multi-camera panoramic capture device (300). But as is subsequently discussed, prudent mechanical design of the lens assemblies can impact both the imaged field of view of a given camera and the seams between the cameras, to limit mechanical displacements or wedge and help reduce parallax errors and FOV overlap or underlap. Likewise, tuning the image FOV (core FOV 205) size and position with compensators or with fiducials and image centroid tracking and shape tracking can help. Taken together in some combination, optimization of distortion and low or zero parallax imaging over extended peripheral fields, careful mechanical design to limit and compensate for component and assembly variations, and the use of corrective fiducials or compensators, can provide a superior overall systems solution. As a result, a captured image from a camera can readily be cropped down to the nominal size and shape expected for the nominal core FOV 205, and images from multiple cameras can then be mosaiced or tiled together to form a panoramic image, with reduced burdens on image post-processing. However, an extended FOV 215, if needed, should provide enough extra angular width (e.g., $\theta_1 \leq 5\%$ of the FOV) to match or exceed the expected wedge or tilt angle $\theta_2$, that can occur in the seams, $\theta_1 \geq \theta_2$.

In designing an improved imaging lens of the type that can be used in a low-parallax panoramic multi-camera capture device (100 or 300), several first order parameters can be calculated so as to inform the design effort. A key parameter is the target size of the frustum or conical volume, based on the chosen polygonal configuration (lens size (FOV) and lens shape (e.g., pentagonal)) and the sensor package size. Other key parameters that can be estimated include the nominal location of the paraxial entrance pupil, the focal lengths of the compressor lens group and the wide-angle lens group, and the FOV seen by the wide-angle group.

But the design optimization for an improved camera lens (320) for use in an improved low-parallax panoramic multi-camera capture devices (300) also depends on how the numerous other lens attributes and performance metrics are prioritized. In particular, the relevant system parameters can include the control of parallax or the center of perspective (COP) error at the edges of an imaged field or for inner field locations or both, as optimized using fans of chief rays or spherical aberration of the entrance pupil). These parameters are closely linked with other key parameters including the width and positions of the "LP smudge" or volume 188, the size of any center offset distance between the entrance pupil or LP smudge and the device center 196, the target width of the gaps or seams, the extent of blind regions 165, and the size of any marginal or extended FOV to provide overlap. The relevant performance metrics can include image resolution or MTF, distortion (particularly in the peripheral fields, and distortion of the first compressor lens element of the compressor lens group), lateral color, relative illumination, front color, and color vignetting, telecentricity, and ghosting. Other relevant design variables can include mechanical and materials parameters such as the number of compressor lens elements, the configuration of the compressor lens group, the wide-angle lens group and eyepiece lens group, glass choices, the allowed maximum size of the first compressor or outer lens element, the sensor package size, the track length, the nominal distance from the image plane to the nearest prior lens element (e.g., working distance), the nominal distance from the image plane to the entrance pupil, the nominal distance from the image plane or the entrance pupil to the polygonal center or device center, manufacturing tolerances and limits, and the use of compensators. But improved versions of panoramic multi-camera capture devices (500) of the type of FIG. 1, but using an outer faceted dome 510, that can provide yet smaller seams 570, and improved parallax performance, are also possible.

Figure 8A:
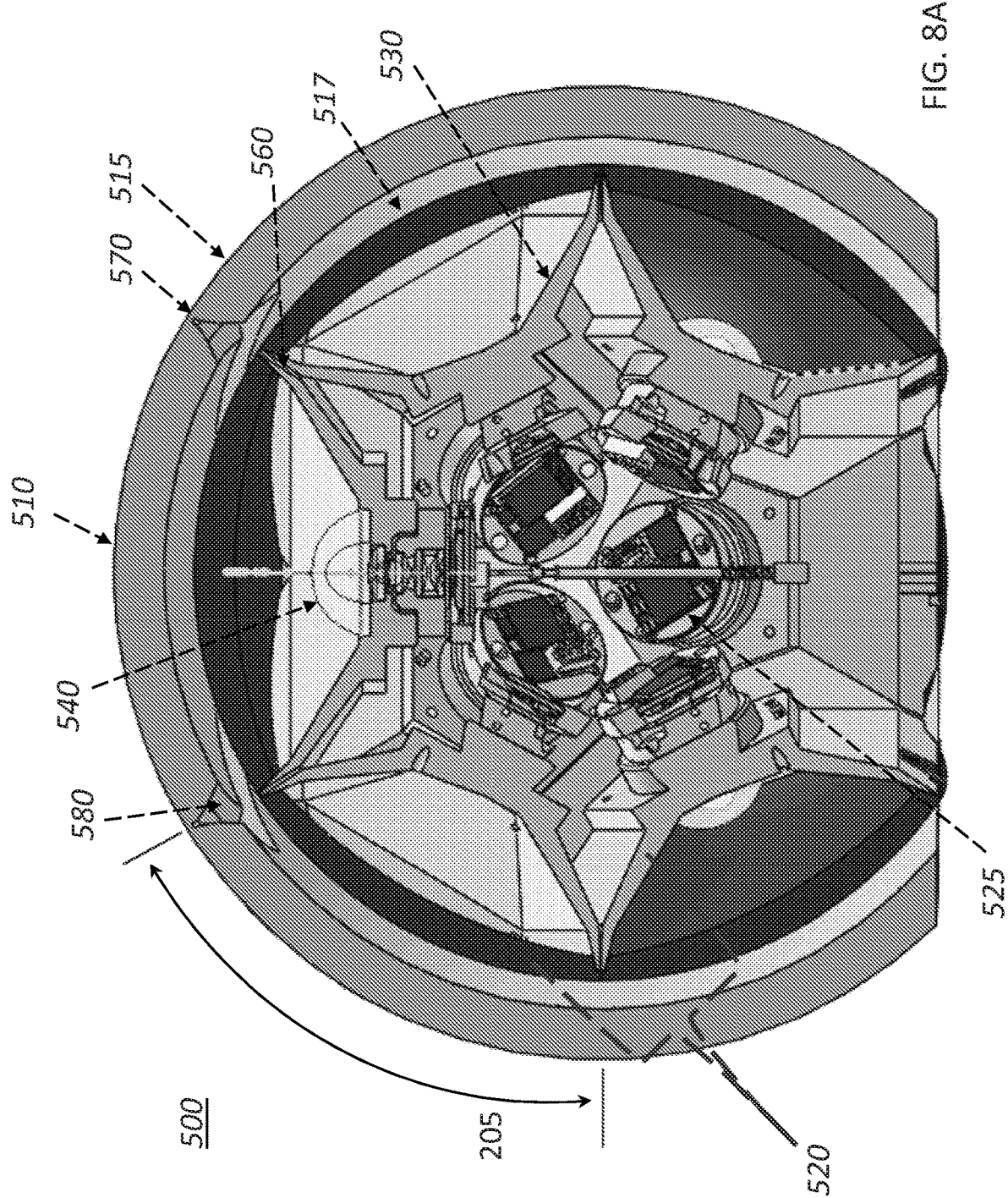
FIG. 8A depicts a cross-sectional view of a portion of an improved panoramic multi-camera capture device with an outer shell or dome.

FIG. 8A provides a cross-sectional view of an alternate and improved opto-mechanical design for a panoramic multi-camera capture device 500 in which portions of six cameras 520 are visible within an outer dome or shell 510. Each of these cameras 520 consists of at least one compressor lens element 550, inner lens elements 540, and sensor board 525, which are mounted within a housing 530. These cameras 520 reside within an interior volume of a transparent outer dome or shell 510, that most simply has nominally concentric outer and inner surfaces 515 and 517, and that is assembled from 2 pieces and encompasses and protects the multi-camera device with minimal direct contact. Alternately, the shell or dome can also have internal features to which the camera assemblies mount or register. For example, the camera housings 530 can have extensions 560 that can interact with, or contact mechanical features located at, or in, the seams 570, or the vertices, between lens systems. For example, these mechanical features can include compound chamfers or facets 580 that are molded or machined into the inside surface 517 of dome 510. Alternately, these mechanical features can be molded or bonded on, to protrude from the shell or dome 510. or a combination of protruding and inset features. These extensions 560 can help the panoramic multi-camera capture device 500 stay nominally centered within the interior volume of the dome or shell 510, so that the captured core FOVs 205 for each camera 520 are minimally skewed or offset relative to the dome, and the transiting image light seen by each camera experiences a nominally constant shell thickness over the extent of its core FOV 205.

Figure 8B:
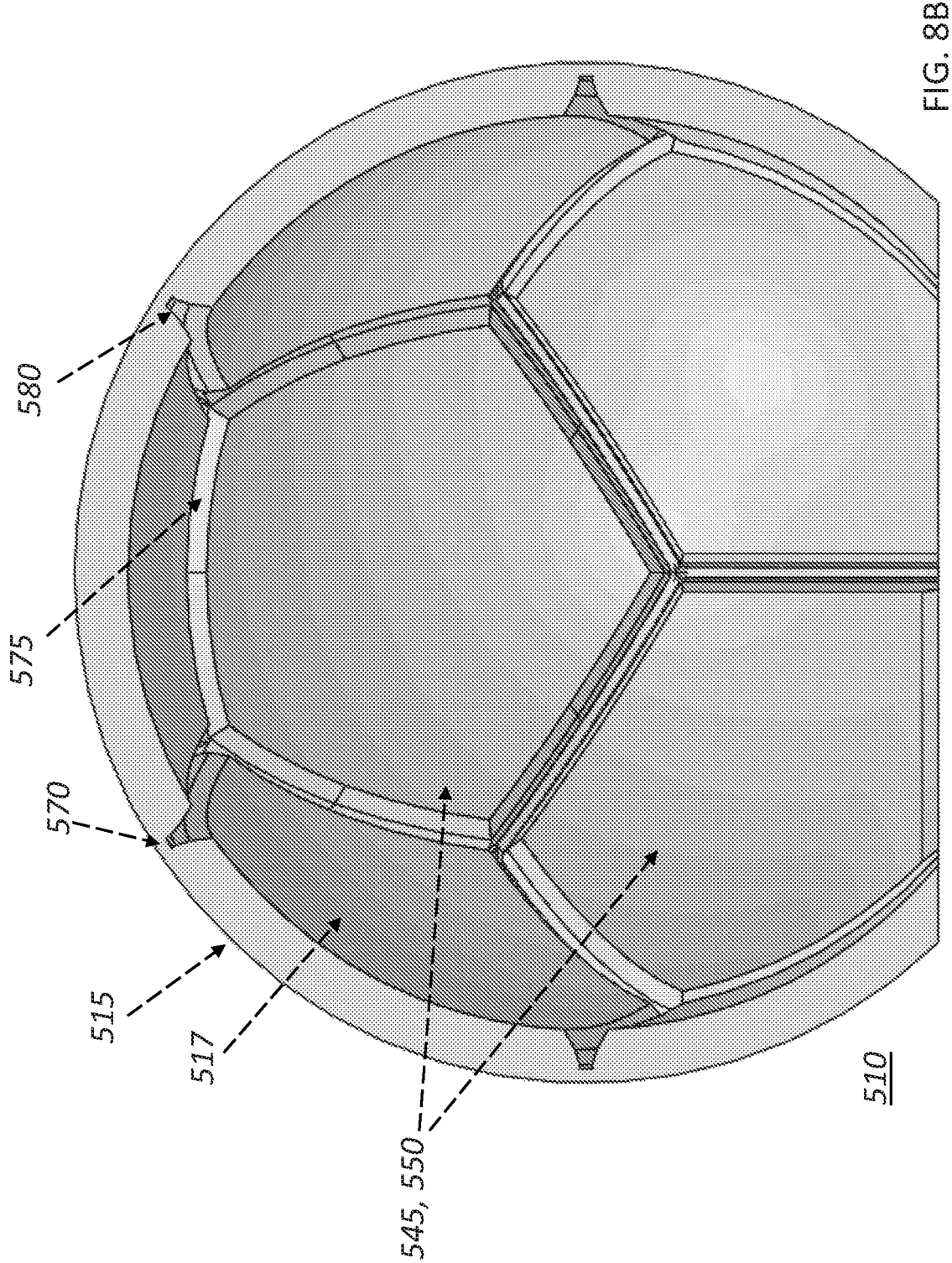
FIG. 8B depicts a cross-sectional view of a portion of an outer shell or dome for use with an improved panoramic multi-camera capture device.

FIG. 8B provides a cross-sectional view of an alternate improved faceted dome or shell 510, which illustrates that the localized mechanical features, including compound chamfers or facets 580 on the inside surface 517, can extend to provide grooves 575 along the edges or seams of geometrical portions of the dome or shell. The grooves 575 align to, and partially define, the borders of the outer lens elements (550). In this case, each geometrical portion can correspond to a concentric shell portion 545 that is associated with a given camera 520, for which associated extensions 560 can interface to help mechanical registration and alignment.

Alternately, these shell portions 545 of the transparent faceted dome 510 depicted in FIG. 8B can have non-concentric inner and outer surfaces, so that each of them can function as a lens element, and provide optical power, for an associated camera 520. In this case, the shell portion 545 can function as an outer lens element, or a compressor lens element 550, within the optical design of a camera 520. The nominal radii for an inner surface 517 and an outer surface 515 of a shell portion 545 or outer compressor lens element 550, depends on the nominal optical design of the camera 520, and the material and fabrication limits of the faceted shell or dome 510. The provision of mechanical mounting features, including compound chamfers or facets 580 (FIG. 8C), to which mechanical registration features or extensions 560 from the camera can then register or interface, in turn can depend on how the curvatures of two adjacent shell portions 545 or outer compressor lens elements 550 meet one another. In summary, a faceted dome or shell 510 can have shell portions 545 that are lens facets or lens elements 550, that can be separated from each other by shaped or faceted notches or compound chamfers 580.

To better understand how a camera, including the lenses and housing, can optically and mechanically interface with a transparent dome or shell that provides local optical power, the range of potential design solutions can first be explored. As a first illustrative example, the camera 120 depicted in FIGS. 2A,B has single compressor lens element, outer lens element 137, using Ohara SLAH53 glass with a meniscus shape, having an outer surface 138 with a 31.8 mm radius of curvature, and an inner surface 139 with an 81.5 mm radius of curvature. The previously discussed multi-camera capture device 100 (FIG. 1), has a radius of about 67 mm, as measured from the vertex of the outer lens element to a nominal LP volume location. In this example, incident light 110 from object space 105 that becomes image light 115 is significantly refracted inwards (towards the optical axis 185) when it encounters the outer surface 138.

Figure 9A:
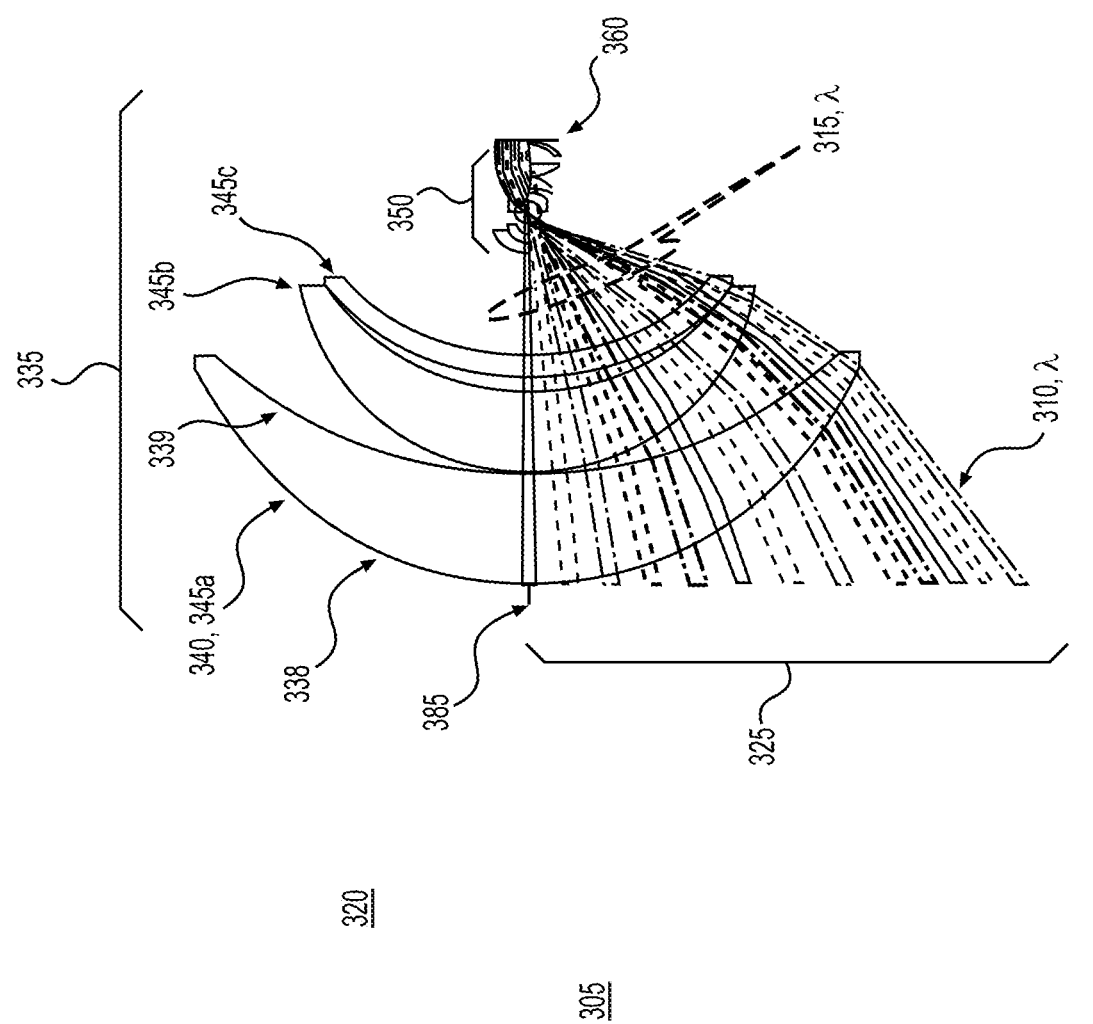
FIG. 9A and FIG. 9B each depict an alternate optical design of a camera lens for a low parallax panoramic multi-camera capture device, having an improved lens design that shows multi-compressor lens group and that can support a FRU concept.

As a second illustrative example, FIG. 9A provides a cross-sectional view of an alternate and improved optical design with a modified lens form to that of FIG. 2A, for a camera lens for a panoramic multi-camera capture device. This camera optical system can be used in an improved panoramic multi-camera capture device of the type of FIG. 1, with externally accessible discrete outer lens elements. It can also be used in an improved panoramic multi-camera capture device (500) of the type of FIGS. 8A-B and FIGS. 10A-C and FIG. 10E, where the outer lens elements, or first compressor lens elements, are part of a shell or dome. In FIG. 9A, the lens system of camera 320 collects light rays 310 from object space 305 to provide image light 315 from within a field of view 325, and directs them through lens elements 335, which consist of outer lens elements 340 and inner lens elements 350, to provide an image at an image plane 360. This lens system provides improved image quality, telecentricity, and parallax control, although these improvements are not obvious in FIG. 9A. In this example, the outer lens elements comprise a group of three compressor lens elements 345a, 345b, and 345c, and the optical power, or light bending burden, is shared amongst the multiple outer lens elements. In this example design, the inner compressor elements 345b and 345c are not quite combined as a cemented or air space doublet. Design configurations with multiple compressor lens elements can also be useful for color correction, as the glass types can be varied to advantageously use both crown and flint type glasses. In this example, the outer lens element 340, or first compressor lens is a meniscus shaped lens element of SLAH52 glass, with an outer surface 338 with a radius of curvature of ~55.8 mm, and an inner surface 339 with a radius of curvature of ~74.6 mm. The overall optimized improved multi-camera capture device 500 can have a nominal radius from the vertex of the outer lens element to a nominal NP point location of ~65 mm. In this example, incident light 310 from object space 305 that becomes image light 315 is significantly refracted inwards (towards the optical axis 385) when it encounters the outer surface 338, but it is refracted inwards less dramatically than is provided by the first surface of the FIG. 2A lens.

Figure 9B:
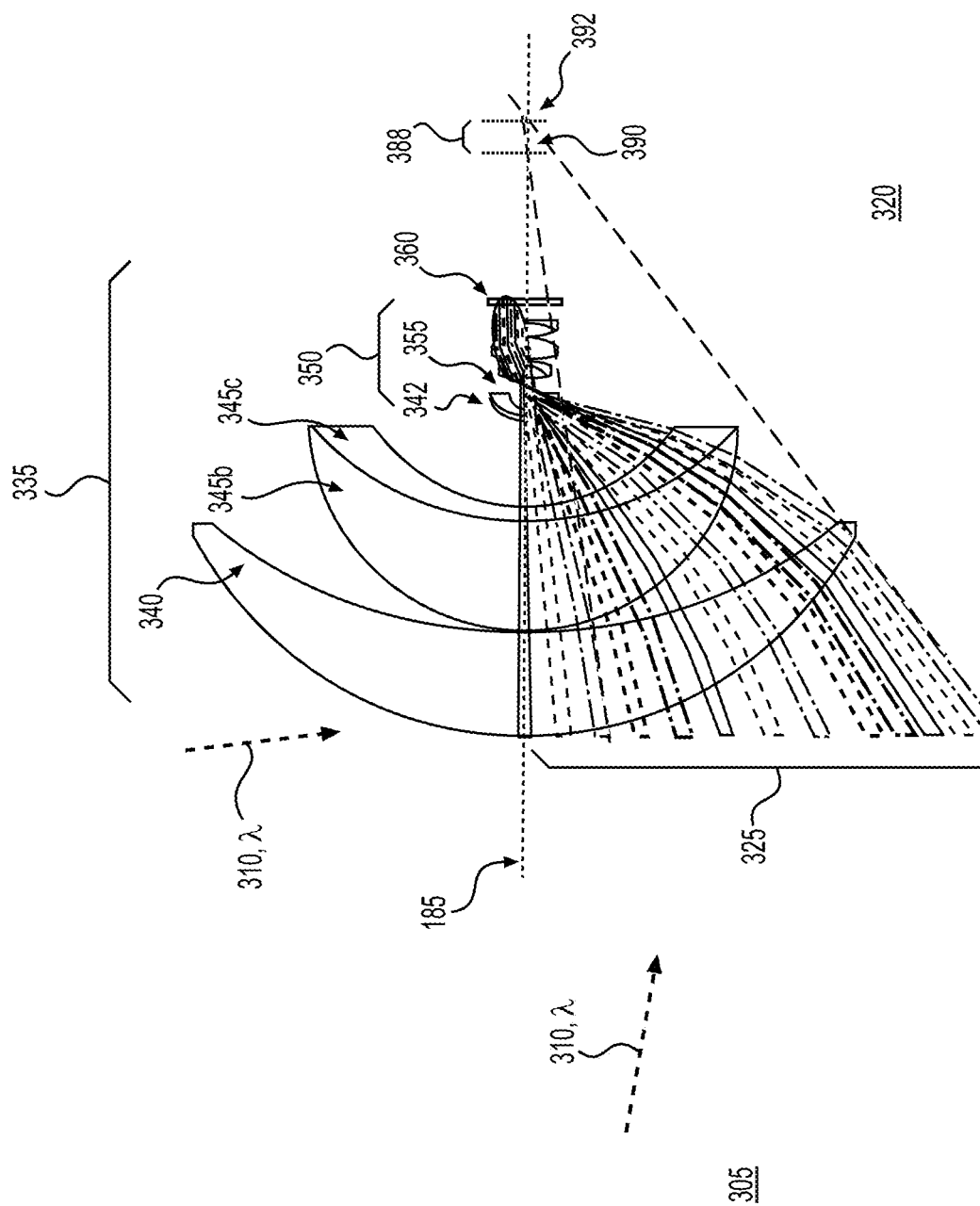
Figure 9C:
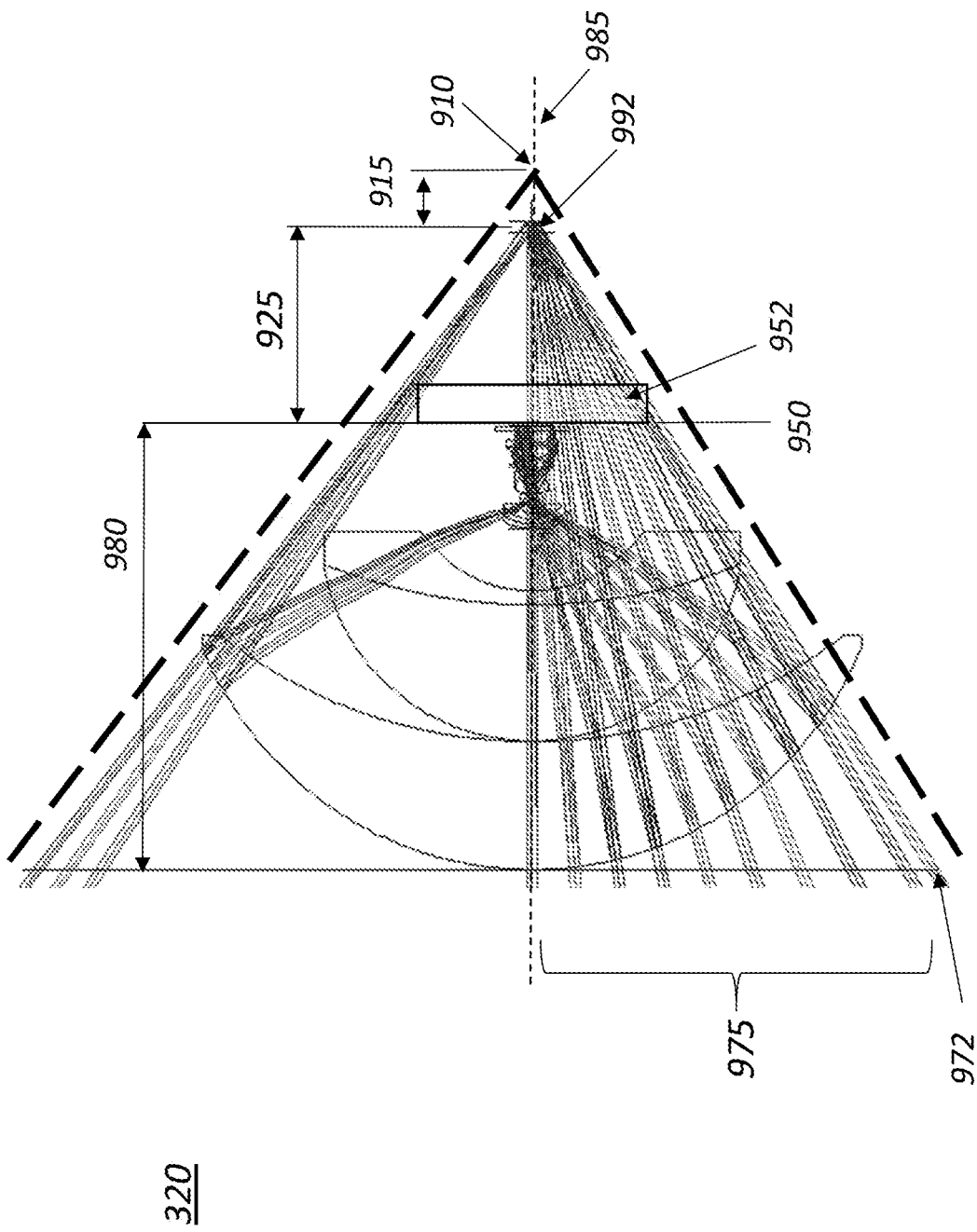
FIG. 9C depicts another improved lens design, relative to an offset device center.

FIG. 9B provides a cross-sectional view of an alternate and improved onto-mechanical design for an improved camera 320 that can be used in an improved panoramic multi-camera capture device 300. In this exemplary design, the camera lens 320 has a lens form in which the compressor lens element has been split into a compressor lens group, including first compressor lens element 340 and second and third compressor lens elements (345B and 345C) provided as a cemented doublet. The inner lens elements 350 include a wide-angle lens group located prior to the aperture stop 355, that includes a fourth lens element 342, and a post-stop eyepiece lens group. As previously, the lens system provides a paraxial NP point 390 that is offset from a non-paraxial chief ray NP point 392 that lie within a low parallax volume 388. The size or width of this volume, and the location of NP Points of potential interest (e.g., paraxial, mid field, peripheral field, circle of least confusion based) within it, depends on design priorities and parallax optimization (e.g., spherical aberration of the entrance pupil, chief ray fans, distortion). While the lens form of the example camera lens systems designs of FIG. 2A, FIG. 9A, and FIG. 9B are similar, the lenses vary in details and performance, including with their different compressor lens configurations. Because of differences in specifications and optimization methods and priorities, these lenses are also different in cost, performance, and manufacturability.

FIG. 9C provides another illustration of an improved camera 320, having a track length 980 between the front lens center and the image plane 950, which can be positioned at an offset distance 925 from the image plane 950 to the low parallax volume 992. As one approach to improve the device center congestion, the camera 920, its housing (not shown), and the overall improved device 500, can be designed to provide an axial center offset distance 915 along the optical axis 985 between the low parallax volume 992 and the device center 910, much as previously discussed with respect to FIG. 5C. Designing in an offset distance 915 (e.g., 1-4 mm) can provide extra space for power, communications, or cooling connections, cables, and for mechanical supports for the sensor package 952, or for other structural members. In the example of the camera system 320 depicted in FIG. 9C, the improved low-parallax multi-camera panoramic capture device (500) can have a dodecahedral format, and then the device center 910 is the center of the nominal dodecahedral polygonal structure. This offset distance must be determined during the process of designing the cameras 320 and overall device 500, as it interacts with the optimization of the lens near the edges of the FOV. Thus this optimization can depend on, or interacts with, the seam width, the distortion correction, the control of front color, the optimization for reduced parallax for peripheral rays (edge ray 972) or image rays 975 generally, or for the extent and sub-structure of the LP volume 992, the sizing of the lens elements (particularly for the compressor lens group 955), or the allowance for an extended FOV 215. As will be seen, the present approach with a faceted dome, can enable improved low-parallax multi-camera panoramic capture devices 500 with reduced seam widths, which in turn can help reduce the magnitude of a device center offset distance 915 or that of an extended FOV 215.

Figure 9D:
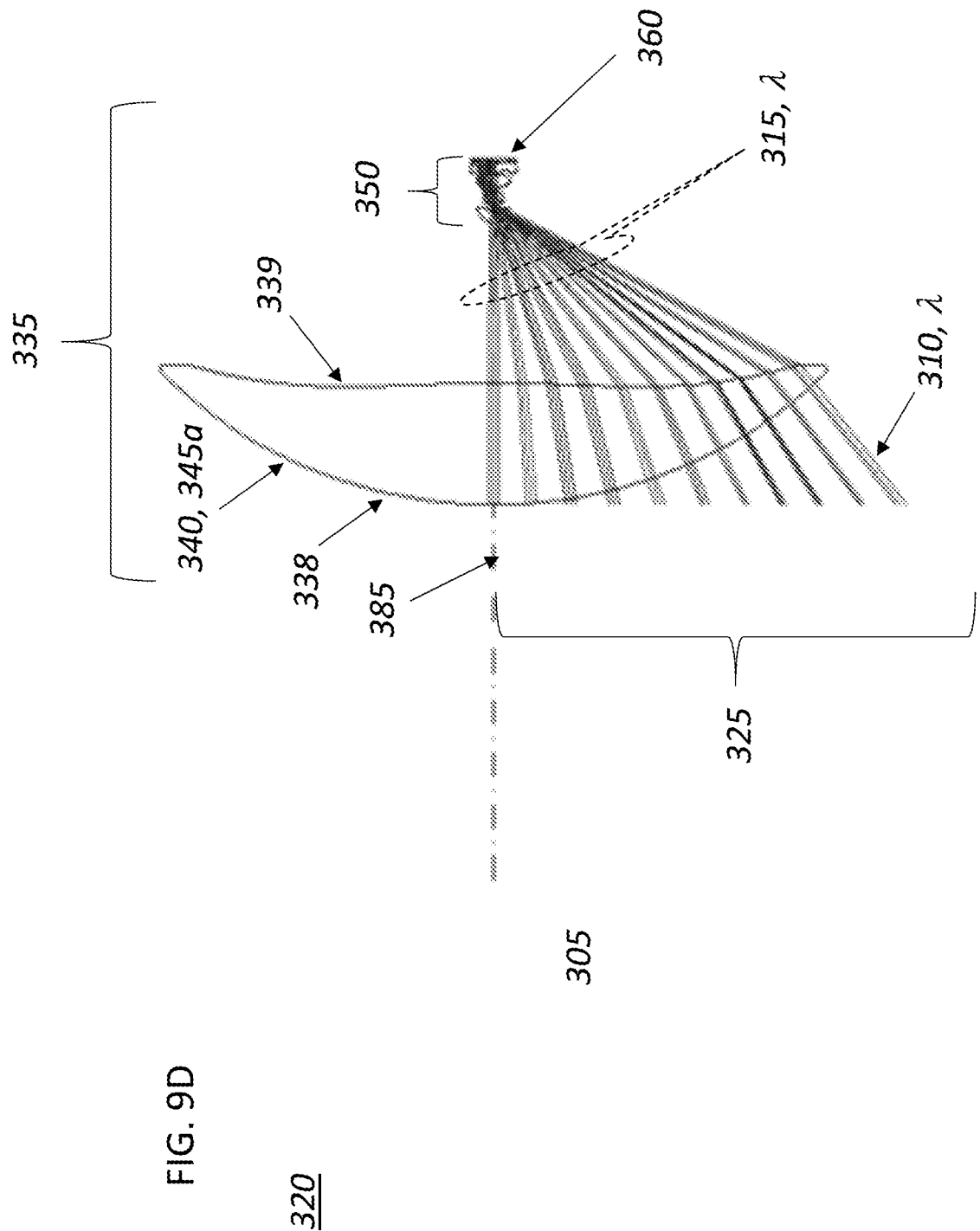
FIG. 9D depicts another alternate optical design for a low parallax camera lens.

As another example, FIG. 9D depicts a cross-sectional view of an alternate and improved optical design, with a modified lens form, to that of FIG. 2A, for a camera lens for possible use in a panoramic multi-camera capture device. In this case, the outer lens element 340 of camera 320 has a single compressor lens element, represented by outer lens element 340. This outer lens element 340 uses Ohara S-LAH63 glass, but has an outer surface 338 with a radius of curvature of 95.3 mm, and an inner surface 339 with a base radius of curvature of −293.5 mm, while the overall multi-camera capture device 500 has a nominal radius of 95 mm. As suggested by FIG. 9D, the inner surface 339 actually has a complex aspheric shape, with a base curvature that is modified by multiple higher order terms. The lens shape is bi-convex on axis, nearly plano convex for mid fields, and meniscus shaped for the large fields, with a spatially averaged lens element shape that is basically plano convex. In this example, incident light 310 from object space 305 that becomes image light 315 is nominally not refracted as the light encounters the outer surface, but it is then even more dramatically refracted at the second or inner surface, towards the optical axis and the inner lens elements, than is provided by the second surface of the first or outer lens element in either the FIG. 2A or FIG. 9A lens systems.

Certainly, the example camera lens systems designs of FIG. 2A and FIGS. 9A-D, with their different compressor lens configurations, vary in form and performance, as well as in cost and manufacturability. Depending on priorities, these design forms can be optimized further, and the different forms may be individually better suited for different markets or applications. In the above examples, the outermost lens element, or first compressor lens element, has used Ohara SLAH52, SLAH53, and SLAH63 glasses (or equivalent glasses from Schott Glass (e.g., N-LAF36 and N-LASF43)), which are high index, low dispersion flint glasses with visible spectra refractive indices n~1.80 and an Abbe number $V_d$~41.5. It should be understood that other optical materials can be used for the lens elements in the camera lenses 520 generally, including for the compressor lens elements. For example, use of a high index, lower dispersion, mid-crown glass like Ohara SLAL-18 can be helpful for color correction. As another example, lens elements can also be made from optical ceramics such as Alon (n~1.79, $V_d$~57-72) or Spinel, which are extremely durable materials, similar to sapphire, but with excellent optical transparency, low dispersion, and a controllably modifiable isotropic crystalline structure. It should also be understood that the camera lenses of the present approach can also be designed with optical elements that consist of, or include, refractive, gradient index, glass or optical polymer, reflective, aspheric or free-form, Kinoform, fresnel, diffractive or holographic, sub-wavelength or metasurface, optical properties. These lens systems can also be designed with achromatic or apochromatic color correction, or with thermal defocus desensitization.

By comparison, optical domes or shells 510 tend to be made with optical crown-type materials with low visible refractive indices and low dispersion, such as fused silica (n~1.46, $V_d$~67.8), n-BK7 glass (n~1.52, $V_d$~64.2), or from optical polymers or plastics such as acrylic (PMMA) (n~1.49, $V_d$~58.5). Optical domes, particularly for infrared imaging applications, are also made from less commonly used optical materials such as zinc sulfide (ZnS) and Sapphire. There are versions of these materials, such as multi-spectral ZnS (n~2.35, $V_d$~11), and Spinel or Alon, that are infrared imaging materials that are used in infrared imaging domes, that can also be useful for at least some visible imaging applications. In general, the optical material(s) comprising the outer shell or dome are assumed to have a nominally spatially isotropic refractive index at any given operational wavelength. Alternately, however, gradient refractive index materials (e.g., Alon) can be used to provide spatial profiles, either radially, or relative to the optical thickness. Use of gradient index materials can provide greater design freedom in shaping the outer lens elements, modifying or increasing image light convergence, or in providing space for the alignment notches or facets.

Considered in combination, it is apparent that optical designs for camera lenses 520 for panoramic multi-camera capture devices 500, that have an outer optical dome or shell 510 with non-concentric inner and outer surfaces to provide the first compressor lens element, can take a variety of forms. The design of the camera lens can thus depend on the selection of the shell or dome optical material, the optical design of the compressor lens elements, including a shell portion 545 that has local optical power; and including the selection of the other optical materials therein, and the combinations thereof.

Figure 10A:
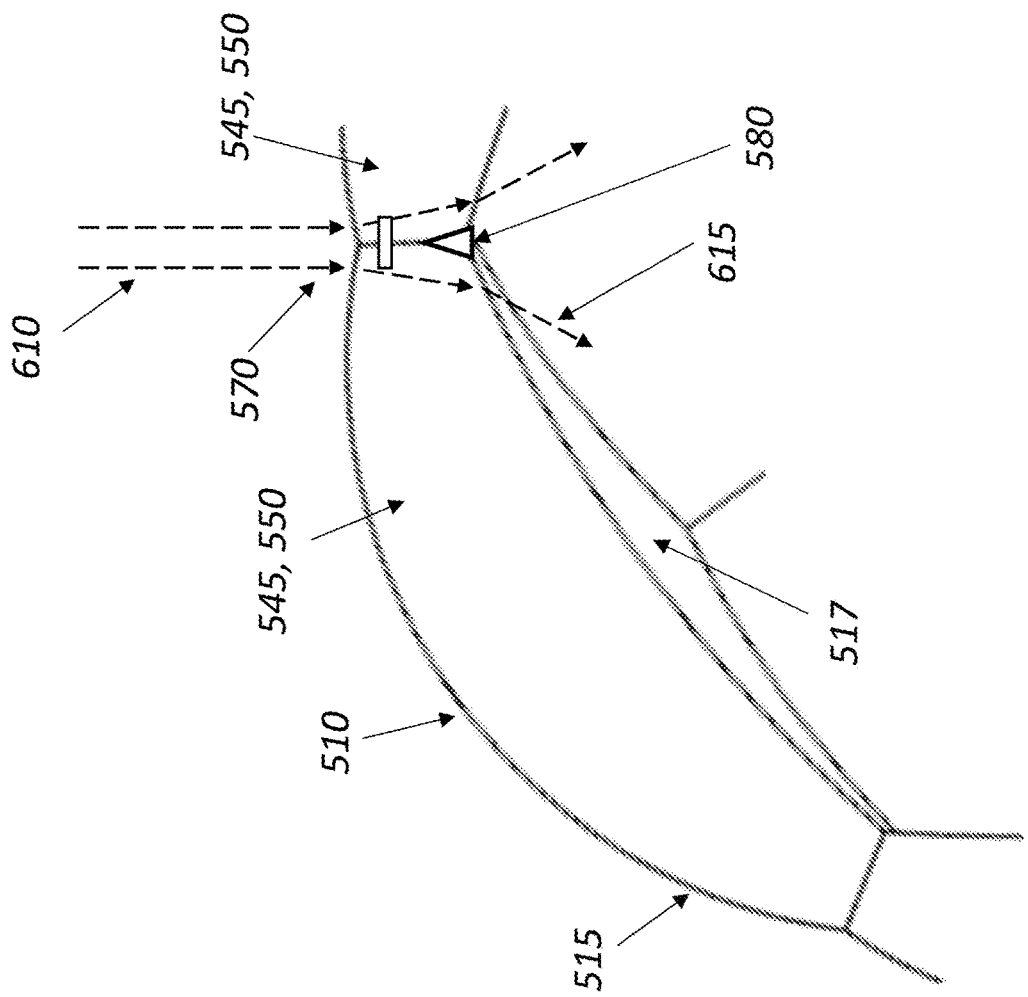
FIG. 10A depicts aspects of light propagation through a seam area of a portion of an outer shell or dome for use with an improved panoramic multi-camera capture device.

Likewise, the opto-mechanical design of a faceted shell or dome in providing a lens facet that functions as a compressor lens element for each camera lens, depends on what the camera requires of it, as both an optical and a mechanical element. FIG. 10A depicts a first case, showing a zoomed in cross-sectional view of a portion of an outer shell or dome 510, and particularly portions for two adjacent shell portions 545 that are functioning as outer lens elements 550 or compressor lens elements. In this example, in a similar fashion to the outer lens element 137 of FIG. 2A, the meniscus shaped outer lens elements (545) have outer surfaces 515 that can refract light rays 610 towards the respective optical axes of the associated camera lenses, to help provide image light 615. In this case, the image light can be refracted away from the seam 570 where the two outer lens elements meet, and thus space can be available to provide notches or facets 580 or other mechanical mounting features that can be outside of the optical paths traversed by the image light. Any grooves are not shown in this figure.

Figure 10B:
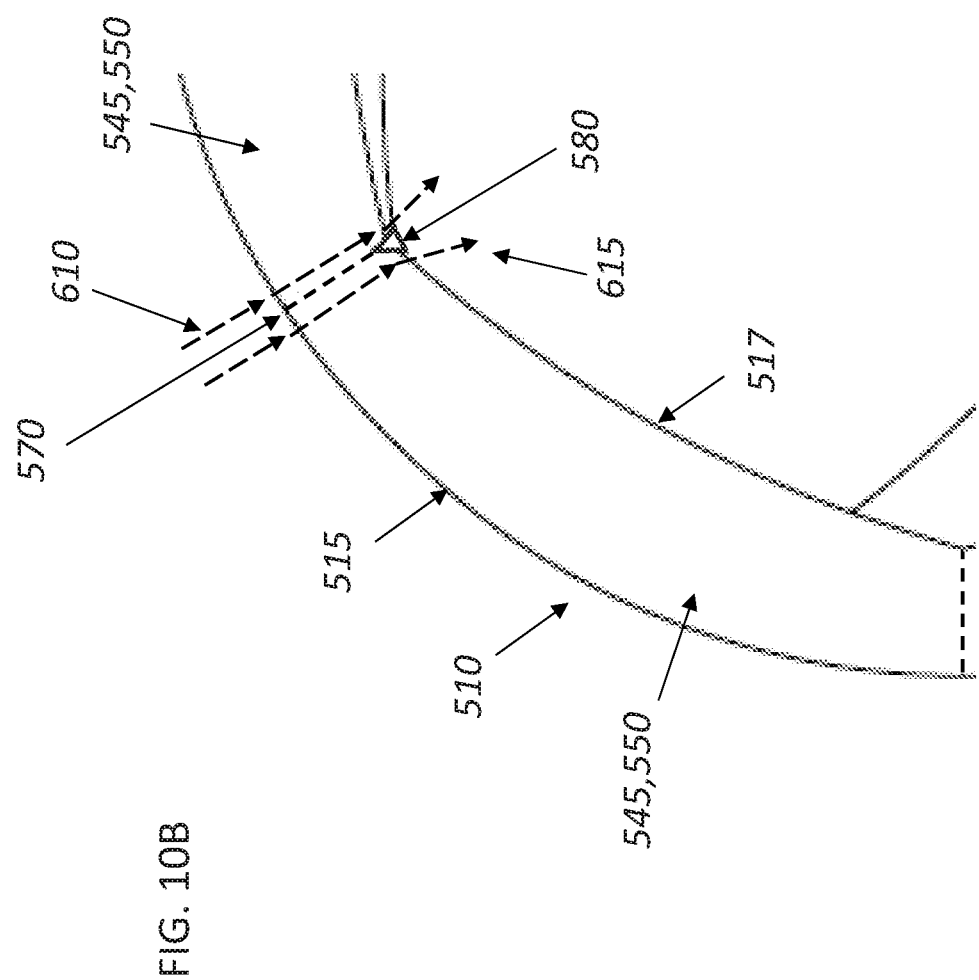
FIGS. 10B, 10C, 10D, and 10E respectively depict light propagation through a seam area of an outer shell or dome having an alternate opto-mechanical configurations.

FIG. 10B depicts a second case, showing a zoomed in portion of an outer shell or dome 510, and particularly shell portions 545 for two adjacent outer lens element or compressor lens elements 550. In this example, the two outer lens elements have an outer surface 515 with a radius of curvature that nominally matches the radius of the panoramic multi-camera capture device 500. The shell or dome 510 can be easier to fabricate, coat, and clean, if it has a continuous spherical surface. Also, the transit of ghost light to the image sensors can be reduced if the outer surfaces do not protrude (unlike the lenses of FIGS. 2A and 10A). As shown, each outer lens element (545) is a meniscus shaped type lens element with a long radius for the inner surface that is close to being planar (e.g., similar to the outer lens element 340 of FIG. 9D). In this case, incident light 610 would not refract much as it enters the outer surface, and it may refract only modestly inwards at the inner surfaces 517. Image light incident about a seam 570 of a dome or shell 510 for two adjacent camera systems (520) would not have separated much from each other spatially, which can make it difficult to fit in subsequent compressor lens elements into the optical paths of the camera lenses. Likewise, it can then be difficult to provide space for mechanical alignment features (e.g., facets 580) at the seams, or to provide camera assembly supports or extensions to interface with those alignment features. The configurations of FIG. 9D and FIG. 10B could become more viable if the dome material included a deliberate gradient optical index at least near the seams (570).

Figure 10C:
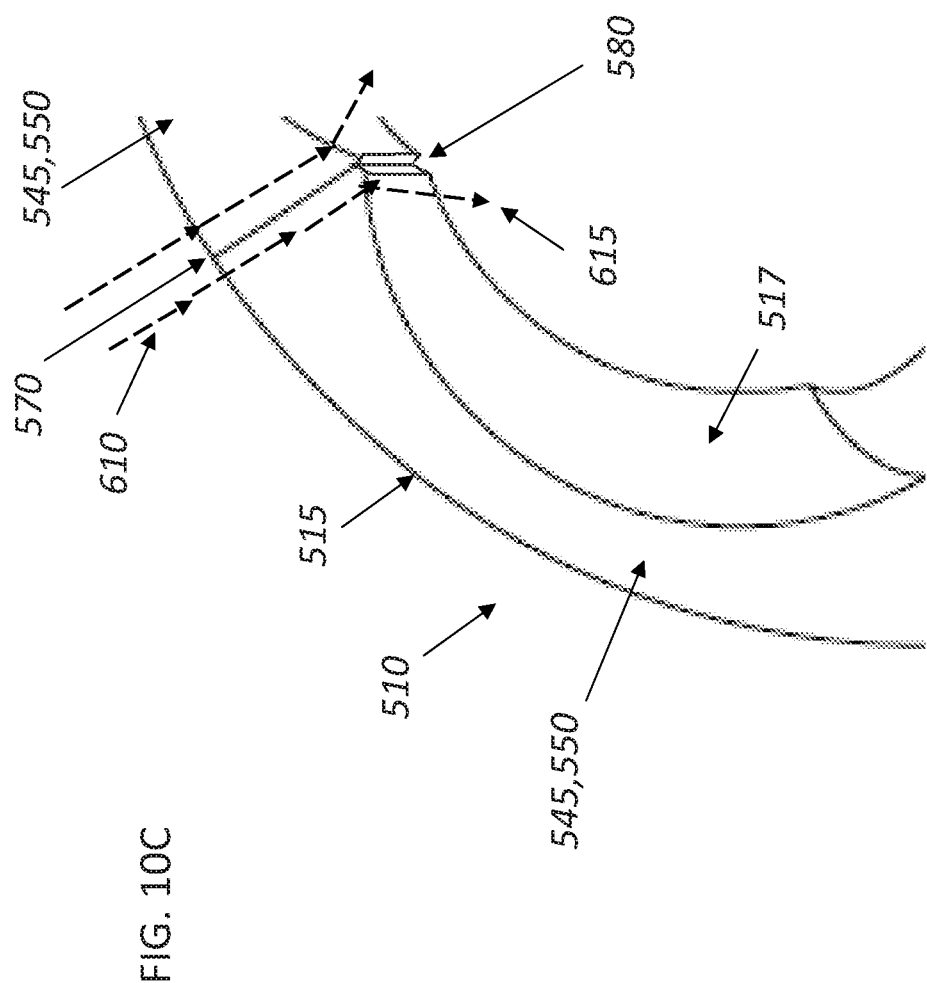

FIG. 10C depicts a third case, showing a zoomed in portion of an outer shell or dome 510, and particularly portions for two adjacent shell portions 545 that are meniscus shaped outer lens element or compressor lens elements 550. This example is similar to that of FIG. 10B, except that the inner surfaces have shorter radii, and provide more refraction or light ray bending towards the optical axes of the respective camera lens assemblies (520). In this case, the transiting image light 615 in each camera channel is physically more separated, which can make it easier, as compared to FIG. 10B, to provide additional compressor lenses or a camera housing for each camera channel. Likewise, it can be easier to provide both camera lens supports or extensions, and mechanical features such as notches or facets 580 at the seams for the supports to interface to. However, it may be more difficult to fabricate a dome 510 with these more extreme inner surfaces.

The examples of FIGS. 10A-C can meet a goal of the present invention to collect and provide image light from object space with little or reduced parallax errors, including for image light collected near the seams. The outer lens element or first compressor lens 545 of FIG. 10C is definitively meniscus in shape, while the lenses 545 of FIGS. 10A-B are meniscus elements that are bordering on being plano-meniscus elements. Other lens elements, such as those with bi-convex shapes can be used successfully as the first compressor lens element for cameras in panoramic multi-camera capture devices. However, the relative size and shape of accompanying opto-mechanical alignment features of the optical shell, such as faceted notches and grooves, depends in part on the shape of the inner and outer lens surfaces. In general, it is preferable to have the working portions of these features be 2-6 mm across in width, to provide room for the interfacing camera housing mounting features.

Figure 10D:
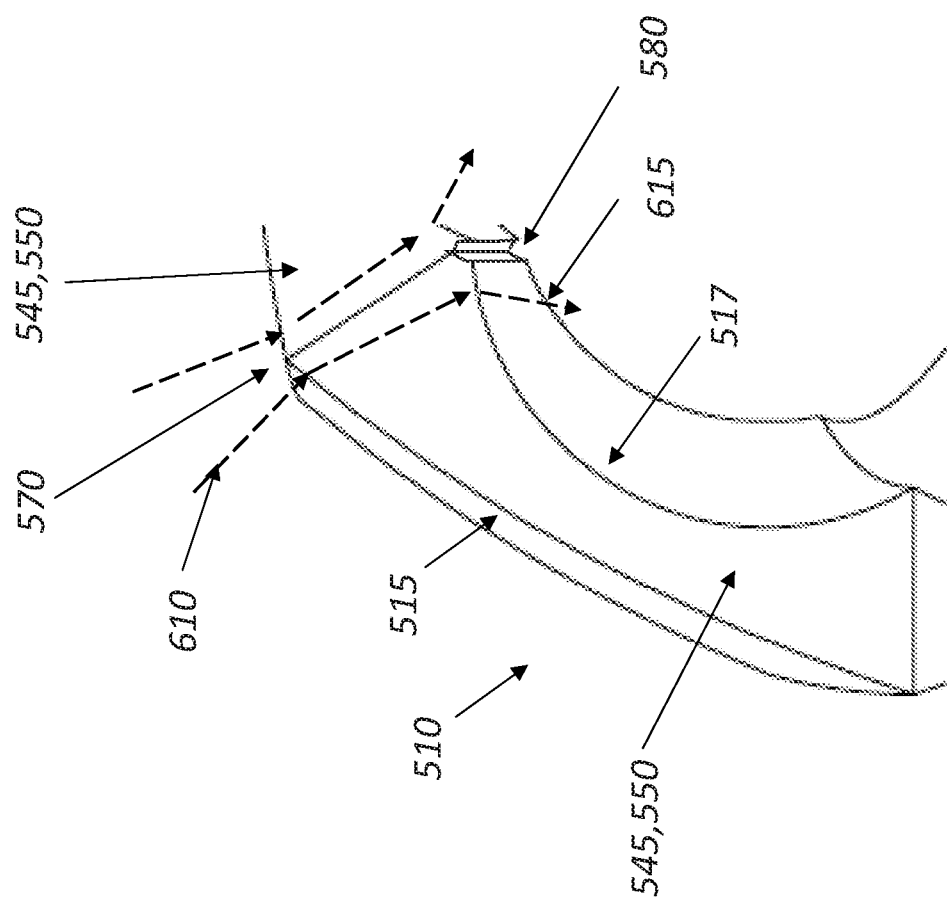

FIG. 10D depicts another case, in which the outside surfaces 515 of the shell portions 545 or outer lens elements of the shell or dome 510 are becoming planar (flat) or nearly so (optically), while the inner surfaces 517 have small enough radii to refract light significantly towards the optical axes of the respective camera lens systems (520). In this example, there can again be enough mechanical clearance or separation of the image light paths near the seams to provide notches or facets at the inner surfaces of the seams. But the image light 615 collected by the individual cameras is no longer satisfying the goal of reduced parallax errors between adjacent cameras when imaging near the edge of the imaged FOV. Additionally, the adjacent cameras actually have an image underlap problem, where there are extended uncaptured or blind regions 620 lost at or near the seams 570 between camera FOVs. Thus, this configuration does not satisfy the current goals. If these shell portions 545 that act as compressor lens elements 550 were fabricated with a gradient index, this problem could be alleviated. Use of gradient optical materials in the design and fabrication of the dome 510 might also make the configuration of FIG. 10D viable, by bending or redirecting the incoming light enough to provide low parallax imaging near the seams 570, despite the near flatness of the outer surfaces 515.

As noted previously, a goal of this approach is to provide an outer shell or dome 510 that can protect the internal cameras (520) within an interior volume. In an improved panoramic multi-camera capture device of the type of FIG. 1 with mechanical seams 160, but for which the thicknesses of the seams have been reduced, and for which the seams have been made opto-mechanically robust using fins, compliant polymers, or other structures and materials, the opto-mechanical seams 160 can still present a contamination or damage risk. By comparison, in an improved panoramic multi-camera capture device 500 of the type of FIGS. 8A,B, the seams 570 between the respective outer lens elements can be mechanically integrated with a single continuous optical material, and thus the risks of damage at the seams 570 from environmental exposure can be further reduced.

As suggested in FIG. 1, seams 160 can have opto-mechanical features on the outer surfaces of the outer lens elements, a lateral width between outer lens elements, a thickness between the inner and outer surfaces of the outer lens elements, and further opto-mechanical features within that thickness, or on the inner surfaces of the outer lens elements. Likewise, for an improved panoramic multi-camera capture device 500 of the type of FIGS. 8A,B, the seams 570 between the respective outer lens elements of the mechanically integrated single continuous optical material can have a lateral width, a thickness, and opto-mechanical features on one or both of the inner and outer surfaces. These features can include the previously mentioned notches or facets (see FIG. 8C) that can be used to help mechanical registration and alignment to underlying camera lens elements and housings.

The physical width of the seams 570, or the transition width between adjacent outer lens elements, can depend on the means used for fabricating a dome or shell 510, whether by processes including molding or casting, machining, polishing, fusing, or 3D printing, or a combination thereof. The physical width of the seams 570 can also depend on the abruptness of the change from one surface curvature to the other, and thus on the curvature magnitude(s). Likewise, the seam widths of the outer lens elements can vary relative to the distance from the vertices, along the sides or faces, and on whether the lens elements have a pentagonal or hexagonal or other shape.

As stated previously, in the FIG. 10A example, incident image light refracts at the front or outer lens surface and is directed away from the seam area, thus providing room for alignment structures like notches or facets. But, in this example, the outer lens element regions or outer surfaces 515 of the dome 510 protrude, such that adjacent lenses meet at the seams to provide an abrupt reversal in curvature within a small area. As shown in greater detail in FIG. 10A2, an immediate area at and around a seam 570 can have a local radius of curvature of opposite sign, or local flat areas, or combinations thereof. For such an example, some light rays 610 incident to a seam area can refract, diffract, or scatter, and directly or indirectly thus create stray or ghost light that can be incident to a sensor at a subsequent image plane 360. Some light rays 610 incident to a seam area can also refract, diffract, or scatter off of subsequent alignment structures like notches or facets 580 (FIG. 8C).

In lens design examples like that of FIG. 2A, or equivalent dome examples like that of FIG. 10A, where the outer lens elements have protruding outer surfaces 515, then based on the associated geometric considerations, and the fabrication methods used, the widths of seams 570 at the outer surfaces 515 can be in the 0.5-1.0 mm range. Whereas, in a lens design example like that of FIG. 9A, or an equivalent dome, for which the outer lens elements have front surface curvatures 338 that protrude less, relative to a radius of a spherical dome or shell around the entire device, then it can be easier to provide thinner width seams 570 (e.g., 0.1-0.2 mm) at the outer surfaces 515. However, there can then also be less room to provide alignment structures like notches or facets 580 in areas outside of the image light paths.

By comparison, in the examples of FIGS. 10B and 10C, the outer lens element surfaces (515) nominally match a spherical surface of an outer shell or dome 510, with the device center nominally coincident with the center of curvature of the dome. In such cases, the seams can have little or no physical manifestation on the outer surface, and image light then refracts to a lesser (FIG. 10B) or greater (FIG. 10C) extent at the inner surfaces 517, depending on the relative curvature of these surfaces. But, in such cases, light rays incident to the outer surface at or near the seams 570 can interact more directly with subsequent alignment structures like notches or facets 580, from which they can refract, diffract, or scatter. However, light absorbing materials, or light trapping features, can also be provided at or near the seams so as to reduce such effects.

Thus, the width of seams 570 can depend on the optical design at both the outer and inner surfaces of the faceted dome or shell 510, the thickness of the dome 510, and the designs of both the alignment and light trapping features. Although the use of an outer shell or dome 510 can also reduce both the real and effective optical widths of the seams 570, these seam widths are not necessarily zero. However, a goal can again be to reduce the gap at the seams 570 to ≤0.5 mm, or to a reduced angular extent of lost FOV of only ≤0.5°, or to a number of "lost" pixels of ≤5-20 pixels. A range of target values is provided because the values depend on the camera and device designs, including the overall size, the camera FOV, the camera or sensor resolution, or equivalently the image resolution supported by a camera (e.g., 20-120 pixels/degree).

Figure 10E:
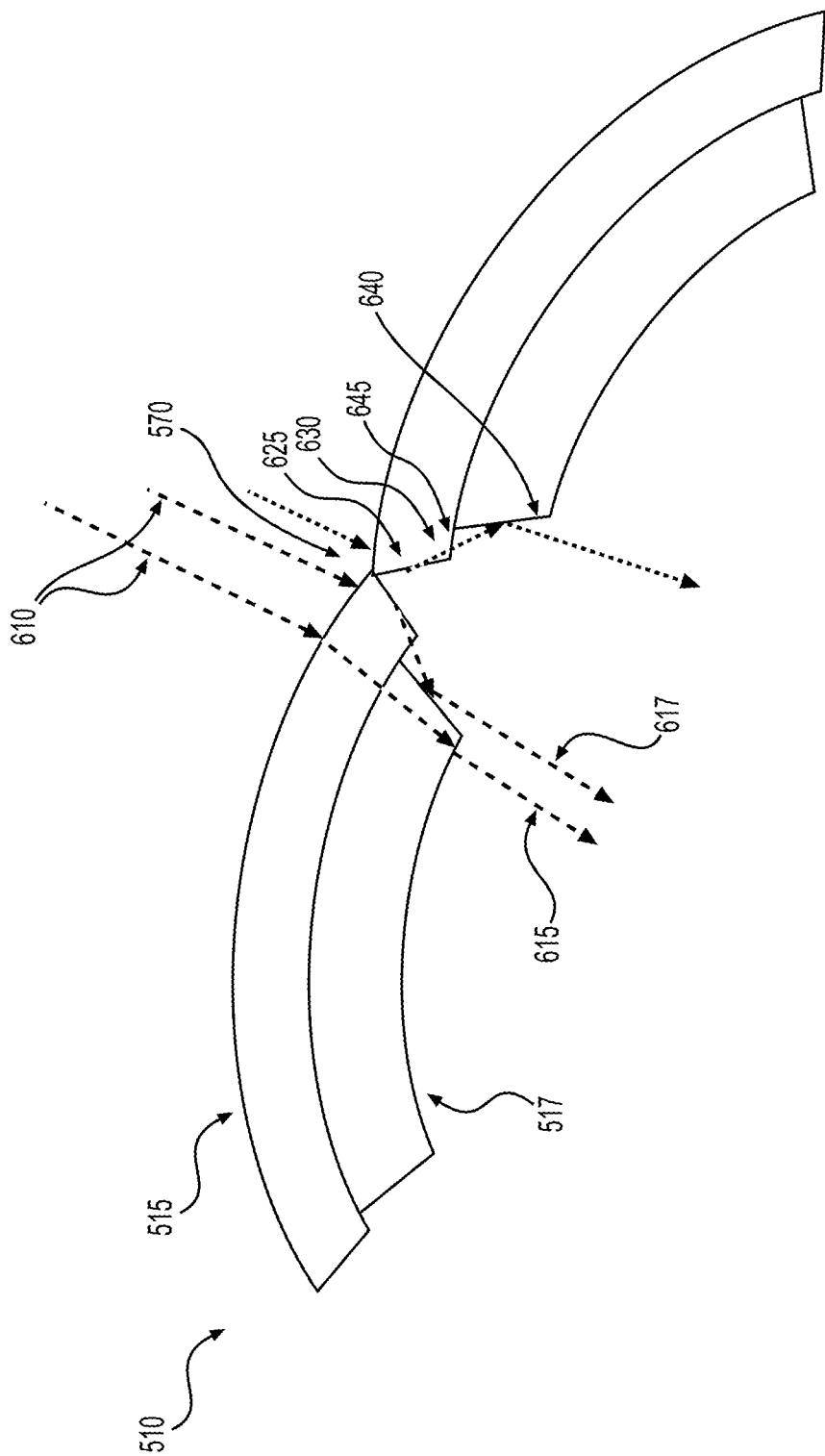

As an alternative, the outer optical shell or dome 510, having seams 570 between adjacent outer lens elements, can additionally have light steering features to help reduce both the real and effective optical widths of the seams 570. The example of FIG. 10E depicts a cross-sectional portion of an alternate improved multi-camera capture device 500 in which optical facets are provided as extended V-grooves at or near the seams in order to deflect and re-direct incident light rays. In this example, incident light rays 610 at the seams 570 enter the shell or dome 510 through the outer surface 515, travel a distance Z through the shell or dome 510, and then encounter an optical facet 625 which deflects, by total internal reflection (TIR), some light to one side (e.g., leftwards) and some light to the other side (rightwards) to effectively act like a local beam splitter. Thus, the narrow tip or pointed portion of this optical facet 625 can provide an optically narrow seam 570 to provide deflected image light 617 at the edge of one camera's FOV and deflected image light 617 to an adjacent camera's FOV.

As shown in the FIG. 10E example, the outer surfaces 515 corresponding to a first compressor lens elements of adjacent cameras, protrude moderately, much as suggested in the lens design example of FIG. 9A. The inner compressor lens surfaces (515) likely than have less curvature than the outer surfaces. Thus, nearby incident light 610 can be refracted at the outer surface, away from the seam, and to optical path that can transit through other lens elements of a camera, to be incident as direct image light 615 to a sensor plane. Whereas, other light rays 610, which are incident at or near the seams 570, and which encounter an optical facet 625, can be deflected at angles which could create ghost images on the sensor. To correct for this, additional compensating optical structures can be provided. For example, in FIG. 10E, the deflected light can then be transmitted through a near normal incident face 630 on an inside surface of the dome or shell 510, and then be reflected off of a mirrored surface 640, so as to end up on an optical path that is approximately parallel to, but spatially offset from, the original potential optical path. The adjacent TIR surface (625) and mirror reflection surface (640) are both optical facets, which are nominally parallel to each other. These deflected other light rays 610 can then transit through interior compressor lens elements and inner lens elements and then also be provided as deflected image light 617 to the image plane.

It is noted that this deflected image light 617, which has encountered two reflections, has likely traversed a longer optical path than has the image light 615 that entered the camera directly through the outer lens element. Thus, an optical path difference (OPD) compensator (not shown) can be needed, so as to help equalize an optical path length for the direct image light 615 along the primary imaging path, relative to the image light 617 along a deflected imaging path, so that both nominally come to focus simultaneously at the image plane and image sensor. As an example, the thickness of the outer lens element or first compressor lens element can be modified to provide the optical path length correction. Alternately, an extra element, such as a window, can be used as an optical path compensator.

This light deflecting structure (the combination if 625 and 640) can also have localized features or coatings to absorb some incident light, so as to reduce the risk of causing stray or ghost light. Localized light absorbing surfaces, such as thin lines of black absorbing materials can be printed in the corners 645, or along the mirrored surface 640, between the mirror layer and the base material (e.g., PMMA) of the shell or dome 510.

Figure 11:
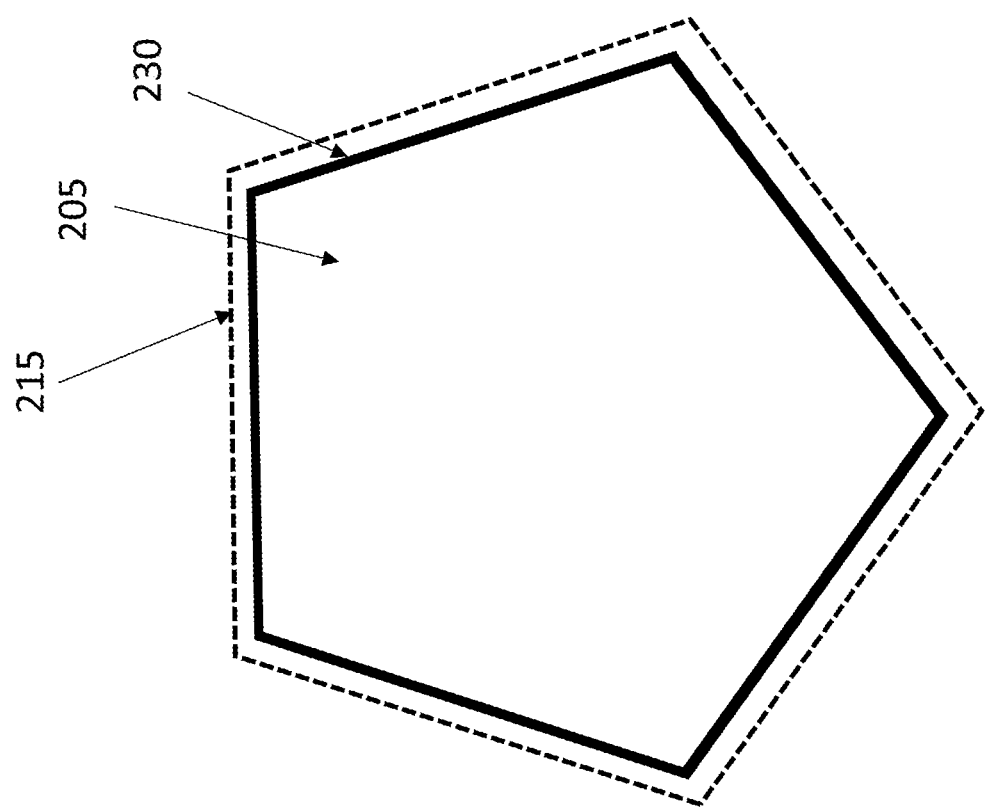
FIG. 11 depicts captured FOVs associated with a camera system having a seam area opto-mechanical configuration of the type depicted in FIG. 10E.

As previously, the direct image light 615 that transited the primary optical path can illuminate or image within a Core FOV 205. Whereas, the deflected image light 617 that traversed a deflected optical path can provide image light that falls at the very edge of the Core FOV 205, and perhaps also provide some usable image light for a larger extended FOV 215. This is shown in FIG. 11. Because of the blackened or light absorbing regions, the complete FOV captured by a given camera can not only include the image light that traversed the primary optical paths, and the image light that traversed the deflected optical path, but also one or more thin darkened regions 230 between them that corresponds to the aforementioned blackened or light absorbing regions. To help justify use of the light deflecting structure to narrow the effective optical width of the seams, the FOV lost to these blackened or light absorbing regions should be less than the FOV gained at and near the seams. However, as the image quality for the deflected image light 617 may not be as good as that of the nearest direct image light 615 that transited the primary optical path, the presence of a thin image seam between them, may help with image stitching and processing, by making it easier to provide differential image corrections, if useful, to one area versus the other. In this configuration, a resulting ideal FOV (200) can be equivalent to an extended FOV 215 that extends right to the seams.

As previously noted, the example of FIG. 10E has an optical configuration similar to that of the FIG. 9A lens design, in which the outer lens surfaces 515 have radii that are moderately larger than the radius of the multi-camera capture device 500. However, this approach is extensible to other configurations, such as those where the outer lens surfaces 515 have radii that are nominally identical to the radius of the multi-camera capture device 500 (e.g., FIGS. 9D, 10B, and 10C).

Figure 12:
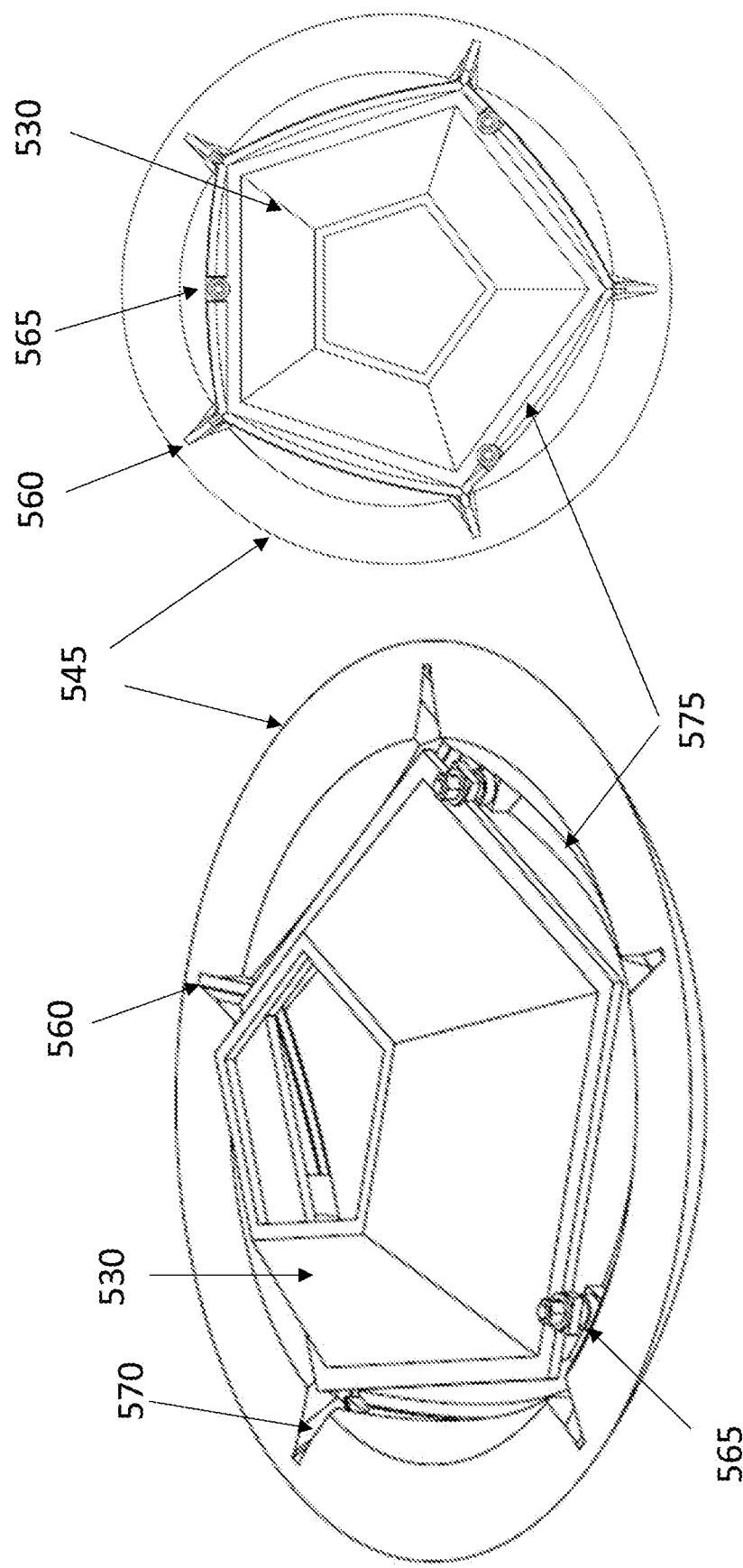
FIG. 12 depicts the interface of a camera mounting structure with a dome alignment structure.

A simplified version of the alignment notches or facets was shown in FIG. 10A2, as part of illustrating the risks of stray light scattering in and around those features. A more detailed example of a possible or facet alignment structure with compound chamfers or faceted notches (580) is shown in FIG. 8C. FIG. 12 then depicts inside perspective and plan views of an example of mounting a camera channel (520) to a shell portion 545 of a dome 510, using mounting features (e.g., extensions 560 and mounting posts 565) that contact and connect with the opto-mechanical alignment features (e.g., grooves 575 and notches or facets 580) of the optical shell.

As shown in FIG. 12, at the interface of a camera mounting structure with a dome alignment structure, a camera housing 530 (shown without the compressor or inner lens elements) can be registered against notches 580 and grooves 575 with extensions 560 and mounting posts 565. Three mounting posts 565 can be positioned nominally 120° apart about the lens housing 530 to provide alignment and mounting against the inner grooves 575. These mounting posts can consist of a screw or threaded post, nut, washer, and compliant spacer (not shown in detail). The mounting posts 565 of adjacent camera channels (520) can be offset or staggered from each other so as to avoid space or positioning conflicts. During assembly, a camera 520 can be held in place by a jig (not shown) that helps to register the channel in place against the shell portion 545. Camera performance can be monitored, from images of test targets that are imaged by the lenses and sensor of the camera channel, and the mounting post positioning can be adjusted to control tip and tilt. A thick compliant adhesive can be applied to each mounting post and cured after the channel is aligned. The alignment jig, which can support one or more channels, can then be removed once the channel(s) is aligned and the adhesive cured.

If the camera assembly (500) is nominally hemispheric, the surrounding dome or shell 510 can be as well. Although, as suggested by the dodecahedron and icosahedron shapes of FIG. 4, a "hemispherical" object or camera with outer pentagonal or hexagonal faces cannot be simply bisected into a hemisphere without cutting into the pentagonal or hexagonal faces. For the purposes of fabricating an improved panoramic multi-camera capture device 500 with a "hemispherical" outer dome or shell 510, the continuity of the camera channels would be maintained, and the shell would have a "bottom" edge that "zig-zagged" as it followed the edges of the faces. Likewise, if the improved panoramic multi-camera capture device 500 had an icosahedron base shape and was designed to capture a nominal 270 deg. FOV, the dome or shell could be made to fit, and lowered over all or most of the pre-assembled portions of the multi-camera device. But if, however, the improved panoramic multi-camera capture device 500 was designed to simultaneously capture content over a 360 sphere, or the majority thereof (e.g., except for space lost to mechanical support (see FIG. 8A and FIG. 17), the outer dome or shell could be fabricated in two or more portions and assembled around the camera assemblies.

It is also recognized that the fabrication of a faceted shell or dome 510 that includes alignment facets or notches could reduce the mechanical integrity of the dome or shell structure. The risks of increased fragility that can occur at the notches can then be reduced by various methods including thickening the dome or shell, fabricating the dome or shell of a more robust material than standard optical glass, or by mechanically strengthening the facet area with a structural or reinforced adhesive. Candidate substrate materials for the dome or shell with improved robustness include a plastic or polymer such as PMMA, or an optical glass ceramic (e.g., Alon, Spinel, or ClearCeram), or a chemically strengthened glass (e.g., Gorilla glass from Corning Inc.).

Once the domes or shells 510 are fabricated, the outer lens elements 550 can have fixed focal lengths and curvature offset and tilt errors that vary from channel to channel, leading to focus errors, and FOV size and FOV pointing errors (FOV±, FOV↔) that can cause parallax errors or blind regions. The fabrication errors for these outer lens elements 550 are likely to be larger than those that impact the internal lens elements (e.g., FIG. 9A—second compressor lens element 345B and the inner lens elements 350).

So, to fulfill the broad goals for the improved panoramic multi-camera capture devices 500, of providing image capture with minimal parallax error, seam width, and FOV overlap between adjacent cameras, the opto-mechanical designs for the cameras 520 can include FOV corrections. As one example, if the outer lens elements of a dome 510 are fabricated with optical power (focal length) errors that can result in FOV size errors (FOV±) when they are assembled into a camera 520, the camera can be assembled using corrective features or methods. Such fabrication errors can occur if the dome 510 has an incorrect overall radius, or if the local shell portions 545 that constitute outer lens elements 550 have incorrect local surface radii. Compensating means can be provided by moving or longitudinally adjusting a lens element (e.g., a second compressor element) in the "Z-direction" (e.g., along the optical axis), in order to provide compensation for FOV±width errors. As another example, if the fabrication errors for the outer lens elements 550 are expected to be large enough, another lens element (e.g., a second compressor lens element) can be fabricated and measured to provide lenses with a deliberate range of variation of optical power. Once the outer lens elements 550 of the dome 510 are characterized, a second compressor lens element with an appropriate compensating, or partially compensating, optical power can be selected for use in a given camera 520. These two compensating methods can also be used in combination. Of course, such errors and differences in lens element optical power can result in focal length variations that cause defocus or magnification or image size errors for the assembled camera. Focus positioning errors that cause defocus or magnification errors can be compensated for by adjusting the position of the image sensor or a lens or lens group during camera alignment. These compensating adjustments can be provided once during camera and device fabrication, or an ongoing basis, using motors or athermal or memory metal adjusters. The camera can also be designed to be varifocal, so as to have a variable focal length in which the focus positioning changes as the focal length (and magnification) changes.

Figure 14:
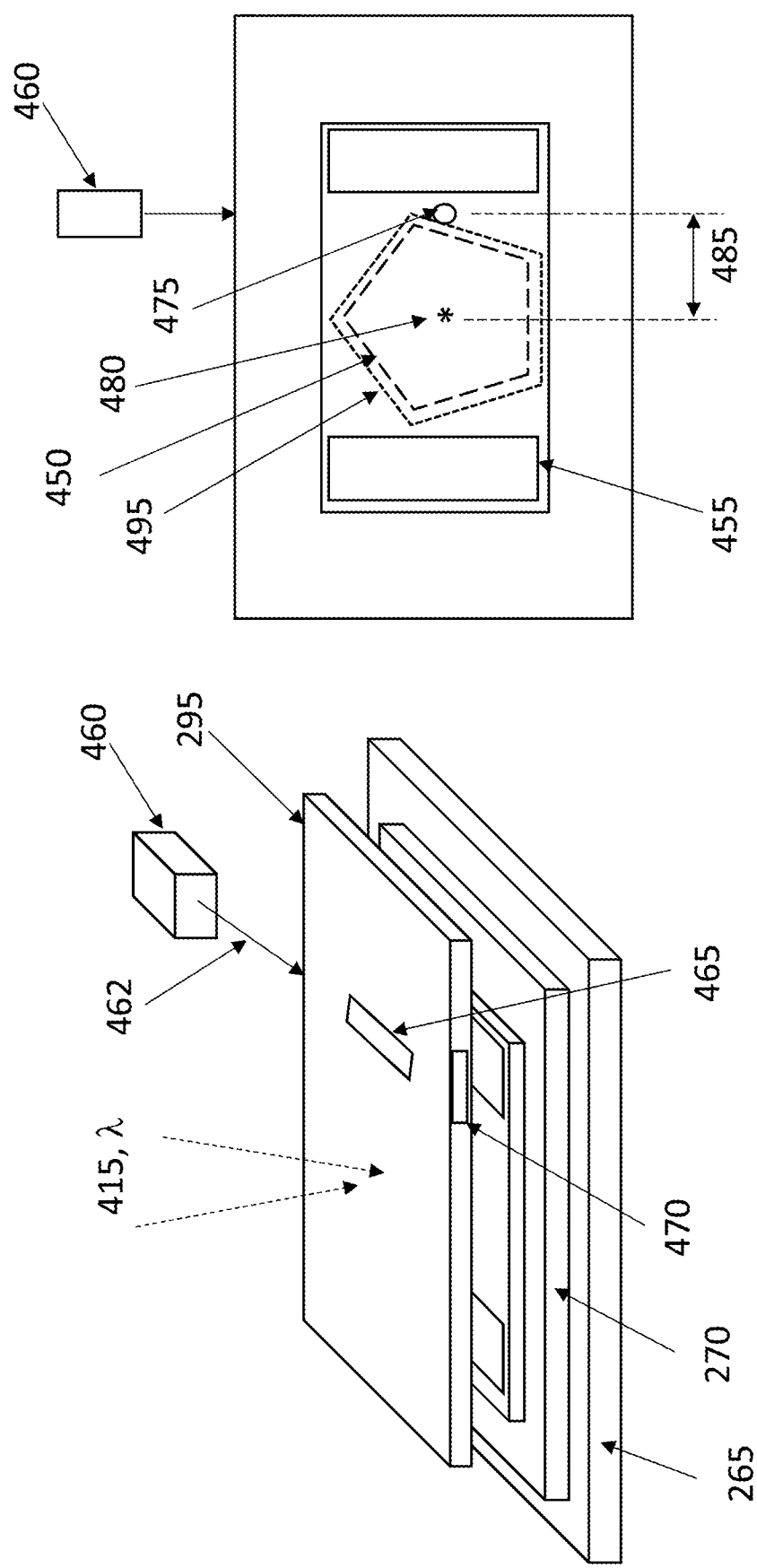
FIG. 14 depicts the sensor area of a camera channel, including masking and an optical fiducial.

The individual cameras can also be opto-mechanically designed to compensate for lens fabrication errors that cause imaged FOV↔pointing vector or lateral positioning errors. In particular, errors in fabrication of the outer lens elements 550 as part of a dome 510 may be larger or more frequent in occurrence than similar fabrication errors affecting internal lens elements of a camera 520. As one approach for compensation of such errors, the lateral positioning of the effective image centroid or center pixel can be determined either optically or electronically (FIG. 14). As another corrective approach, the lens housing (130) can be designed to provide a compensating lateral adjustment for one or more internal lens elements. For example, means to adjust the positioning or tilt of an intermediate inner lens element, such as for a lens element located between the stop and the image sensor, can be provided.

The axial alignment or focal position of an image sensor, relative to the image plane 150 provided by a camera lens assembly (520) can be improved by means of an appropriate mechanism. For example, as shown in FIG. 13, an image sensor 270 can be assembled into a sensor package 265 that includes a mount 275 which includes a plate 290, a circular flange, several adjustment screws 280, and springs 285. For example, three adjustment screws can be used to control X-axis or lateral translation along with Z-axis rotation, and another set of three screws can be used to control Z-axis translation or focus positioning along with X-Y axes rotations, and an additional screw is used to control Y axis translation. A pair of springs are used to retain a gimbal plate 290, while also allowing X and Z-axis translations respectively. Other adjustment designs can be used, within the tight space constraints that the camera 520 and the overall panoramic multi-camera capture device 500 allows.

FIG. 13 and FIG. 14 also depict an advantageous hardware configuration in the region of the sensor 270, cover glass 272, and the accompanying sensor package 265 (which can include electronics, cooling and mounting). The cover glass 272 can seal or protect the sensor from the environment. The cover glass 272 can also provide UV or IR cut filtering by means of a thin film interference or dichroic coating, or that function can be provided on a separate window, external filter 295. The UV or IR cut filter reduces the level of the non-visible light incident, that is accompanying the image light 415, to the sensor 270. Alternately, or in additionally, UV and IR cut filtering can be provided with a coating applied to a lens element, including to the outer surface of outer lens element 437 (FIG. 9). The cover glass or filter 295 can also be a UV light absorbing glass and provide UV filtering by a combination of absorption and coating reflectance.

Although the opto-mechanics of FIG. 13 can reduce alignment errors for the sensors 270, the camera housings 130, and one or more cameras 520, these design improvements, and other comparable ones, may not provide sufficient accuracy or operational flexibility for all configurations or applications of an improved multi-camera capture device 500. As another, or complimentary approach, an optical fiducial system can be provided. In particular, as shown in FIG. 14, a light source 410 can direct light 412 for an optical fiducial into a window or filter 295. The window or filter 295 can be a cover glass that seals or protects the sensor from the environment, or it can be an external filter, such as UV or IR cut filter that reduces the level of the non-visible light incident, that is accompanying the image light 315, to the sensor 270. As an example, the UV and IR filtering can be provided by means of a dichroic coating that was fabricated onto the outer surface of the filter 295. The optical fiducial light 412 can be coupled into an edge of the filter 295 and propagates by total internal reflection (TIR) to an output coupler 415, by which it is directed towards the sensor 270, where it provides one or more illuminated spots or areas that function as optical fiducials 425. The optical fiducial light 412 can be low power infrared (IR) light, such as at 785 or 835 nm, and the output coupler 415 can be one or more lenslets, a prismatic feature, or a diffraction grating. The illuminated areas that function as optical fiducials 425 are preferably focused spots that are only a few sensor pixels wide. The optical fiducial light 412 is preferably provided by a light source 410 that is mounted in a mechanically stable position relative to the image sensor 270. Fiducial light 412 that remains within the optical substrate of the filter 295, and is light guided towards the opposite edge, can be absorbed by an absorber 420, which can for example be provided with a black paint coating.

FIG. 14 depicts one advantageous approach for providing an optical fiducial 425 that enables FOV tuning for a camera 520, and thus helps limit parallax errors and control an extent of image overlap or underlap for adjacent cameras in an improved panoramic multi-camera capture device 500. But in general, an optical fiducial can be provided by a light source located proximate to the sensor. As another example, a light source could be mounted on or near the sensor plane, and direct light outwards towards or through the cover glass, so that it reflects off of an optical element, and back towards the image sensor. The light source would be positioned outside the used active area of the sensor, as would a reflective coating. The reflective coating can be a localized metallic or dielectric coating positioned outside the clear aperture that is used by transiting image light. As previously, the light source would preferably then provide at least one illuminating spot of light onto active sensor pixels located outside, but proximate to, the active area used by image light, thereby providing an optical fiducial 425. This concept can also be extended, and optical fiducials can be attached to, or interact with, other components within the system, including lens elements or lens housing structures. As such, the relative motion of particular lens elements or sub-groups thereof, could be monitored to inform the image tracking, cropping, or correction efforts. Additionally, if one or more lens sub-groups or compensators can be actively driven, such as with motors, the resulting data can be useful to inform those corrections.

Once a dome or shell 510 with outer lens elements 550, and facets or notches 580, is fabricated, a process for assembling cameras 520 within the dome can commence. As an initial step, the locations or dimensions of the pre-fabricated alignment or mounting features at the facets/notches 580 can also be characterized. The facets or notches 580 can then also be altered, if useful or necessary, to facilitate alignment and mounting of the cameras 520 to the dome. As another initial step, the optical power and centration and size of the accompanying outer lens elements 550 can be determined. Then as noted previously, the pre-assembly of the given cameras 520 can include lateral or longitudinal adjustments of internal lens elements and sensor positioning to compensate for such variations.

Subsequently, a primary (e.g., the top or center) channel or camera 520 can be aligned and mounted within the dome 510. The camera 520 can be aligned for 6 degrees of freedom (DOF) in-situ, while imaging using calibrated targets, with its positioning adjusted to optimize both FOV centration and alignment to the center of the overall improved panoramic multi-camera capture device 500. For example, as suggested in FIG. 12, the camera 520 can be loosely aligned by contacting the extensions 560, with accompanying un-cured compliant adhesive (e.g., RTV), to the notches or facets 580, while being supported from the bottom (e.g., near the sensor) by an alignment jig. The extensions 560 can be designed so that, nominally only three of them, spaced around the channel, can provide aligning contact to their respective facets 580. Similarly, to help avoid over constraint, the three mounting posts 565 are positioned nominally 120° apart, and are mounted respectively through an over-sized clearance hole, to ensure that the screw passing through it will never touch, thus preventing rotational and translational over-constraint. The compliant grommets fix the assembly in Z (along the optical axis), but allow adjustment of each of the three nuts such that the pointing of the channel (520) can be tuned.

Once a channel, such as the primary channel, is nominally aligned relative to the extensions 560 and facets 580, and mounting posts 565 and grooves 575, further corrections to internal lens or sensor alignment can also be completed if necessary. Then, the primary camera can be mounted or affixed to the inside of the dome 510, by attaching the extensions to the notches by curing a previously applied adhesive, such as UV curable compliant adhesive. Adhesive at the mounting posts 565 can likewise then be cured. Once the primary channel is aligned and attached, the underlying support or jig (not shown) can be removed.

A similar assembly process can then be used for the additional or "secondary" camera channels 520, but with assembling them to be directly or indirectly referenced or registered to the primary channel. For example, a first camera that is immediately adjacent to the primary channel, can be aligned and mounted to both the dome 510, the primary channel, and the center of the overall improved panoramic multi-camera capture device 500. It can again be useful to use a cured compliant adhesive (e.g., RTV) at the interface of the notches and extensions. Once a first secondary camera channel is aligned and mounted, the temporary under-support or jig (not shown) used during this process can be removed, and then alignment and mounting of a second secondary camera channel can commence, and so forth. In an alternate assembly process, an entire first ring of secondary camera channels (520) that are adjacent to the primary camera channel, can be aligned to the dome 510, to the primary channel, and to the device center, while being supported by a temporary underlying support structure or jig (not shown), and then previously applied adhesive can be cured and this secondary channels can then be released from the support structure as a group. As another alternative, the first secondary channel can be individually aligned and mounted, and then the remaining secondary channels can be aligned and mounted as a group to the dome, to the primary channel, and to the first secondary channel. A similar alignment and mounting process can then be used for a second ring of secondary camera channels (520).

As another option, the primary channel and secondary channels can be loosely assembled to an internal frame, with the shell or dome 510 then positioned around them. The primary channel can then be aligned and mounted to the dome and internal frame, before the secondary channels are mounted. FIG. 15 provides an example of such an internal frame 800, with numerous pentagonal faces 810 arranged in a dodecahedral pattern with a hollow center. An internal frame 800 can be designed for an 11-camera system, with a support post attaching in the $12^{th}$ position (similar to FIG. 17). A polygonal internal frame, or half or partial internal frame can also be used in a partial or hemispheric system, where the camera assemblies, including images sensors are mounted to the frame. Alternately, a hemispherical system with an internal frame 800 can use a central hollow space (e.g., a nexus) to enable image light to cross through in reaching image sensors on the far side, including by transiting relay lens systems (not shown). As shown in FIG. 15, a pentagonal face (810A) can have three adjustors 820, such as set screws or flexures, oriented nominally 120° apart, that can interact with features on the camera housing and thus be used to help align a given camera channel. As previously, the mounting and adjustments for secondary channels can have a different design or configuration than those for a primary channel. As another alternative (not shown), one or more pentagonal faces 810A, 810B, or 810C can be provided with one or more adjustors that can be used to nudge the respective camera channel against a precision v-groove structure (also not shown). These-v-groove structures can be fabricated into, or protruding from, an inside edge of a pentagonal vertex 60 of a pentagonal face.

For an improved multi-camera panoramic image capture device 500 constructed in a dodecahedral pattern, an internal frame 800 would also be dodecahedral with pentagonal faces and it would be oriented with the internal pentagonal faces nominally aligned with the external pentagonal geometry. An internal frame 800 can be machined separately and assembled from 2 or more pieces, or it can be made as a single piece structure by casting or 3D printing. Although, the fabrication of a single piece frame could be more complex, the resulting structure can be more rigid and robust, and support tighter mechanical tolerances. For example, a dodecahedral frame with a hollow center could be cast in stainless steel, and then selectively post-casting machined to provide precision datum features. This internal frame can then be provided with flexures or adjustors on all or most of the pentagonal faces, to provide kinematic or quasi-kinematic adjustments and to reduce or avoid over constraint during device assembly and use. As before, the available adjustors on these internal faces can be different for the secondary channels as compared to a primary channel. Alternately, an internal frame can be at least in part made with a more compliant material, such as brass or Invar. As the central volume of this internal frame can be at least partially hollow, space can then be provided for the electrical cabling, thermal management hardware, and other support structures. The internal frame approach can be used with other polygonal device structures, such as that for an icosahedron.

As one approach to device assembly using an internal frame 800, the frame could be constructed in at least two parts, with a first structure supporting having a pentagonal face 810a to support a primary camera channel, and a surrounding ring of pentagonal faces 810 to support the first ring of secondary camera channels, and then a second structure or ring of pentagonal faces 810 to support the second ring of secondary channels. During device assembly, the first structure can be loaded with a primary channel and the first ring of secondary channels. The primary channel can then be preliminarily aligned and mounted to the shell or dome 510, followed by a preliminary alignment of the first ring of secondary channels. After the final alignment and mounting of the primary channel, the alignment of the secondary channels in the first ring can be revisited. The second structure or ring of pentagonal faces 810, loaded with the second ring of secondary channels can then be added in, aligned, and mounted. The alignment and mounting steps can use adjustors, flexures, shims, fasteners, adhesives, or a combination thereof, in combination with the internal frame structure(s) and the camera channels.

Alternately, or in addition, the lens housings 530 can be equipped with one or more tab or post like structures (not shown) that can protrude out from a lens housing out of the nominal conical space or volume and interact with similar protruding structures of an adjacent lens housing, or alternately interact with indented structures of an adjacent lens housing. For example, these protruding structures can be provided in the general vicinity of the sensor 270 and sensor package 265, and be several millimeters in length, and have datum features to help kinematically control a DOF, such as a radial position from the device center, or a tilt or rotation of one camera channel to an adjacent camera channel. A camera assembly can have two such protruding structures, arranged symmetrically or asymmetrically about the lens housing and one oriented orthogonally to the other, to control a different degree of freedom. Alternately, or in addition, the camera channels can have lens housings 530 that include one or more protruding tab, or post structures located within the seams 530. For example, such datum structures (not shown) can be provided within the seams, at the polygonal outer face of a camera channel, at a vertex 60, and can protrude out of the nominal conical space or volume and into the seam 570 between the two adjacent channels. Depending on the device design and intended applications, the protruding tab or structures, whether located in the outer seams 570, or more deeply imbedded, such as near the image sensors, can be either be fabricated from a compliant or a stiff material, or a combination thereof. As another alternative, one or more tabs of a given lens housing 530 need not protrude outside the nominal conical volume or frustum, but clamps that bridge from one tab to a tab of an adjacent lens housing can provide the interface or control to limit a degree of freedom.

While improving the optical design of the camera lens systems is important for enabling improved low-parallax panoramic multi-camera capture devices (500), improving the opto-mechanical design can be equivalently important. As suggested previously, the actual performance of a camera 520 can vary from the designed performance due to materials and fabrication variations amongst the individual lens elements and the housing and its constituent components, and the interactions thereof. As a result of such variations, the image quality (e.g., aberrations, including distortion), focal length (EFL) and magnification, working distance or track length, beam pointing or image location, and other attributes of a camera 520 can vary. These variations also mean that the assembly and performance of a given camera varies from that of another camera with nominally the identical opto-mechanical design. For example, the focal length of a set of nominally identical cameras can vary by ±2%, which in turn will cause a similar variation in the lens magnifications and FOVs. This variation can be reduced or eliminated by designing improved camera lenses varifocally to include a focal length compensator, such as with a lens element whose axial position can be adjusted. Alternately, the cameras 520 can be designed such that nominal image from a nominal camera underfills the image sensor, enough so that the image from a camera with a large (e.g., +2%) focal length lens also underfills a sensor, albeit with less margin. During calibration to determine a FOV, the EFL or magnification of a lens can be measured, and the sensor can also be aligned to be in focus for that lens. Image processing software can then be used to compensate the image for the lens variations, including compensating image size for magnification and distortion variations between lenses. In the present circumstance, with the camera channels only being optically complete once assembly to the outer dome 510, and its lens facets 550, has occurred, then final alignment, use of compensators, and calibration, can only occur thereafter. This process can be assisted by including some corrective mechanisms within the design, such as the optical fiducials of FIG. 14.

Figure 16:
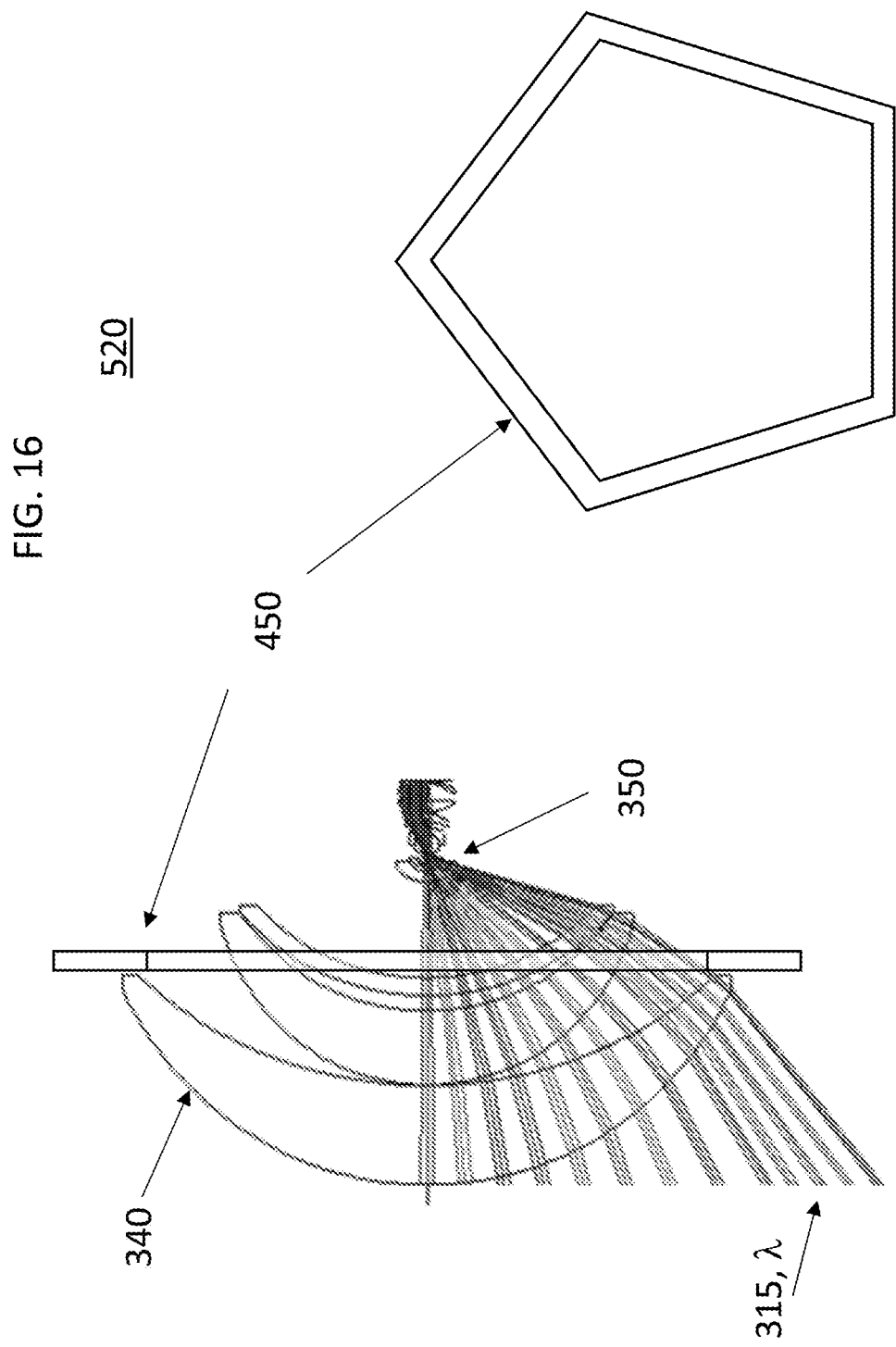
FIG. 16 depicts a camera lens optical system improved by the addition of a baffle in the compressor group.

As shown in FIG. 16, a camera 520 in an improved panoramic multi-camera capture device can also be equipped with a mask or an internal baffle 450, preferably located between an outer lens element 340, or compressor lens, and the subsequent inner lens elements 350. The baffle can be located after the first compressor lens element or after a subsequent compressor lens element. The baffle 450, as shown in FIG. 16, can provide a sharp polygonal edged aperture (e.g., pentagonal or hexagonal) following the shape of the outer lens element 340 and the core FOV 205, and also a blackened surface for blocking and absorbing light outside the intended FOV. The baffle opening can also have a circular shape, or an intermediate edge shape between polygonal and circular. The light absorbing baffle 450 can be painted or coated on an internal lens element surface. Thus, the baffle 450 or mask can also define the edges of the transiting image light and thus cast an edge shadow 460 onto the image sensor 270 (see FIG. 14).

The optical fiducial light 412 and the shadow 460 cast by the baffle 450 can be used both individually and in combination to provide an improved multi-camera capture 500, with reduced parallax errors and reduced image overlap or underlap between cameras. As shown in FIG. 14, incident image light 315 can provide an illuminated image area 400 that is incident to an image sensor that has an active area length and width. For example, a camera 520 that collects uniform image light within a nominally pentagonally shaped core FOV 205 can then provide a pentagonally shaped illuminated area 400 on the sensor 270. This image or illuminated area 400 can underfill a width of the sensor 270, to a greater or lesser extent, depending on the shapes of the illuminated area and the sensor. To be a useful datum, all or most of the edge shadow 460 can define boundaries of an illuminated area of active pixels within an underfilled sensor area. Preferably the edge shadow 460 fills most (e.g., ≥97%) of the active area width. The baffle 455 is acting like a field stop. In cameras 520 without a baffle, the outer lens element can act like the field stop and define the polygonal FOV.

Within the illuminated areas corresponding to the edge shadow 460, there is a smaller illuminated area 400 corresponding to the core FOV 205, and between them, there can be an intermediate extended FOV 215. Preferably the extended FOV 215 is large enough to almost match the size of the edge shadow 460. The difference can be optimized depending on the expected mechanical alignment tolerances for the lens assembly and for positioning the baffle 450, and the optical sharpness or transition width of the projected shadow. Underfill of the sensor active area width allows the core FOV 205, an image centroid, the extended FOV 215, and edge shadow 460 to shift position on the sensor without being clipped. It can be beneficial during a calibration process to establish an image centroid 430 that can then be tracked versus time and exposure conditions. In particular, an initial distance or offset 435 can be determined during a calibration process and stored as a pixel count. Then, if the illuminated image area 400 shifts during or after assembly of the camera 520 into an improved panoramic multi-camera capture device 500, whether due to mechanical or thermal reasons, a new location of an image centroid 430 and the shape, size, and position of the core FOV 205 can be determined and compared to prior saved calibration data.

However, in completing this process, a boundary of the illuminated area 400 that corresponds to the desired image data must be determined. The edge shadow 460 cast by the baffle 450, much as suggested in FIG. 14, can then provide a useful series of fiducial edges or points 210 proximate to, but a bit larger than, the core FOV 205 (see FIG. 7). The shape and position of the shadow or occlusion cast by the baffle 450 can be determined during a bench test of a given camera 520, prior to assembly of that camera 520 into a given multi-camera capture device 500. Similar calibration data can be obtained after that assembly, and then again over time as the camera and device are used, to track changes in the shadow positioning that might occur due to environmental or mechanical initiated changes in the internal mounting or positioning of the lens elements (e.g., 340, 350) or the baffle 450.

In greater detail, the FOV edge defining baffle 450 and the optical fiducial 425, can be used in combination to monitor or longitudinally track the position of the image centroid 430 and image area edges, to aid image stitching or tiling. In particular, for the purposes of aligning a camera lens 520 for both center and rotation with respect to an image sensor 270, a method of projecting an optical fiducial or casting an optical occlusion onto the image sensor 270, can be used either individually or in combination.

Essentially the baffle 450 casts a multi-edged shadow onto the sensor 270, and the shape of the baffle will be sampled from around the periphery of the projected image or illuminated area 400 captured by the sensor 270 in software or hardware. The shadow edge can be relatively sharp, but can still create a gradient fall off, potentially spanning at least several pixels, between the illuminated area 400 and the dark surround of the projected shadow. The data for the sampled edges or fiducials from around the edges of the occluded area and the shadow gradients can then be used to derive an image centroid 430 of the lens projection. The baffle 450 or occluding shadow 460 can also have an added feature to indicate and derive rotation if needed. A calibration step can be initially used to derive a relationship of the shadow 460 to the lens center and rotation. Additionally, the dimensions and shape of the mask can be accurately measured before installation and compared to the size and shape of the projected shadow 460. The derived relationship of the size, shape, and centroid of the projected shadow 460 can account for an expected or measured difference in the shape and size of the edge shadow 460 compared to the shape and size of the baffle. Other factors that can affect the edge shadow 460, such as mask tilt, and an impact of lens distortion in a fractional field portion (e.g., 0.85-1.01) corresponding to the outer portion of a core FOV 205 and an extended FOV 215, can also be accounted for.

Additionally, as previously described, an optical fiducial 425 can be projected using IR or visible light onto an unused portion of the sensor 270. The pattern formed by the fiducial can then be used to derive the location of the fiducial and be calibrated to the image centroid 430, and the lens center and rotation. A calibration step is initially used to derive the relationship of the optical fiducial 425 to the lens center and rotation and correlated to the distortion characteristics calculated in the calibration process. Additionally, a series of calibration images of the fiducial shadow 460 provided by baffle 450 can be used to locate more distant features (e.g., the corners), and thus to confirm or determine the planarity of the lens to sensor mechanical alignment. Sensor alignment or planarity can be modified using the adjustments previously described in FIG. 8. The combined fiducial method, of using both an optical fiducial 425 and a projected fiducial shadow 460 has the advantage of being more robust in diverse lighting conditions where the edge of the occlusion cast method may be inconsistent or hard to detect.

The method for calibrating with optical fiducials (or with electronic fiducials) and shadow occlusions can be used for a given camera to accurately align the modeled lens distortion derived from a calibration step to the calibrated core FOV 205. The resulting correction data can be stored in matrices or other forms in an on-board look up table (LUT) on a local board that is part of the sensor package, for each camera and sensor. When an image is captured, this correction data can be used to crop a larger image, corresponding to an extended FOV 215, during an initial or interim capture step, down to an image corresponding to a real current core FOV 205. Likewise, other available data, such as for exposure and color corrections, that can be stored locally, can also be applied in real time to the cropped, core FOV sized image, before it is transmitted to a system computer for further image processing, including image seaming or tiling to assemble a panoramic image.

More broadly, in general, during either a real time or post processing step of modifying image data captured by one or more cameras 520 of an improved multi-camera panoramic capture device 500, a method for calibrating optical fiducials and shadow occlusions can be used for a given camera to accurately align the modeled lens distortion derived from a calibration step to the captured image. Then an image can be accurately undistorted as needed, and also corrected to account for other camera intrinsics (e.g., lens focal length, or sensor parameters). This method can be replicated for the multiple cameras 520 of a multi-camera capture device 500 to enable accurate stitching or tiling of multiple images together. By matching knowledge of the camera intrinsics accurately to the captured images, the quality of the stitching across the boundaries or seams between images captured by adjacent cameras will increase the combined image quality and reduce the errors from the image being misaligned to the calibrated intrinsics initially calculated. As such, the speed of the stitching or tiling increases because little or no time can be spent on compute intensive (e.g., optical flow) image feature-based methods to correct for mismatches in alignment, distortion, and lens intrinsics.

Figure 17:
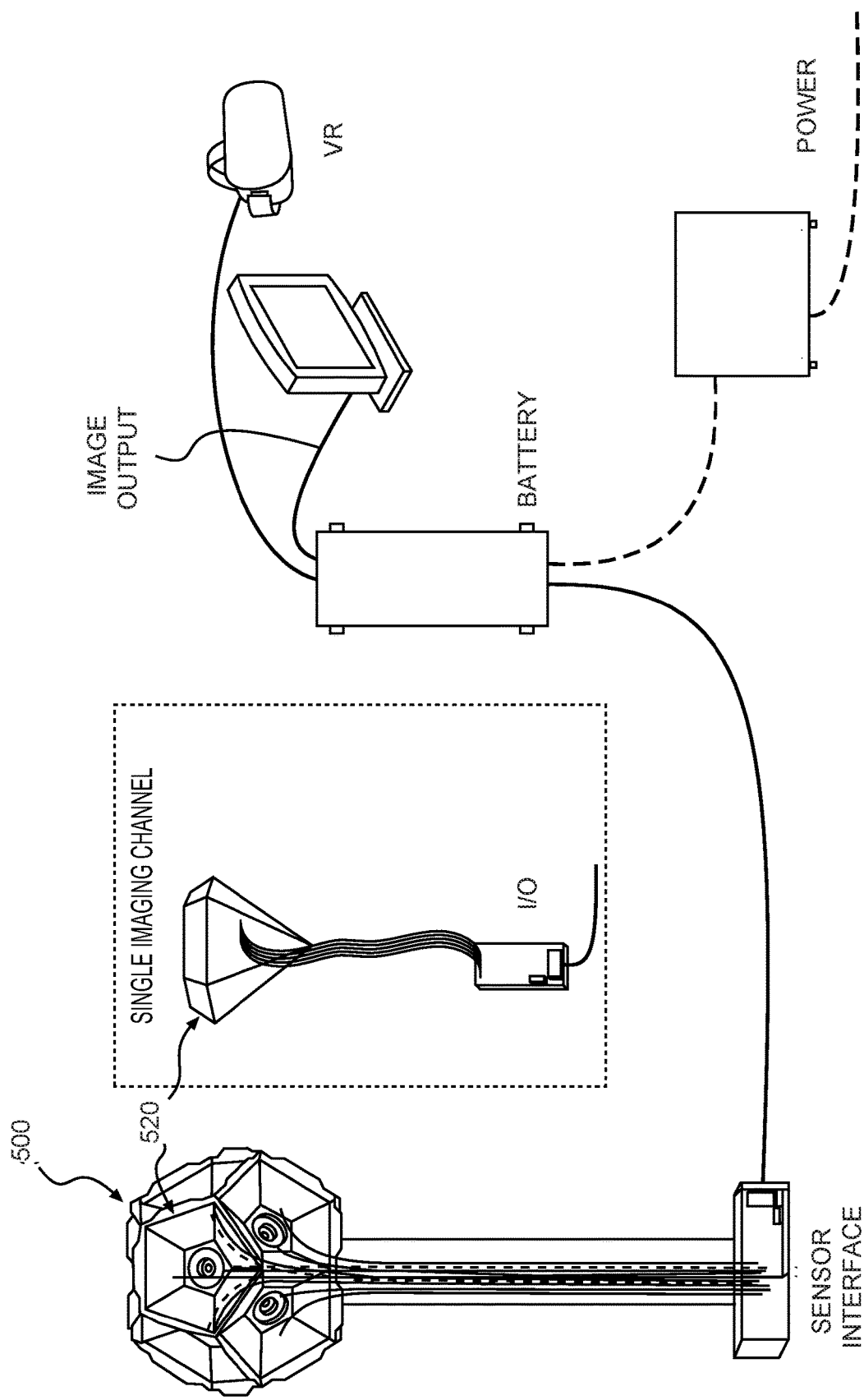
FIG. 17 depicts an electronics system diagram for use with an improved panoramic multi-camera capture device.

FIG. 17 depicts an electronics system diagram for a portion of an improved multi-camera capture device 500. In this example, a dodecahedron type device has 11 cameras 520, and an electro-mechanical interface, including a support post, in the twelfth camera position. Image data can be collected from each of the 11 cameras, and directed through an interface input—output module, through a cable or bundle of cables, to a portable computer that can provide image processing, including live image cropping and stitching or tiling, as well as camera and device control. The output image data can be directed to an image display, a VR headset, or to further computers, located locally or remotely. Electrical power and cooling can also be provided as needed.

Also, as suggested previously, the performance of a multi-camera capture device, relative to both the opto-mechanics and image quality, can be affected by both internal or external environmental factors. Each of the image sensors 270, and the entirety of the sensor package, with the data interface and power support electronics can be localized heat sources. To reduce the thermal impact on the camera lenses, and the images they provide, the mechanical design preferably isolates the sensors 270 thermally from the lens opto-mechanics. To further help reduce thermal gradients between the sensors and their electronics, and the optics, micro-heat pipes can be used to cool the sensors and re-direct the heat. The heat is preferably removed from the overall device by either active or passive cooling provided through the electro-mechanical interface in the twelfth camera position, shown in FIG. 17. This cooling can be provided by convection or conduction (including liquid cooling) or a combination thereof.

As also suggested previously, outside ambient or environmental factors can also affect performance of an improved multi-camera capture device 500. These factors can include the effects of the illuminating ambient light, or thermal extremes or changes in the environment. For example, as sun light is typically highly directional, a scenario with outdoor image capture can result in the cameras 520 on one side of the device being brightly illuminated, while the other cameras are seeing plenoptic illumination from the scene or even are in shadows. In such instances, the captured images can show dramatic exposure variations, which can then be modified by exposure correction, which is preferably provided locally (see FIG. 14). In an improved multi-camera capture device 500, light from an optical fiducial 425 can also be used for exposure correction of captured images. Light or pixel signals from the peripheral image region, between the edges of the core FOV 205 and the extended FOV 215, can also be used for exposure correction, prior to the image being cropped down to the size of the core FOV 205. Additionally, exposure correction can also enabled by imbedding optical detectors in the seams 160, or vertices, between outer lens elements 340. These abrupt exposure differences can also cause spatial and temporal differences in the thermal loading of some image sensors 270, as compared to others, within an improved multi-camera capture device 500. The previously discussed sensor cooling, whether enabled by heat pipes, heat sinks, liquid cooling, or other means, can be designed to account for such differences. The performance can be validated by finite element analysis (FEA).

Taken together, FIGS. 8A,B, and the associated discussion present an approach for an improved panoramic multi-camera capture device 500 having an outer shell or dome 510 that provides an integrated set of outer lens elements. Whereas FIG. 10A, FIG. 10A2, FIGS. 10B-C and FIG. 10E depict advantageous geometries for providing a series of outer compressor lens elements (550) as part of the outer shell. FIG. 8A, FIG. 8C and FIG. 12 and the associated discussions provide details on a configuration for integrating cameras (520) and camera housings (530) with the optical dome 510 and each other. FIGS. 13-16, and their associated discussions, provide details on configurations for determining or modifying the imaged FIOV at an image place for a given camera. In combination, a goal of the present approach is to provide an improved panoramic multi-camera capture device 500 with multiple low-parallax adjacent cameras and reduced seam widths between the adjacent cameras, that enables easy image tiling. A further goal is to provide an improved device (500) with reduced sensitivity to environmental damage or contamination. Additionally, the cameras are intended to have a modular construction within the dome, to enable easy replacement within a factory or service center, or potentially in the field replacement. (e.g., with field replaceable units (FRUs)). Also, as the dome can be fabricated with a plastic or polymer material, as can one or more internal lens elements, an all plastic or hybrid plastic and glass optical design can be provided so as to help reduce the unit cost of an assembled device.

As discussed previously, with respect to FIG. 4, a preferred configuration for an improved multi-camera capture device 500 is to design and fabricate a generally spherical system, having a plurality of camera lenses 520 distributed in a dodecahedron or truncated icosahedron arrangement. However, for some applications, a generally hemispherical configuration can be preferable. Because the outer lens elements and cameras are typically polygonal in shape, a hemispherical device can have a jagged or irregular circumference. In such systems, the cameras can be designed to be contained within an irregular hemispherical volume, or one or more of the cameras can be designed with folds (e.g., using mirrors or prisms) such that the optical paths extend through the irregular circumferential surface. This construction can provide more room for use of modular sensor units that can be swapped in and out.

As also suggested previously, outside ambient or environmental factors can also affect performance of a multi-camera capture device. These factors can include the effects of the illuminating ambient light, or thermal extremes or changes in the environment. For example, as sun light is typically highly directional, a scenario with outdoor image capture can result in the cameras on one side of the device being brightly illuminated, while the other cameras are seeing plenoptic illumination from the scene or even are in shadows. In such instances, the captured images can show dramatic exposure variations, which can then be modified by exposure correction, which can be provided locally (see FIG. 17). In an improved multi-camera capture device 500, light from an optical fiducial 475 can also be used for exposure correction of captured images. Light or pixel signals from a portion of the peripheral image region, between the edges of the core FOV 205 and the extended FOV 215, can also be used for exposure correction, prior to the image being cropped down to the size of the real current core FOV 205. It is also noted that as extended FOV 215 of a first camera can overlap at least in part with an extended FOV 215 of an adjacent camera, that light level and color comparisons can be made for content or signals that are simultaneously captured by both cameras. The signals or pixel data from these overlapping regions can be used to determine exposure variations between the two cameras, by having a common reference point (e.g., a matched feature point—using SIFT, SURF or a similar algorithm for finding common feature points in the overlap region).

It is noted that the peripheral image or exposure data can also be retained for use in later or post image processing. Additionally, exposure correction can also enabled by imbedding optical detectors in the seams 400, or vertices, between outer lens elements 437. These abrupt exposure differences can also cause spatial and temporal differences in the thermal loading of some image sensors 270, as compared to others, within a multi-camera capture device 300. The previously discussed sensor cooling, whether enabled by heat pipes, heat sinks, liquid cooling, or other means, can be designed to account for such differences. The performance can be validated by finite element analysis (FEA).

Alternately, one or more camera systems can be protected by the attachment of a shield or mask to cover the polygonal shape, from seam to seam, and vertex to vertex, of the outer lens element thereof. Such shields can be provided to cover a single camera lens system, or multiple systems. These shields can be shaped to generally conform to the outer surface shape of the outer lens elements, and they can be used to prevent saturated exposure or overexposure from bright directional light (e.g., solar), or to prevent contamination from a localized directional environmental source. While these caps are nominally detachable, for some user applications, they may remain in use for a prolonged time period. Overly bright exposure, from the sun or other light sources can also be controlled with an image sensor having electronic shuttering or drains, or a physical shutter or an electro-optical neutral density, photochromic, or electrochromic filter, that can, for example be designed into a camera 520, such as within the grouping of inner lens elements 540. Signals to initiate or control electronic or secondary shuttering can be obtained from the image sensor or from other internal or external optical detectors. As another robustness improvement, one or more camera channels can use dichroic color filter arrays integrated into the image sensor package instead of the standard dye-based CFAs.

Environmental influences can also cause a multi-camera capture device to be heated or cooled asymmetrically. The previously discussed kinematic mounting or linkage of adjacent camera housings 530 (see FIG. 8 and FIG. 15) for an improved multi-camera capture device 500 can help reduce this impact, by trying to deflect or average mechanical stresses and limit mechanical displacements. However, it can be additionally beneficial to provide channels or materials to communicate or shift an asymmetrical thermal load to be shared more evenly between or by cameras 520 and their housings 530. With respect to FIG. 8A, this can mean that the spaces around the lens housing 530 and an internal frame 800, can be at least partially filled with compliant but high thermal contact, thermally conductive materials (e.g., Sil-Pad (from Henkel Corporation) or CoolTherm (Lord Corporation, Cary NC)) to help spatially average an asymmetrical thermal load or difference. Alternately, or additionally, thermal conductive straps or tapes, such as an adhesive tape in the 88xx series from 3M (St. Paul, MN) can be used. However, at the same time, some of the effect of thermal changes, relative to the imaging performance of the camera lenses 520, can be mitigated by both judicious selection of optical glasses and athermal mounting of the optical elements within the lens housing 530. Taken in combination, an effective design approach can be to enable thermal communication or crosstalk between lenses 520 and their housings 530 to environmental influences, but to simultaneously isolate the lenses and housings from the sensors 270 and their electronics.

An improved camera 520 for use in an improved multi-camera image capture device 500 can also use a tunable lens element to correct for thermally or mechanically induced focus changes (e.g., defocus). This tunable lens can preferentially be located amongst the inner lens elements 540, and can be a liquid crystal or elastic polymer type device, such as an electrically actuated focus tunable lens from Optotune (Dietikon, SW).

The emphasis of the present approach has been on the development of improved camera lens systems 320 for which parallax errors can be reduced within at least a core FOV 205, while modest extended FOVs 215 (e.g., ≤5% extra) and image capture overlap with adjacent cameras can also be provided. Similarly, it is noted that the present approach can be extended to support possible applications for which having yet larger overlapping FOVs (e.g., 10-25% extra, or 4-10° extra FOV for dodecahedral systems with a nominal Core FOV of 37.45°) of image capture between adjacent cameras, and simultaneous parallax error or perspective error control within at least a core FOV, is a priority. The camera designs can be extended even further, to provide yet larger overlapping FOVs (e.g., 10-20° extra), but without benefit of reduce parallax for angles much beyond the designed core FOV.

In conclusion, a goal of the present invention is to divide edge rays between adjacent camera channels 50/50 so that half of the beam is picked up by one channel, and half of the beam picked up by an adjacent channel. If parallax errors and front color are well corrected, then the rays can nearly perfectly match the edge boundary of the geometry and be split 50/50 down these adjacent lens channels. Otherwise, these rays may not divide perfectly, but can instead be separated by some gap. In either case, an intervening mechanical seam can have a real width and impact the ray splitting or the extent of blind regions and number of lost pixels or the value of having an extended FOV. The present approach, with the faceted dome 510, in part provides means and structure for reducing the width of the mechanical seams while optically designing the low-parallax cameras that can take advantage of that improvement.

In order to push chief rays to the edge of a polygonal surface, aberrations of the entrance pupil, and particularly spherical aberration and axial chromatic aberration of the pupil, should be optimized or reduced. For context, the entrance pupil and exit pupil, which are projected images of the aperture stop in object space and image space respectively, are usually academic curiosities, representing the virtual images of the aperture stop that a person can see when looking into a lens.

In a typical optical system, to provide good image quality, aberrations matter at an image plane, with the typical goal to have small net sums of the individual surface contributions, even though values at individual internal surfaces, whether positive or negative, can be magnitudes larger. Whereas, aberrations at the aperture stop often do not matter much, other than positioning the stop correctly and defining the lens system f-number while minimizing clipping or vignetting of the ray bundles versus field. It is noted that if an object was located at the aperture stop, pupil aberrations would affect the apparent image quality of the image of that object as seen by the person viewing the entrance or exit pupil, although these pupil aberrations are not necessarily representative of the image quality at the image plane.

In low-parallax lenses, on the other hand, pupil aberrations, and particularly entrance pupil aberrations, matter. First, to begin to properly design the lens to control parallax, the entrance pupil must be positioned behind the image plane. Secondly, the aiming of peripheral chief rays from the outer compressor lens element, and towards the low parallax volume, must be controlled. As noted previously, optimizing spherical aberration of the entrance pupil can be an effective way to limit parallax errors. In that context, modest overcorrected or under-corrected optimizing spherical aberration of the entrance pupil can occur, meaning that the nonparaxial chief ray NP points can lead or follow the paraxial NP point respectively. Additionally, axial chromatic aberration of the entrance pupil creates color differences that can affect optimization of spherical aberration of the entrance pupil. Front color, which can be considered to be an artifact of this axial chromatic aberration, and the axial chromatic aberration itself, can be reduced by judicious choice and use of high and low dispersion optical materials within the lens design. Although optimization of the spherical aberration of the entrance pupil or chief ray pointing provides fine control for the non-paraxial, chief ray NP point position and parallax reduction, distortion from the compressor lens group also has an increasing influence, versus increasing field, on the projected chief ray pointing towards a location behind the lens and towards the low parallax volume. The magnitude and characteristics of the distortion, which also defines the chief ray height on the outer surface of the outer compressor lens element, can be significantly determined by the use of aspheric surfaces within the compressor lens group.

Although this discussion has emphasized the design of improved multi-camera image capture devices 500 for use in broadband visible light, or human perceivable applications, these devices can also be designed for narrowband visible applications (modified using spectral filters, ultraviolet (UV), or infrared (IR) optical imaging applications. Polarizers or polarizer arrays can also be used. Additionally, although the improved imaging cameras 520 and devices 500 have been described as using all refractive designs, the optical designs can also be catadioptric, and use a combination of refractive and reflective optical elements.

We claim:

1. An imaging device, comprising:
a dome defining at least a portion of an interior volume, the dome comprising:
a first transparent lens element comprising a plurality of first edges forming a first polygonal shape,
a second transparent lens element comprising a plurality of second edges forming a second polygonal shape, wherein a second edge of the plurality of second edges abuts a first edge of the plurality of first edges of the first transparent lens element at a seam, and
a groove extending along the seam between the first transparent lens element and the second transparent lens element,
a first imaging lens comprising a first plurality of optical elements;
a first housing coupled to the first imaging lens and including a first mounting feature;
a second imaging lens comprising a second plurality of optical elements; and
a second housing coupled to the second imaging lens and including a second mounting feature,
wherein at least one of:
the first mounting feature cooperates with the groove to retain the first imaging lens in the interior volume to direct image light passing through the first transparent lens element to a first image plane, or
the second mounting feature cooperates with the groove to retain the second imaging lens in the interior volume to direct image light passing through the second transparent lens element to a second image plane.

2. The imaging device of claim 1, wherein:
the seam comprises a gap between a first side of the plurality of first sides and a second side of the plurality of second sides.

3. The imaging device of claim 1, wherein:
the dome further comprises a notch disposed in the groove; and one of the first mounting protrusion or the second mounting protrusion is received in the notch.

4. The imaging device of claim 1, wherein at least one of the first mounting projection or the second mounting projection comprise one or more mounting posts configured to be received in the groove.

5. The imaging device of claim 1, further comprising a frame disposed in the interior volume, wherein the first lens housing and the second lens housing are coupled to the frame.

6. The imaging device of claim 5, wherein the frame has a polygonal shape that nominally matches a polygonal shape of the imaging device.

7. The imaging device of claim 1, wherein the groove is formed in an interior surface of the dome at the seam.

8. The imaging device of claim 1, wherein the groove comprises a first facet and a second facet, the first facet directs a first portion of incident light entering the dome at the seam to the first imaging lens, and the second facet directs a second portion of the incident light entering the dome at the seam to the second imaging lens.

9. The imaging device of claim 8, wherein the first facet comprises a first angled surface extending away from the seam toward the first transparent lens element and the second facet comprises a second angled surface extending away from the seam toward the second transparent lens element.

10. The imaging device of claim 9, the dome further comprising:
a first mirrored surface configured to reflect image light directed by the first angled surface, wherein the first mirrored surface reflects image light to the first imaging lens; and
a second mirrored surface configured to reflect image light directed by the second angled surface, wherein the second mirrored surface reflects light to the second imaging lens.

11. The imaging device of claim 8, wherein at least one of the first facet or the second facet directs light by total internal reflection.

12. The imaging device of claim 11, further comprising a compensator that equalizes an optical path length for light directed by at least one of the first facet or the second facet.

13. The imaging device of claim 1 wherein:
the first imaging lens provides a first field of view comprising a first nominal field of view and a first extended field of view larger than the first nominal field of view,
the second imaging lens provides a second field of view comprising a second nominal field of view and a second extended field of view larger than the second nominal field of view;
the first extended field of view and the second extended field of view overlap at the seam; and
the first housing and the second housing configure the first imaging lens and the second imaging lens to reduce the overlap to two pixels or less.

14. The imaging device of claim 1, wherein:
first projections of paraxial chief rays included in the incident light that enters the first lens element converge to an entrance pupil located behind the first image plane;
second projections of non-paraxial chief rays included in the incident light that enter the first lens element converge to a low parallax point, and
the first housing is coupled to the dome to reduce a distance between the entrance pupil and the low parallax point.

15. The imaging device of claim 1, wherein the first imaging lens and the second imaging lens are coupled to the dome to reduce parallax errors for non-paraxial chief rays near the first edge and the second edge and to reduce center of perspective errors within at least a portion of a field of view associated with at least one of the first imaging lens or the second imaging lens.

16. The imaging device of claim 15, wherein the first imaging lens and the second imaging lens reduce parallax errors or perspective errors by limiting a transverse component of a spherical aberration at a plane at or near the entrance pupil, or by limiting a longitudinal width of the low parallax volume, or by controlling an axial position of a center of perspective at or near the entrance pupil.

17. The imaging device of claim 1, wherein the first imaging lens and the second imaging lens provide reduced front color experienced by the imaged non-paraxial chief rays from at or near the seam.

18. An imaging device comprising:
a dome defining at least a portion of an interior volume, the dome comprising:
a first lens element,
a second lens element adjacent the first lens element, and
one or more facets formed at a seam between the first lens element and the second lens element, the one or more facets directing a first portion of light rays at the seam to a first imaging lens and directing a second portion of light rays at the seam to a second imaging lens.

19. The imaging device of claim 18, further comprising:
the first imaging lens disposed in the interior volume and configured to direct light passing through the first lens element to a first image plane; and
the second imaging lens disposed in the interior volume and configured to direct light passing through the second lens element to a second image plane.

20. The imaging device of claim 18, wherein the one or more facets define a groove extending along the seam, the groove configured to receive a mounting feature on a housing of the first lens element or the second lens element.

* * * * *